United States Patent
Zhang et al.

(10) Patent No.: US 12,238,470 B2
(45) Date of Patent: Feb. 25, 2025

(54) EARPHONE WITHOUT COVERING AN EAR CANAL

(71) Applicant: SHENZHEN SHOKZ CO., LTD., Guangdong (CN)

(72) Inventors: Lei Zhang, Shenzhen (CN); Junjiang Fu, Shenzhen (CN); Bingyan Yan, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

(21) Appl. No.: 18/337,424

(22) Filed: Jun. 19, 2023

(65) Prior Publication Data

US 2023/0336902 A1    Oct. 19, 2023

Related U.S. Application Data

(63) Continuation of application No. 17/320,253, filed on May 14, 2021, now Pat. No. 11,689,837, which is a
(Continued)

(30) Foreign Application Priority Data

| Apr. 30, 2019 | (CN) | 201910364346.2 |
| Sep. 19, 2019 | (CN) | 201910888067.6 |
| Sep. 19, 2019 | (CN) | 201910888762.2 |

(51) Int. Cl.
*H04R 1/10*    (2006.01)
*G02C 11/00*   (2006.01)
(Continued)

(52) U.S. Cl.
CPC ........... *H04R 1/1016* (2013.01); *G02C 11/00* (2013.01); *G02C 11/10* (2013.01); *G06F 3/16* (2013.01);
(Continued)

(58) Field of Classification Search
CPC ........ H04R 1/105; H04R 1/1075; H04R 1/20; H04R 1/26; H04R 1/32; H04R 1/323; H04R 1/34; H04R 1/345; H04R 1/347
See application file for complete search history.

(56) References Cited

U.S. PATENT DOCUMENTS

2013/0051585 A1*   2/2013   Karkkainen   ......... H04R 1/1075
                                                          381/151
2017/0201823 A1    7/2017   Shetye et al.
(Continued)

FOREIGN PATENT DOCUMENTS

| CN | 106303779 A | 1/2017 |
| CN | 206865707 U | 1/2018 |

OTHER PUBLICATIONS

International Search Report in PCT/CN2020/070539 mailed on Apr. 7, 2020. 6 pages.
(Continued)

*Primary Examiner* — Kile O Blair
(74) *Attorney, Agent, or Firm* — Metis IP LLC

(57) ABSTRACT

The present disclosure relates to an open binaural earphone including a housing, at least one low-frequency speaker, and at least one high-frequency speaker. The housing may be placed on at least one of a head or an ear of a user and not blocking a user's ear canal, and configured to accommodate the at least one low-frequency speaker and the at least one high-frequency speaker. The at least one low-frequency speaker may be configured to output sounds within a first frequency range from at least two first sound guiding holes
(Continued)

through at least two first guiding tubes. The at least one high-frequency speaker may be configured to output sounds within a second frequency range from at least two second sound guiding holes through at least two second guiding tubes. The second frequency range may include one or more frequencies higher than one or more frequencies in the first frequency range.

17 Claims, 28 Drawing Sheets

Related U.S. Application Data continuation of application No. PCT/CN2020/070539, filed on Jan. 6, 2020.

(51) Int. Cl.
| | |
|---|---|
| G06F 3/16 | (2006.01) |
| G10L 21/0208 | (2013.01) |
| G10L 21/038 | (2013.01) |
| H04M 1/03 | (2006.01) |
| H04M 1/78 | (2006.01) |
| H04R 1/02 | (2006.01) |
| H04R 1/22 | (2006.01) |
| H04R 1/24 | (2006.01) |
| H04R 1/26 | (2006.01) |
| H04R 1/28 | (2006.01) |
| H04R 1/34 | (2006.01) |
| H04R 1/38 | (2006.01) |
| H04R 1/44 | (2006.01) |
| H04R 3/00 | (2006.01) |
| H04R 3/02 | (2006.01) |
| H04R 5/02 | (2006.01) |
| H04R 5/033 | (2006.01) |
| H04R 9/06 | (2006.01) |
| H04S 7/00 | (2006.01) |
| H04W 4/80 | (2018.01) |
| G02C 11/06 | (2006.01) |
| G10L 21/0216 | (2013.01) |

(52) U.S. Cl.
CPC .............. *G06F 3/162* (2013.01); *G06F 3/165* (2013.01); *G10L 21/0208* (2013.01); *G10L 21/038* (2013.01); *H04M 1/03* (2013.01); *H04M 1/035* (2013.01); *H04M 1/78* (2013.01); *H04R 1/02* (2013.01); *H04R 1/026* (2013.01); *H04R 1/028* (2013.01); *H04R 1/10* (2013.01); *H04R 1/1008* (2013.01); *H04R 1/1025* (2013.01); *H04R 1/1041* (2013.01); *H04R 1/105* (2013.01); *H04R 1/1075* (2013.01); *H04R 1/1083* (2013.01); *H04R 1/22* (2013.01); *H04R 1/24* (2013.01); *H04R 1/245* (2013.01); *H04R 1/26* (2013.01); *H04R 1/28* (2013.01); *H04R 1/2803* (2013.01); *H04R 1/2807* (2013.01); *H04R 1/2811* (2013.01); *H04R 1/2896* (2013.01); *H04R 1/34* (2013.01); *H04R 1/342* (2013.01); *H04R 1/345* (2013.01); *H04R 1/347* (2013.01); *H04R 1/38* (2013.01); *H04R 1/44* (2013.01); *H04R 3/00* (2013.01); *H04R 3/005* (2013.01); *H04R 3/02* (2013.01); *H04R 5/02* (2013.01); *H04R 5/033* (2013.01); *H04R 5/0335* (2013.01); *H04R 9/06* (2013.01); *H04S 7/304* (2013.01); *H04W 4/80* (2018.02); *G02C 11/06* (2013.01); *G10L 2021/02166* (2013.01); *H04R 2201/103* (2013.01); *H04R 2410/05* (2013.01); *H04R 2420/07* (2013.01); *H04S 2400/11* (2013.01)

(56) References Cited

U.S. PATENT DOCUMENTS

| | | |
|---|---|---|
| 2018/0376231 A1 | 12/2018 | Pfaffinger |
| 2019/0052954 A1* | 2/2019 | Rusconi Clerici Beltrami ........... G10K 11/26 |
| 2019/0104352 A1 | 4/2019 | Ozawa et al. |
| 2022/0386012 A1 | 12/2022 | Zhang et al. |

OTHER PUBLICATIONS

Written Opinion in PCT/CN2020/070539 mailed on Apr. 7, 2020, 7 pages.

* cited by examiner

EARPHONE WITHOUT COVERING AN EAR CANAL

CROSS-REFERENCE TO RELATED APPLICATIONS

This application is a continuation of U.S. application Ser. No. 17/320,253, filed on May 14, 2021, which a Continuation of International Patent Application No. PCT/CN2020/070539, filed on Jan. 6, 2020, which claims priority to Chinese Patent Application No. 201910364346.2 filed on Apr. 30, 2019, and Chinese Patent Application No. 201910888762.2 filed on Sep. 19, 2019, and Chinese Patent Application No. 201910888067.6 filed on Sep. 19, 2019, the contents of each of which are hereby incorporated by reference.

TECHNICAL FIELD

This application generally relates to electronic devices, and in particular, to an open binaural earphone.

BACKGROUND

As necessary electronic devices in modern life, earphones are widely used in various fields. Generally, the earphones may include in-ear earphones, headsets, etc. A conventional earphone may be coupled with users' ear canals and sound leakage of the earphone may be reduced. However, if the user wears the earphone for a relatively long time, damages may be caused to the hearing of the user, and when the user wears the earphone, the user may not hear environmental sounds, which may bring potential danger to the user. For example, when the user wears the earphone and crosses a road, the user may not easily hear car horns, which may cause a traffic accident. An open binaural headphone may not cover at least one of the ear canals of a user when the user wear the open binaural headphones. However, a conventional open binaural headphone may generate leakage sound when the user wears the open binaural headphone, especially when a volume of sounds generated by the open binaural headphone is relatively large and the environment is relatively quiet, the sound leakage of the open binaural headphone may be prominent and/or obvious, thereby affecting the work or life of people and revealing what the user is listening to. Therefore, it is desirable to provide an open binaural earphone, thereby reducing sound leakage of the open binaural earphone and improving the sound output efficiency of the open binaural earphone.

SUMMARY

According to an aspect of the present disclosure, an open binaural earphone is provided. A voice signal received, generated, or stored by the open binaural earphone may be divided into one or more signal with different frequencies. At least two sound guiding holes may be disposed on the open binaural earphone, and a distance between the at least two sound guiding holes may be determined/adjusted, thereby reducing sound leakage of the open binaural earphone and improving the sound output efficiency of the open binaural earphone.

To achieve the above purposes, the technical solutions disclosed according to some embodiments of the present disclosure are described in the following.

According to an aspect of the present disclosure, an open binaural earphone is provided. The open binaural earphone may include a housing, at least one low-frequency speaker, and at least one high-frequency speaker. The housing may be placed on at least one of a head or an ear of a user and not blocking a user's ear canal, and configured to accommodate the at least one low-frequency speaker and the at least one high-frequency speaker. The at least one low-frequency speaker may be configured to output sounds within a first frequency range from at least two first sound guiding holes through at least two first guiding tubes. The at least one high-frequency speaker may be configured to output sounds within a second frequency range from at least two second sound guiding holes through at least two second guiding tubes. The second frequency range may include one or more frequencies higher than one or more frequencies in the first frequency range.

In some embodiments, the first frequency range may include frequencies lower than 650 Hz, and the second frequency range may include frequencies higher than 1000 Hz.

In some embodiments, the first frequency range may overlap with the second frequency range.

In some embodiments, a first distance may be between the at least two first sound guiding holes. A second distance may be between the at least two second sound guiding holes. The first distance may exceed the second distance.

In some embodiments, the first distance may be not greater than 40 millimeters. The second distance may be not greater than 7 millimeters.

In some embodiments, the first distance may be 30 millimeters. The second distance may be 5 millimeters.

In some embodiments, when the user wears the open binaural earphone, a distance between a center point of the user's ear canal and a center point of at least two sound guiding holes may be not greater than 10 millimeters. The at least two sound guiding holes may be the at least two first sound guiding holes or the at least two second sound guiding holes that is closer to the user's ear canal.

In some embodiments, radius of the at least two first guiding tubes or radius of the at least two second sound guiding holes may be within a range of 1.75 millimeters-5 millimeters.

In some embodiments, lengths of the at least two first guiding tubes or lengths of the at least two second guiding tubes may be not greater than 100 millimeters.

In some embodiments, a ratio of a length of each first guiding tube of the at least two first guiding tubes to a diameter of the first guiding tube may be not greater than 200 millimeters. A ratio of a length of each second guiding tube of the at least two second guiding tubes to a diameter of the second guiding tube may be not greater than 200 millimeters.

In some embodiments, the sounds output from the at least two first sound guiding holes may have a same phase.

In some embodiments, the sounds output from the at least two second sound guiding holes may have opposite phases.

Additional features will be partially described in the description below and will become apparent to those skilled in the field by referring to the following and accompanying drawings, or by the generation or operation of examples. The characteristics of the present invention may be realized and obtained by practicing or using various aspects of the methods, tools, and combinations described in the following detailed examples.

BRIEF DESCRIPTION OF THE DRAWINGS

The present application can be further described according to exemplary embodiments. The exemplary embodiments can be described in detail with reference to the accompanying drawings. The embodiments are not restrictive exemplary embodiments, where the same reference numerals represent similar structures in several views of the drawings, and where.

DETAILED DESCRIPTION

Figure 1:
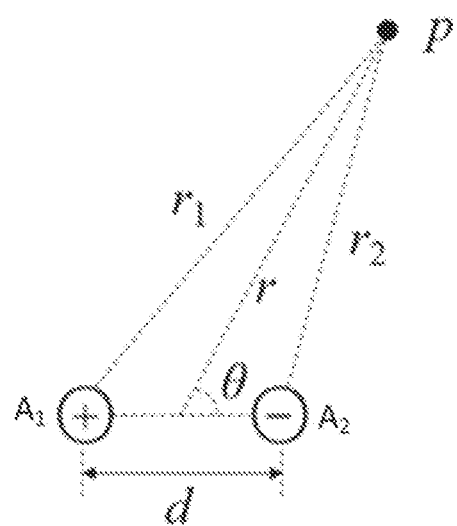
FIG. 1 is a schematic diagram illustrating an exemplary dual-point sound source according to some embodiments of the present disclosure.

In order to illustrate the technical solutions related to the embodiments of the present disclosure, a brief introduction of the drawings referred to in the description of the embodiments is provided below. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless apparent from the locale or otherwise stated, like reference numerals represent similar structures or operations throughout the several views of the drawings.

As used in the disclosure and the appended claims, the singular forms "a," "an," and/or "the" may include plural forms unless the content clearly indicates otherwise. In general, the terms "comprise." "comprises," and/or "comprising." "include," "includes," and/or "including." merely prompt to include steps and elements that have been clearly identified, and these steps and elements do not constitute an exclusive listing.

It will be understood that the term "system," "engine," "unit," "module," and/or "block" used herein are one method to distinguish different components, elements, parts, section or assembly of different levels in ascending order. However, the terms may be displaced by another expression if they achieve the same purpose.

Spatial and functional relationships between elements (for example, between layers) are described using various terms, including "connected," "engaged," "interfaced," and "coupled." Unless explicitly described as being "direct," when a relationship between first and second elements is described in the present disclosure, that relationship includes a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The present disclosure discloses an open binaural earphone. The open binaural earphone may have better sound leakage reduction capability. When a user wears the open binaural earphone, the open binaural earphone may be on at least one side of the user's head, and close to and not block the user's ear canal. The open binaural earphone may include an acoustic output device. The acoustic output device may include at least two sets of acoustic drivers. The at least two sets of acoustic drivers may include at least one set of high-frequency acoustic drivers and at least one set of low-frequency acoustic drivers. Each of the at least two sets of acoustic drivers may be configured to generate sounds with certain frequency ranges based on a voice signal, and propagate the sounds outward from at least two sound guiding holes acoustically coupled with the each set of the two sets of acoustic drivers, respectively. For example, the at least one set of high-frequency acoustic drivers may be configured to generate the sounds within a relatively high frequency range, and the at least one set of low-frequency acoustic drivers may be configured to generate the sounds within a relatively low frequency range. A frequency of the voice signal may be divided (e.g., decomposing the voice signal into a high-frequency signal corresponding to the sounds within the relatively high frequency and one or more signal with different frequencies). different distances between sound guiding holes may be set (e.g., a distance between two sound guiding holes corresponding to the low-frequency acoustic driver may be greater than a distance between sound guiding holes corresponding to the high-frequency acoustic driver), thereby improving the sound leakage reduction capability of the open binaural earphone.

In some embodiments, the acoustic output device may include a baffle, and the at least two sound guiding holes may be disposed on two sides of the baffle. In some embodiments, the at least two sound guiding holes may be disposed on two sides of the user's auricle when a user wears the acoustic output device. In this case, the auricle may be regarded as the baffle to separate the at least two sound guiding holes, and the at least two sound guiding holes may correspond to different acoustic routes to the user's ear canal, thereby improving the sound leakage reduction capability of the open binaural earphone.

FIG. 1 is a schematic diagram illustrating an exemplary dual-point sound source according to some embodiments of the present disclosure. To further illustrate the effect of the setting of sound guiding holes of an acoustic output device on an output sound of the acoustic output device, and considering that the sound propagates outward from the sound guiding holes, the sound guiding holes of the acoustic output device may be regarded as sound sources for sound output in the present disclosure.

Merely for illustration purposes, when a size of each of the sound guiding holes of the acoustic output device is relatively small, the each sound guiding hole may be regarded as a point sound source. In some embodiments, any sound guiding holes disposed on the acoustic output device for outputting sound may be regarded as a single point sound source of the acoustic output device. A sound pressure of a sound field p generated by a single point sound source may be represented by Equation (1) below:

$$p = \frac{j\omega\rho_0}{4\pi r} Q_0 \exp j(\omega t - kr), \qquad (1)$$

where $\omega$ refers to an angular frequency, $\rho_0$ refers to the air density, r refers to a distance between a target point and a sound source, $Q_0$ refers to a volume velocity of the sound source, and k refers to a wave number. It can be seen that the sound pressure of the sound field of the point sound source may be inversely proportional to the distance between the target point to the point sound source. It should be noted that a sound guiding hole for outputting a sound is regarded as a point sound source in the present disclosure may be only an example of the principle and effect, which does not limit the shape and size of the sound guiding hole in practical applications. In some embodiments, a sound guiding hole with a relatively large area may be regarded as a surface sound source and configured to propagate a sound outward. In some embodiments, the point sound source may also be realized by other structures, such as a vibrating surface, a sound radiating surface, or the like. For those skilled in the art, without paying any creative activity, it may be known that the sound generated by the structures such as the sound guiding hole, the vibrating surface, and the sound radiating surface may be regarded as a point sound source at a spatial scale discussed in the present disclosure, which may have the same sound propagation characteristics and the same mathematical descriptions. Further, for those skilled in the art, without paying any creative activity, it may be known that the acoustic effect achieved in a case in which a sound generated by an acoustic driver may be propagated outward through at least two sound guiding holes illustrated in the present disclosure may be achieved by other acoustic structures mentioned above, such as the sound generated by the at least one set of acoustic drivers may be propagated outward through at least one sound radiating surface. Other acoustic structures may be selected, adjusted, and/or combined according to actual needs, and the same acoustic output effect may be achieved. The principle of propagating sound outward by a structure such as the surface sound source may be similar to the principle of propagating sound outward by the point sound source, which is not be repeated herein.

As mentioned above, at least two sound guiding holes corresponding to the same acoustic driver of an acoustic output device disclosed in the present disclosure may be used to construct a dual-point sound source, thereby reducing the sound radiated by the acoustic output device to the surrounding environment. For convenience, the sound radiated by the acoustic output device to the surrounding environment may be referred to as a far-field leakage sound due to that the sound may be heard by other people in the environment. The sound that the acoustic output device radiates to the ears of the user wearing the acoustic output device may be referred to as a near-field sound due to the acoustic output device is close to the user. In some embodiments, the sound output by two sound guiding holes (i.e., a dual-point sound source) may have a certain phase difference. As used herein, a phase of the sound output by a point sound source (e.g., a sound guiding hole) may also be referred to as a phase of the point sound source. When positions of the two point sound sources of the dual-point sound source and the phase difference satisfy certain conditions, the acoustic output device may show different sound effects in the near-field (e.g., a hearing position of the user's ear) and the far-field. For example, when the phases of the point sound sources corresponding to the two sound guiding holes are opposite, that is, when an absolute value of the phase difference between the two point sound sources is 180 degrees, a far-field leakage may be reduced according to the principle of sound wave anti-phase cancellation. More descriptions regarding improving the sound output effect of an acoustic output device may be found in International Patent Application No. PCT/CN2019/130884 filed on Dec. 31, 2019, the entire contents of which are hereby incorporated by reference.

As shown in FIG. 1, the sound pressure p of the sound field generated by the dual-point sound source may be represented by Equation (2) below:

$$p = \frac{A_1}{r_1} \exp j(\omega t - kr_1 + \varphi_1) + \frac{A_2}{r_2} \exp j(\omega t - kr_2 + \varphi_2), \qquad (2)$$

where $A_1$ and $A_2$ refer to the intensities of the two point sound sources of the dual-point sound source, respectively, $\varphi_1$ and $\varphi_2$ refer to the phases of the two point sound sources of the dual-point sound source, respectively, and $r_1$ and $r_2$ may be represented by Equation (3) below:

$$\begin{cases} r_1 = \sqrt{r^2 + \left(\frac{d}{2}\right)^2 - 2*r*\frac{d}{2}*\cos\theta} \\ r_2 = \sqrt{r^2 + \left(\frac{d}{2}\right)^2 + 2*r*\frac{d}{2}*\cos\theta} \end{cases}, \qquad (3)$$

where r refers to a distance between any target point in space and a center position of the two point sound sources of the dual-point sound source, θ refers to an angle between a line connecting the target point and the center position of the dual-point sound source and a line where the dual-point sound source locates (i.e., the line connecting the two point sound sources of the dual-point sound source), and d refers to a distance between the two point sound sources of the dual-point sound source.

According to Equation (3), the sound pressure of the target point in the sound field may relate to the intensity of each point sound source, the distance between the two point sound sources, the phases of the two point sound sources, and a distance between the target point and the dual-point sound source.

The dual-point sound source with different output performance may be formed by setting the sound guiding holes. In this case, a volume in the near-field sound may be increased, and a volume of the leakage sound in the far-field may be decreased. For example, an acoustic driver may include a vibration diaphragm. When the vibration diaphragm vibrates, sounds may be transmitted from a front side and a rear side of the vibration diaphragm, respectively. The front side of the vibration diaphragm in the acoustic output device may include a front chamber for transmitting a sound. The front chamber may be acoustically coupled with a sound guiding hole. The sound transmitted from the front side of the vibration diaphragm may be transmitted to the sound guiding hole through the front chamber and further transmitted outwards. The rear side of the vibration diaphragm in the acoustic output device may be provided with a rear chamber for transmitting a sound. The rear chamber may be acoustically coupled with another sound guiding hole, and the sound transmitted from the rear side of the vibration diaphragm may be transmitted to the sound guiding hole through the rear chamber and propagate outwards. It should be noted that, when the vibration diaphragm vibrates, the front side and the rear side of the vibration diaphragm may generate sounds with opposite phases, respectively. In some embodiments, the structures of the front chamber and rear chamber may be specially set so that the sounds output by the acoustic driver at different sound guiding holes may meet specific conditions. For example, lengths of the front chamber and the rear chamber may be specially designed such that sounds with a specific phase relationship (e.g., opposite phases) may be output from the two sound guiding holes. As a result, problems that the acoustic output device has a low volume in the near-field and the sound leakage in the far-field may be effectively resolved.

Under certain conditions, compared to a single point sound source, the volume of the far-field sound of the dual-point sound source may be increased with the frequency. In other words, the leakage reduction capability of the dual-point sound source in the far-field may be decreased as the frequency increases. For further description, a curve of far-field leakage with frequency may be described in connection with FIG. 2.

Figure 2:
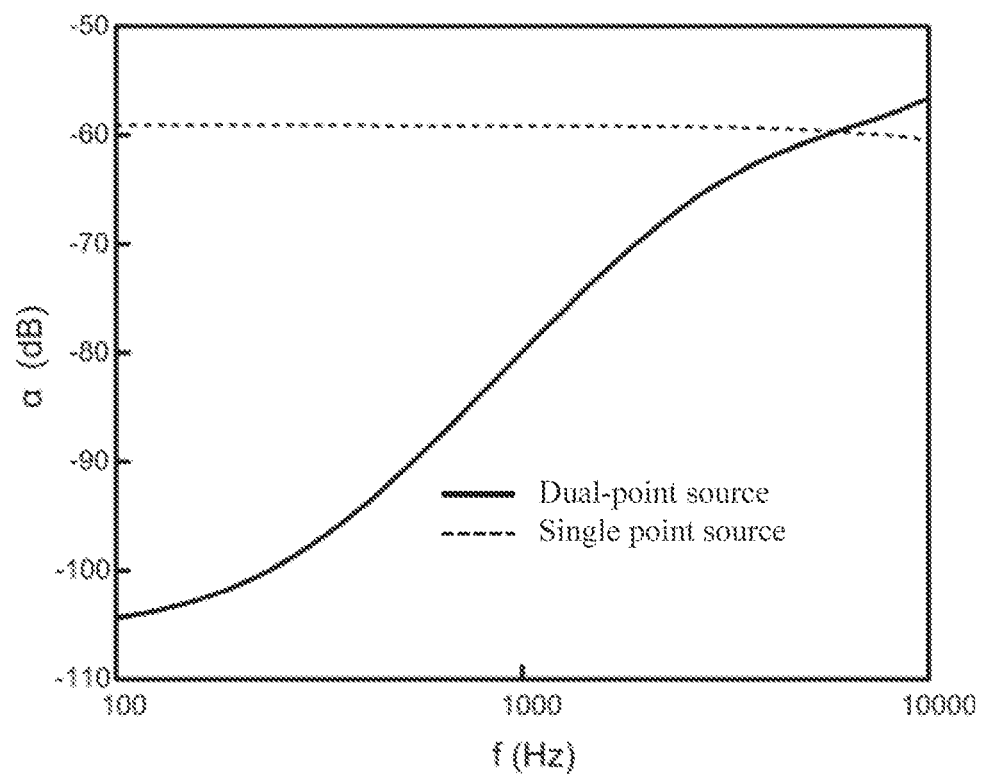
FIG. 2 is a schematic diagram illustrating changes of leakage sounds of a dual-point sound source and a single point sound source along with a frequency according to some embodiments of the present disclosure.

FIG. 2 is a schematic diagram illustrating changes of leakage sounds of a dual-point sound source and a single point sound source along with a frequency according to some embodiments of the present disclosure. A distance between the two point sound sources of the dual-point sound source in FIG. 2 may be constant, and the dual-point sound source may have the same (or substantially same) amplitude and opposite phases. A dotted line represents the variation of a volume of the leakage sound of the single point sound source at different frequencies. A solid line represents the variation of a volume of the leakage sound of the dual-point sound source at different frequencies. The abscissa represents the sound frequency (f), and the unit is Hertz (Hz). The ordinate adopts a normalization parameter α to evaluate a volume of a leakage sound. The parameter α may be represented by Equation (4) below:

$$\alpha = \frac{|P_{far}|^2}{|P_{ear}|^2}, \qquad (4)$$

where $P_{far}$ represents a sound pressure of the acoustic output device in a far-field (i.e., the sound pressure of the far-field sound leakage). $P_{ear}$ represents a sound pressure around the user's ear(s) (i.e., a sound pressure of the near-field sound). The greater the value of α, the greater the far-field leakage sound relative to the near-field sound may be, which may indicate that the capability of the acoustic output device for reducing the far-field sound leakage may be worse. The sound leakage reduction capability of an open binaural earphone (e.g., an open binaural earphone 3800 in FIG. 38, an open binaural earphone 4300 in FIG. 43, etc.) may be improved based on the changes of the leakage sounds of the dual-point sound source and the single point sound source along with the frequency shown in FIG. 2.

As shown in FIG. 2, when the frequency is below 3900 Hz, the far-field leakage sound produced by the dual-point sound source may be less than the far-field leakage sound produced by the single point sound source, and the far-field leakage sound may be increased as the frequency increases. When the frequency is close to 10000 Hz (e.g., about 8000 Hz or above), the far-field leakage sound produced by the dual-point sound source may be greater than the far-field leakage sound produced by the single point sound source. In some embodiments, a frequency corresponding to an intersection of the variation curves of the dual-point sound source and the single point sound source may be determined as an upper limit frequency that the dual-point sound source can reduce the sound leakage.

For the purposes of illustration, when the frequency is relatively small (e.g., in a range of 100 Hz to 1000 Hz), the capability of reducing sound leakage of the dual-point sound source may be relatively strong (i.e., the value of α may be small which is below−80 dB). In such a frequency band, increment of the volume of the hearing sound may be determined as an optimization goal. When the frequency is relatively great, (e.g., in a range of 1000 Hz to 8000 Hz), the capability of reducing sound leakage of the dual-point sound source may be relatively weak (i.e., the value of α may be large which is above −80 dB). In such a frequency band, decrease of the sound leakage may be determined as the optimization goal.

Referring to FIG. 2, a frequency division point of the frequency may be determined based on the variation tendency of the capability of the dual-point sound source in reducing the sound leakage. Parameters of the dual-point sound source may be adjusted according to the frequency division point so as to reduce the sound leakage of the acoustic output device. For example, the frequency corresponding to α with a specific value (e.g., −60 dB, −70 dB, −80 dB, −90 dB, etc.) may be used as the frequency division point. Parameters of the dual-point sound source may be determined by setting the frequency band below the frequency division point to improve volume of the near-field sound, and setting the frequency band above the frequency division point to reduce the far-field sound leakage. In some embodiments, a high-frequency band with relatively high sound frequencies (e.g., a sound output by a high-frequency acoustic driver) and a low-frequency band with relatively low sound frequencies (e.g., a sound output by a low-frequency acoustic driver) may be determined based on the frequency division point. More descriptions regarding the frequency division point may be found elsewhere in the present disclosure. See, e.g., FIG. 4 and the relevant descriptions thereof.

In some embodiments, the measurement and calculation of the sound leakage may be adjusted according to the actual conditions. For example, an average value of amplitudes of the sound pressures of a plurality of points on a spherical surface centered at the dual-point sound source with a radius of 40 cm may be determined as the value of the sound leakage. A distance between the near-field hearing position and the point sound source may be less than a distance between the point sound source and the spherical surface for measuring the far-field sound leakage. Optionally, the ratio of the distance between the near-field hearing position and the center of the dual-point sound source to the radius r may be less than 0.3, 0.2, 0.15, or 0.1. As another example, one or more points of the far-field position may be taken as the position for measuring the sound leakage, and the sound volume of the position may be taken as the value of the sound leakage. As another example, a center of the dual-point sound source may be used as a center of a circle, and sound pressure amplitudes of two or more points evenly sampled according to a certain spatial angle in the far-field may be averaged, and an average value may be taken as the value of the sound leakage. These measurement and calculation methods may be adjusted by those skilled in the art according to actual conditions, which are not limited herein.

According to FIG. 2, it can be concluded that in the high-frequency band (e.g., a relatively high frequency band determined according to the frequency division point), the dual-point sound source may have a relatively weak capability to reduce sound leakage, and in the low-frequency band (e.g., a relatively low frequency band determined according to the frequency division point), the dual-point sound source may have a relatively strong capability to reduce sound leakage. At a certain sound frequency, the amplitudes, phase differences, etc., of the two point sound sources of the dual-point radiation source may be different, and the capability of the two point sound sources of the dual-point radiation source to reduce sound leakage may be different, and the difference between a volume of the heard sound and a volume of the leakage sound may also be different. For a better description, the curve of the far-field leakage as a function of the distance between the two point sound sources of the dual-point radiation source may be described with reference to FIGS. 3A and 3B.

Figure 3A:
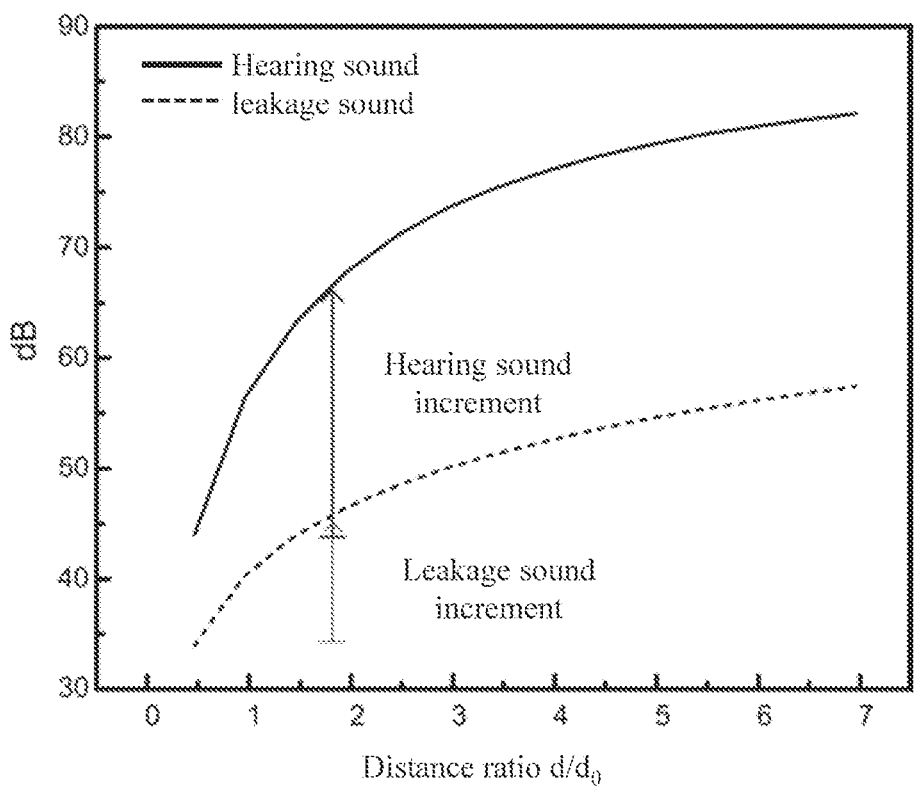
FIG. 3A and FIG. 3B are graphs illustrating changes of a volume of a near-field sound and a volume of a far-field leakage along with a distance of two point sound sources of a dual-point sound source according to some embodiments of the present disclosure.
Figure 3B:
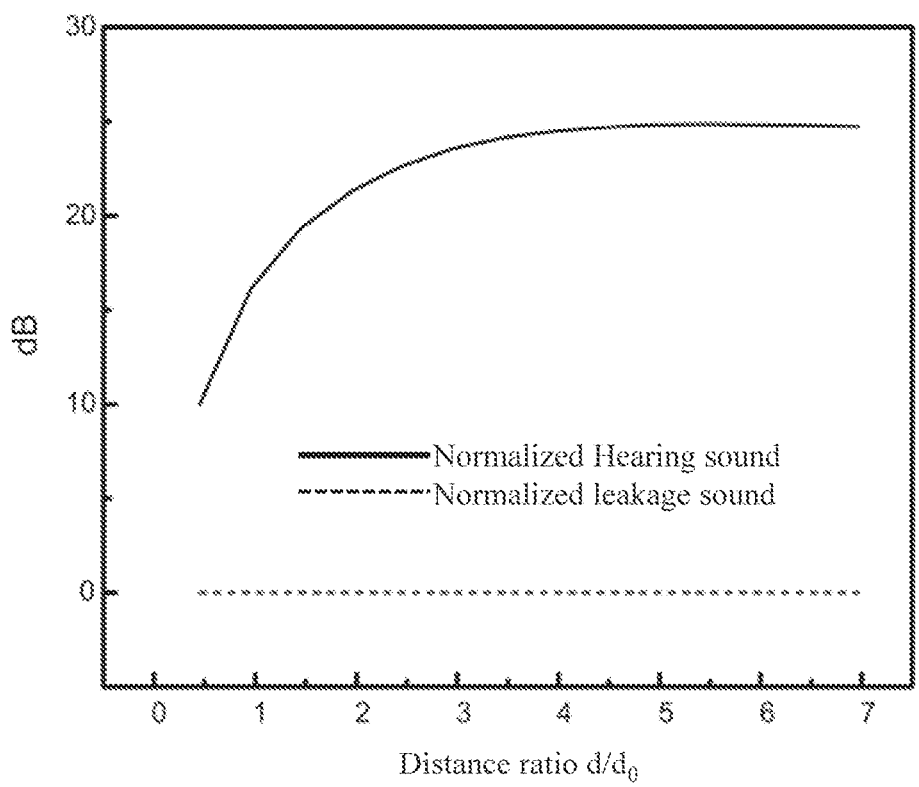

FIG. 3A and FIG. 3B are graphs illustrating changes of a volume of a near-field sound and a volume of a far-field leakage along with a distance of two point sound sources of a dual-point sound source according to some embodiments of the present disclosure. FIG. 3B is the graph which is generated by performing a normalization on the graph in FIG. 3A.

As shown in FIG. 3A, a solid line represents a variation curve of a hearing sound of the dual-point sound source with the distance between the two point sound sources of the dual-point sound source, and a dotted line represents a variation curve of a leakage sound of the dual-point sound source with the distance between the two point sound sources of the dual-point sound source. The abscissa represents a distance ratio d/d0 of the distance d between the two point sound sources of the dual-point sound source to a reference distance d0. The ordinate represents a sound volume (the unit is decibel (dB)). The distance ratio d/d0 may reflect a change of the distance between the two point sound sources of the dual-point sound source. In some embodiments, the reference distance d0 may be determined within a specific range. For example, do may be a specific value in the range of 2.5 millimeters-10 millimeters. Merely by way of example, do may be 5 millimeters. In some embodiments, the reference distance do may be determined based on a hearing position. For example, a distance between the hearing position to a nearest point sound source among the two point sound sources of the dual-point sound source may be regarded as the reference distance do. It should be known that the reference distance do may be determined as any other suitable values according to the actual conditions, which is not limited herein. Merely by way of example, in FIG. 3A, d0 may be 5 millimeters as the reference value for the change of the distance between the two point sound sources of the dual-point sound source.

When the sound frequency is constant, a volume of the hearing sound and a volume of the leakage sound of the dual-point sound source may increase as the distance between the two point sound sources of the dual-point sound source increases. When the distance ratio d/d0 is less than a ratio threshold, as the distance between the two point sound sources of the dual-point sound source increases, the increment of the volume of the hearing sound may be greater than the increment of the volume of the leakage sound. That is, the increment of the volume of the hearing sound may be more significant than that of the volume of the leakage sound. For example, as shown in FIG. 3A, when the distance ratio d/d0 is 2, a difference between the volume of the hearing sound and the volume of the leakage sound may be about 20 dB. When the distance ratio d/d0 is 4, the difference between the volume of the hearing sound and the volume of the leakage sound may be about 25 dB. In some embodiments, when the distance ratio d/d0 reaches the ratio threshold, a ratio of the volume of the hearing sound and the volume of the leakage sound may reach a maximum value, and as the distance of the two point sound sources of the dual-point sound source further increases, the curve of the volume of the hearing sound and the curve of the volume of the leakage sound may gradually go parallel. That is, the increment of the volume of the hearing sound and the increment of the volume of the leakage sound may be the same (or substantially same). For example, as shown in FIG. 3B, when the distance ratio d/d0 is 5, 6, or 7, the difference between the volume of the hearing sound and the volume of the leakage sound may be the same (or substantially same), which may be about 25 dB. That is, the increment of the volume of the hearing sound may be the same as the increment of the volume of the leakage sound. In some embodiments, the ratio threshold of the distance ratio d/d0 of the dual-point sound source may be in the range of 0-7. For example, the ratio threshold of d/d0 may be in the range of 0.5-4.5. As another example, the ratio threshold of d/d0 may be in the range of 1-4.

In some embodiments, the ratio threshold may be determined based on the change of the difference between the volume of the hearing sound and the volume of the leakage sound of the dual-point sound source in FIG. 3A. For example, the ratio of the volume of the hearing sound to the volume of the leakage sound may be determined as the ratio threshold when a maximum difference between the volume of the hearing sound and the volume of the leakage sound is reached. As shown in FIG. 3B, when the distance ratio d/d0 is less than the ratio threshold (e.g., 4), as the distance between the two point sound sources of the dual-point sound source increases, a normalized curve of a hearing sound may show an upward trend (e.g., a slope of the normalized curve is greater than 0). That is, the increment of the volume of the hearing sound may be greater than the increment of the volume of the leakage sound. When the distance ratio d/d0 is greater than the ratio threshold, as the distance between the two point sound sources of the dual-point sound source increases, the slope of the normalized curve of the hearing sound may gradually approach 0. The normalized curve of the hearing sound may be parallel to the normalized curve of the leakage sound. That is, as the distance between the two point sound sources of the dual-point sound source increases, the increment of the volume of the hearing sound may be no longer greater than the increment of the volume of the leakage sound.

Based on the description mentioned above, it can be seen that when the hearing position is constant and the parameters of the dual-point sound source may be adjusted by certain means, thereby achieving significantly increasing the volume of the near-field sound and slightly increasing the volume of the far-field leakage (that is, the increment of the volume of the near-field sound is greater than the increment of the volume of the far-field leakage). For example, two or more of dual-point sound sources (e.g., a high-frequency dual-point sound source and a low-frequency dual-point sound source) may be disposed, the distance between two point sound sources of each of the dual-point sound sources may be adjusted by a certain means, and the distance between two point sound sources of the high-frequency dual-point sound source may be less than the distance between two point sound sources of the low-frequency dual-point sound source. Due to the low-frequency dual-point sound source may have a small sound leakage (i.e., the low-frequency dual-point sound source may have a relatively strong capability to reduce the sound leakage), and the high-frequency dual-point sound source may have a relatively great sound leakage (i.e., the high-frequency dual-point sound source may have a relatively weak capability to reduce the sound leakage). The volume of the hearing sound may be significantly greater than the volume of the leakage sound when the distance between the two point sound sources of the dual-point sound source in the high-frequency band is relatively small, thereby reducing the sound leakage.

In the embodiments of the present disclosure, a distance may be between two sound guiding holes corresponding to each set of acoustic drivers, and the distance may affect the volume of the near-field sound transmitted by the acoustic output device to the user's ears and the volume of the far-field leakage transmitted by the acoustic output device to the environment. In some embodiments, when the distance between the sound guiding holes corresponding to a high-frequency acoustic driver is less than the distance between the sound guiding holes corresponding to a low-frequency acoustic driver, the volume of the hearing sound may be increased and the volume of the leakage sound may be reduced, thereby preventing the sound from being heard by others near the user of the acoustic output device. According to the above descriptions, the acoustic output device may have a better sound leakage reduction capacity and be effectively used as an open binaural earphone (e.g., the open binaural earphone 3800 in FIG. 38, an open binaural earphone 4300 in FIG. 43, etc.) even in a relatively quiet environment.

Figure 4:
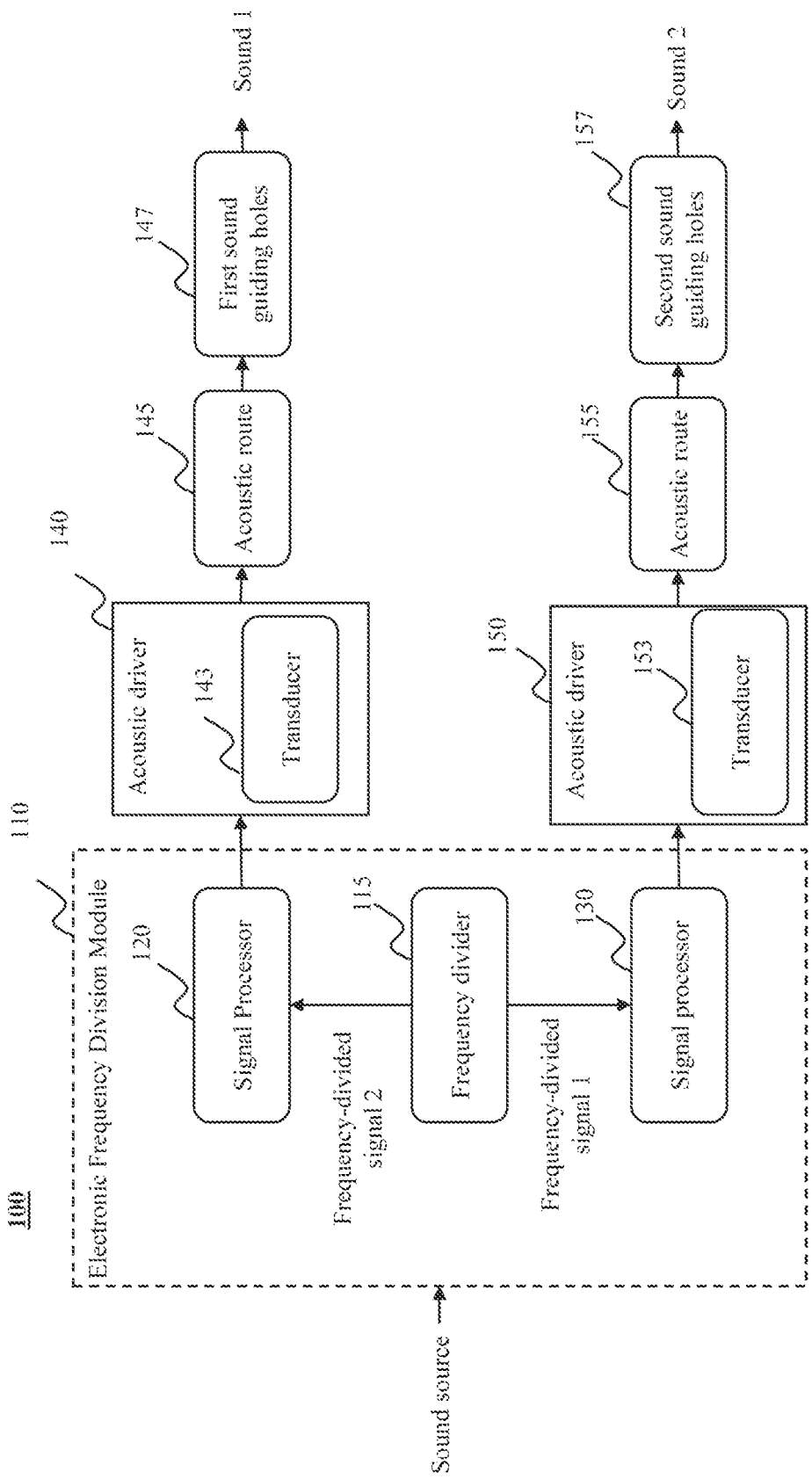
FIG. 4 is a schematic diagram illustrating an exemplary acoustic output device according to some embodiments of the present disclosure.

FIG. 4 is a schematic diagram illustrating an exemplary acoustic output device according to some embodiments of the present disclosure. As shown in FIG. 4, an acoustic output device 100 may include an electronic frequency division unit 110, an acoustic driver 140, an acoustic driver 150, an acoustic route 145, an acoustic route 155, at least two first sound guiding holes 147, and at least two second sound guiding holes 157. In some embodiments, the acoustic output device 100 may further include a controller (not shown in the figure). The electronic frequency division unit 110, as part of the controller, may be configured to generate electrical signals that are input into different acoustic drivers. The connection between different components in the acoustic output device 100 may be wired or wireless. For example, the electronic frequency division unit 110 may send signals to the acoustic driver 140 and/or the acoustic driver 150 via a wired transmission manner or a wireless transmission manner.

The electronic frequency division unit 110 may divide a frequency of a source signal (also referred to as a voice signal). The source signal may come from one or more sound source apparatuses (e.g., a memory storing audio data) integrated into the acoustic output device 100. The source signal may also be an audio signal that the acoustic output device 100 received by a wired or wireless means. In some embodiments, the electronic frequency division unit 110 may decompose the input source signal into two or more frequency-divided signals containing different frequencies. For example, the electronic frequency division unit 110 may decompose the source signal into a first frequency-divided signal (or frequency-divided signal 1) with high-frequency sound and a second frequency-divided signal (or frequency-divided signal 2) with low-frequency sound. For convenience, a frequency-divided signal with high-frequency sound may be referred to as a high-frequency signal, and a frequency-divided signal with low-frequency sound may be directly referred to as a low-frequency signal. The low-frequency signal may refer to a voice signal with frequencies in a first frequency range. The high-frequency signal may refer to a voice signal with frequencies in a second frequency range.

For the purposes of illustration, a low-frequency signal described in some embodiments of the present disclosure may refer to a voice signal with a frequency in a first frequency range with relatively low frequencies, and a high-frequency signal may refer to a voice signal with a frequency in a second frequency range with a relatively great frequencies. The first frequency range and the second frequency range may include or not include overlapping frequency ranges, and the second frequency range may include frequencies higher than the frequencies in the first frequency range. Merely by way of example, the first frequency range may include frequencies below a first frequency threshold, and the second frequency range may include frequencies above a second frequency threshold. The first frequency threshold may be lower than the second frequency threshold, equal to the second frequency threshold, or higher than the second frequency threshold. For example, the first frequency threshold may be smaller than the second frequency threshold (e.g., the first frequency threshold may be 600 Hz, and the second frequency threshold may be 700 Hz), which may indicate that there is no overlap between the first frequency range and the second frequency range. As another example, the first frequency threshold may be equal to the second frequency (e.g., both the first frequency threshold and the second frequency threshold may be 650 Hz or other frequency values). As yet another example, the first frequency threshold may be greater than the second frequency threshold, which may indicate that there is an overlap between the first frequency range and the second frequency range. In this case, a difference between the first frequency threshold and the second frequency threshold may not exceed a third frequency threshold. The third frequency threshold may be a value, for example, 20 Hz, 50 Hz, 100 Hz, 150 Hz, 200 Hz, etc., or may be a value related to the first frequency threshold and/or the second frequency threshold (e.g., 5%, 10%, 15%, etc., of the first frequency threshold). The third frequency threshold may be a value determined by a user according to the actual needs, which is not limited herein. It should be known that the first frequency threshold and the second frequency threshold may be determined according to different situations, which are limited herein.

In some embodiments, the electronic frequency division unit 110 may include a frequency divider 115, a signal processor 120, and a signal processor 130. The frequency divider 115 may be used to decompose the source signal into two or more frequency-divided signals containing different frequency components, for example, a frequency-divided signal 1 with high-frequency sound components and a frequency-divided signal 2 with low-frequency sound components. In some embodiments, the frequency divider 115 may be an electronic device that may implement the signal decomposition function, including but not limited to one of a passive filter, an active filter, an analog filter, a digital filter, or any combination thereof. In some embodiments, the frequency divider 115 may divide the sound source signal based on one or more frequency division points. A frequency division point refers to a signal frequency that distinguishes the first frequency range from the second frequency range. For example, when the first frequency range and the second frequency range include an overlapping frequency range, the frequency division point may be a feature point within the overlapping frequency range (e.g., a low-frequency boundary point, a high-frequency boundary point, a center frequency point, etc., of the overlapping frequency range). In some embodiments, the frequency division point may be determined according to a relationship (e.g., the curves shown in FIG. 2, FIG. 3A, or 3B) between a frequency and the sound leakage of the acoustic output device. For example, considering that the leakage sound of the acoustic output device may vary with a change of the frequency, a frequency point corresponding to the volume of the leakage sound that meets a certain condition may be selected as the frequency division point, for example, 1000 Hz shown in FIG. 2. More descriptions regarding the change of the leakage sounds with the frequency may be found elsewhere in the present disclosure. See, e.g., FIG. 2 and the relevant descriptions thereof. In some alternative embodiments, a user may directly determine a specific frequency as the frequency division point. For example, considering that the frequency range of sounds that a human ear can hear is 20 Hz-20 kHz, the user may select a frequency point in this range as the frequency division point. Merely by way of example, the frequency division point may be 600 Hz, 800 Hz, 1000 Hz, 1200 Hz, etc. In some embodiments, the frequency division point may be determined according to performance of the acoustic driver. For example, considering that the low-frequency acoustic driver and the high-frequency acoustic driver may have different frequency response curves, the frequency division point may be determined in a frequency range above ½ of an upper limiting frequency of the low-frequency acoustic driver and below 2 times of a low limiting frequency of the high-frequency acoustic driver. As another example, the frequency division point may be determined in a frequency range above ⅓ of the upper limiting frequency of the low-frequency acoustic driver and below 1.5 times of the low limiting frequency of the high-frequency acoustic driver. In some embodiments, in the overlapping frequency range, a position relationship between point sound sources may affect the volume produced by the acoustic output device in the near-field and the far-field. More descriptions regarding the effect of the position relationship between point sound sources on the volume produced by the acoustic output device in the near-field and the far-field may be found in International application No. PCT/CN2019/130886, filed on Dec. 31, 2019, the entire contents of which are hereby incorporated by reference.

The signal processors 120 and 130 may respectively process the frequency-divided signals to meet requirements of subsequent sound output. In some embodiments, the signal processor 120 or 130 may include one or more signal processing units. For example, the signal processor may include, but not limited to, an amplifier, an amplitude modulator, a phase modulator, a delayer, or a dynamic gain controller, or the like, or any combination thereof. Merely by way of example, the processing of the voice signal by the signal processor 120 and/or the signal processor 130 may include adjusting the amplitude corresponding to some frequencies in the voice signal. Specifically, when the first frequency range has an overlapping frequency range with the second frequency range, the signal processors 120 and 130 may adjust an intensity of the voice signal corresponding to the frequency in the overlapping frequency range (e.g., reduce the amplitude of a signal corresponding to a frequency in the overlapping frequency range), thereby avoiding excessive volume in the overlapping frequency range in the subsequent output sound caused by superposition of multiple voice signals.

After the processing operations are performed by the signal processor 120 or the signal processor 130, the frequency-divided signals may be transmitted to the acoustic drivers 140 and 150, respectively. In some embodiments, the voice signal transmitted to the acoustic driver 140 may be a voice signal including a relatively low frequency range (e.g., the first frequency range), and the acoustic driver 140 may also be referred to as a low-frequency acoustic driver. The voice signal transmitted into the acoustic driver 150 may be a voice signal including a relatively high frequency range (e.g., the second frequency range), and the acoustic driver 150 may also be referred to as a high-frequency acoustic driver. The acoustic driver 140 and the acoustic driver 150 may convert the voice signals into a low-frequency sound and a high-frequency sound, respectively, then propagate the converted sound outwards.

In some embodiments, the acoustic driver 140 may be acoustically coupled to at least two first sound guiding holes (e.g., two first sound guiding holes 147) (e.g., connected to the two first sound guiding holes 147 via two acoustic routes 145 respectively). Then the acoustic driver 140 may propagate the sound through the at least two first sound guiding holes. The acoustic driver 150 may be acoustically coupled to at least two second sound guiding holes (e.g., two second sound guiding holes 157) (e.g., connected to the two second sound guiding holes 157 via two acoustic routes 155, respectively). Then the acoustic driver 150 may propagate the sound through the at least two second sound guiding holes. Each of the sound guiding holes (e.g., the at least two first sound guiding holes or the at least two second sound guiding holes) may be a relatively small hole formed on the acoustic output device with a specific opening and allow the sound to pass through. The shape of the sound guiding hole may include but is not limited to a circle shape, an oval shape, a square shape, a trapezoid shape, a rounded quadrilateral shape, a triangle shape, an irregular shape, or the like, or any combination thereof. In addition, a count of the sound guiding holes coupled to the acoustic driver 140 or 150 may be not limited to two, which may be determined based on actual needs, for example, 3, 4, 6, or the like.

In some embodiments, in order to reduce the far-field leakage of the acoustic output device 100, the acoustic driver 140 may be used to generate low-frequency sounds with equal (or approximately equal) amplitude and opposite (or approximately opposite) phases at the at least two first sound guiding holes, respectively. The acoustic driver 150 may be used to generate high-frequency sounds with equal (or approximately equal) amplitude and opposite (or approximately opposite) phases at the at least two second sound guiding holes, respectively. In this way, the far-field leakage of low-frequency sounds (or high-frequency sounds) may be reduced according to the principle of acoustic interference cancellation. In some embodiments, according to FIG. 2, FIG. 3A, and FIG. 3B, further considering that a wavelength of the low-frequency sound is longer than that of the high-frequency sound, and in order to reduce the interference cancellation of the sound in the near-field (e.g., a position of the user's ear), a distance between the two first sound guiding holes and a distance between the two second sound guiding holes may be set to be different values. For example, assuming that there is a first distance between the two first sound guiding holes and a second distance between the two second sound guiding holes, the first distance may be longer than the second distance. In some embodiments, the first distance and the second distance may be arbitrary values. Merely by way of example, the first distance may be less than or equal to 40 millimeters, for example, the first distance may be in the range of 20 millimeters-40 millimeters. The second distance may be less than or equal to 12 millimeters, and the first distance may be longer than the second distance. In some embodiments, the first distance may be greater than or equal to 12 millimeters, and the second distance may be less than or equal to 7 mm, for example, in the range of 3 millimeters-7 millimeters. In some embodiments, the first distance may be 30 millimeters, and the second distance may be 5 millimeters. In some embodiments, the first distance may be at least twice of the second distance. In some embodiments, the first distance may be at least 3 times of the second distance. In some embodiments, the first distance may be at least 5 times of the second distance.

As shown in FIG. 4, the acoustic driver 140 may include a transducer 143. The transducer 143 may transmit sound to the first sound guiding holes 147 through the acoustic route 145. The acoustic driver 150 may include a transducer 153. The transducer 153 may transmit sound to the second sound guiding holes 157 through the acoustic route 155. In some embodiments, the transducer (e.g., the transducer 143 or the transducer 153) may include, but not be limited to, a transducer of a gas-conducting acoustic output device, a transducer of a bone-conducting acoustic output device, a hydroacoustic transducer, an ultrasonic transducer, or the like, or any combination thereof. In some embodiments, the transducer may be of a moving coil type, a moving iron type, a piezoelectric type, an electrostatic type, or a magneto strictive type, or the like, or any combination thereof.

In some embodiments, the acoustic drivers (e.g., the low-frequency acoustic driver 140, the high-frequency acoustic driver 150) may include transducers with different properties or numbers. For example, each of the low-frequency acoustic driver 140 and the high-frequency acoustic driver 150 may include a transducer (e.g., a low-frequency speaker unit and a high-frequency speaker unit) having different frequency response characteristics. As another example, the low-frequency acoustic driver 140 may include two transducers (e.g., two low-frequency speaker units), and the high-frequency acoustic driver 150 may include two transducers 153 (e.g., two high-frequency speaker units).

In some alternative embodiments, the acoustic output device 100 may generate sound with different frequency ranges by other means, such as transducer frequency division, acoustic route frequency division, or the like. When the acoustic output device 100 uses a transducer or an acoustic route to divide the sound, the electronic frequency division unit 110 (a part inside the dotted box) may be omitted, and the voice signal may be transmitted to the acoustic driver 140 and the acoustic driver 150.

In some alternative embodiments, the acoustic output device 100 may use a transducer to achieve signal frequency division, the acoustic driver 140 and the acoustic driver 150 may convert the input sound source signal into a low-frequency sound and a high-frequency sound, respectively. Specifically, through the transducer 143 (such as a low-frequency speaker), the low-frequency acoustic driver 140 may convert the voice signal into the low-frequency sound with low-frequency components. In some embodiments, at least two first acoustic routes may be formed between the at least one low-frequency acoustic driver and the at least two first sound guiding holes. The low-frequency sound may be transmitted to the at least two first sound guiding holes 147 along at least two different acoustic routes (i.e., at least two first acoustic routes). Then the low-frequency sound may be propagated outwards through the first sound guiding holes 147. Through the transducer 153 (such as a high-frequency speaker), the high-frequency acoustic driver 150 may convert the voice signal into the high-frequency sound with high-frequency components. In some embodiments, at least two second acoustic routes may be formed between the at least one high-frequency acoustic driver and the at least two second sound guiding holes. The high-frequency sound may be transmitted to the at least two second sound guiding holes 157 along at least two different acoustic routes (i.e., the at least two second acoustic routes). Then the high-frequency sound may be propagated outwards through the second sound guiding holes 157. In some embodiments, the at least two first acoustic routes and the at least two second acoustic routes may have different frequency selection characteristics. As used herein, the frequency selection characteristic of an acoustic route refers to that a sound signal with a predetermined frequency range may be passed through the acoustic route. The frequency selection characteristic of an acoustic route may include the predetermined frequency range within which a sound can pass through the acoustic route. For example, a sound with low-frequency components within a first frequency range may be passed through the at least two first acoustic routes and a sound with high-frequency components within a second frequency range may be passed through the at least two second acoustic routes. The first frequency range may include frequencies less than frequencies in the second frequency range. In some embodiments, the first frequency range may include a maximum frequency that is less than or equal to the minimum frequency in the second frequency range. In some embodiments, the first frequency range may include the maximum frequency that exceeds the minimum frequency in the second frequency range and less than the maximum frequency in the second frequency range. In some embodiments, the at least two first acoustic routes may have different frequency selection characteristics. In some embodiments, the at least two first acoustic routes may have the same frequency selection characteristic. In some embodiments, the at least two second acoustic routes may have different frequency selection characteristics. In some embodiments, the at least two second acoustic routes may have the same frequency selection characteristic.

In some alternative embodiments, an acoustic route (e.g., the acoustic route 145 and the acoustic route 155) connecting a transducer and sound guiding holes may affect the nature of the transmitted sound. For example, an acoustic route may attenuate or change a phase of the transmitted sound to some extent. In some embodiments, an acoustic route may include a sound tube, a sound cavity, a resonance cavity, a sound hole, a sound slit, or a tuning network, or the like, or any combination thereof. In some embodiments, the acoustic route (e.g., at least one of the at least two first acoustic routes, at least one of the at least two second acoustic routes, etc.) may also include an acoustic resistance material, which may have a specific acoustic impedance. For example, the acoustic impedance may be in the range of 5 MKS Rayleigh to 500 MKS Rayleigh. The acoustic resistance materials may include, but not be limited to, plastic, textile, metal, permeable material, woven material, screen material or mesh material, porous material, particulate material, polymer material, or the like, or any combination thereof. By setting the acoustic routes with different acoustic impedances, the acoustic output of the transducer may be acoustically filtered, such that the sounds output through different acoustic routes may have different frequency components.

In some alternative embodiments, the acoustic output device 100 may utilize acoustic routes to achieve signal frequency division. Specifically, the source signal may be input into a specific acoustic driver and converted into a sound containing high and low-frequency components. The voice signal may be propagated along acoustic routes having different frequency selection characteristics. For example, the voice signal may be propagated along the acoustic route with a low-pass characteristic to the corresponding sound guiding hole to generate low-frequency sound. In this process, the high-frequency sound may be absorbed or attenuated by the acoustic route with a low-pass characteristic. Similarly, the voice signal may be propagated along the acoustic route with a high-pass characteristic to the corresponding sound guiding hole to generate a high-frequency sound. In this process, the low-frequency sound may be absorbed or attenuated by the acoustic route with the high-pass characteristic.

In some embodiments, the acoustic output device 100 may include a controller (not shown in figure). The controller may cause the low-frequency acoustic driver 140 to output a sound in the first frequency range (i.e., low-frequency sound), and cause the high-frequency acoustic driver 150 to output a sound in the second frequency range (i.e., high-frequency sound). In some embodiments, the acoustic output device 100 may also include a supporting structure. The supporting structure may be used to support the acoustic driver (such as the high-frequency acoustic driver 150, the low-frequency acoustic driver 140, etc.), so that the sound guiding holes corresponding to the acoustic driver is positioned away from the user's ear. In some embodiments, the sound guiding holes (e.g., the at least two second sound guiding holes) acoustically coupled with the high-frequency acoustic driver 150 may be located closer to an expected position of the user's ear (e.g., the ear canal entrance), while the sound guiding holes (e.g., the at least two first sound guiding holes) acoustically coupled with the low-frequency acoustic driver 140 may be located further away from the expected position. For example, a distance between the sound guiding holes (e.g., the at least two second sound guiding holes) acoustically coupled with the high-frequency acoustic driver 150 and the expected position of the user's ear may be less than a first distance threshold, and a distance between the sound guiding holes (e.g., the at least first second sound guiding holes) acoustically coupled with the low-frequency acoustic driver 140 and the expected position of the user's ear may be greater than a second distance threshold. The first distance threshold and/or the second distance threshold may be determined according to an actual need. The first distance threshold may be less than the second distance threshold.

In some embodiments, the supporting structure may be used to package the acoustic driver. The supporting structure of the packaged acoustic driver may be a housing made of various materials such as plastic, metal, tape, etc. The housing may encapsulate the acoustic driver and form a front chamber and a rear chamber corresponding to the acoustic driver. For example, the low-frequency acoustic driver may be encapsulated by a first housing, and the first housing may define a front chamber and a rear chamber of the low-frequency acoustic driver. As another example, the high-frequency acoustic driver may be encapsulated by a second housing, and the second housing may define a front chamber and a rear chamber of the high-frequency acoustic driver. In some embodiments, the second housing may be the same as or different from the first housing. The front chamber may be acoustically coupled to one of the at least two sound guiding holes. The rear chamber may be acoustically coupled to the other of the at least two sound guiding holes. For example, the front chamber of the low-frequency acoustic driver 140 may be acoustically coupled to one of the at least two first sound guiding holes 147. The rear chamber of the low-frequency acoustic driver 140 may be acoustically coupled to the other of the at least two first sound guiding holes 147. The front chamber of the high-frequency acoustic driver 150 may be acoustically coupled to one of the at least two second sound guiding holes 157. The rear chamber of the high-frequency acoustic driver 150 may be acoustically coupled to the other of the at least two second sound guiding holes 157. As used herein, a front chamber of a housing refers to a space (also referred to as a route) between the acoustic driver and one of the at least two sound guiding holes acoustically coupled to the acoustic driver, which is encapsulated by the housing. A rear chamber of the housing refers to a route between the acoustic driver and the other of the at least two sound guiding holes. For example, the front chamber of the low-frequency acoustic driver 140 may be a space between the low-frequency acoustic driver 140 and one of the first sounding sound guiding holes 147, which is encapsulated by the housing (e.g., the first housing). The rear chamber of the low-frequency acoustic driver 140 may be a space between the low-frequency acoustic driver 140 and the other of the first sounding sound guiding holes 147, which is encapsulated by the housing (e.g., the first housing). As another example, the front chamber of the high-frequency acoustic driver 150 may be a space between the high-frequency acoustic driver 150 and one of the first sounding sound guiding holes 157, which is encapsulated by the housing (e.g., the second housing). The rear chamber of the high-frequency acoustic driver 150 may be a space between the high-frequency acoustic driver 150 and the other of the first sounding sound guiding holes 157, which is encapsulated by the housing (e.g., the second housing). In some embodiments, the sound guiding holes (e.g., the first sound guiding holes 147 and the second sound guiding holes 157) may be disposed on the housing.

The above descriptions of the acoustic output device 100 may be merely some examples. Those skilled in the art may make adjustments and changes to the structure, quantity, etc. of the acoustic driver, which is not limiting in the present disclosure. In some embodiments, the acoustic output device 100 may include any number of the acoustic driver structures. For example, the acoustic output device 100 may include two sets of the high-frequency acoustic drivers 150 and two sets of the low-frequency acoustic drivers 140, or one set of the high-frequency acoustic drives 150 and two sets of the low-frequency acoustic drivers 140, and these high-frequency/low-frequency drivers may be used to generate a sound in a specific frequency range. As another example, the acoustic driver 140 and/or the acoustic driver 150 may include an additional signal processor. The signal processor may have the same or different structural components as the signal processor 120 or the signal processor 130.

It should be noted that the acoustic output device and its modules are shown in FIG. 4 may be implemented in various ways. For example, in some embodiments, the system and the modules may be implemented by hardware, software, or a combination of both. The hardware may be implemented by a dedicated logic. The software may be stored in the storage which may be executed by a suitable instruction execution system, for example, a microprocessor or dedicated design hardware. It will be appreciated by those skilled in the art that the above methods and systems may be implemented by computer-executable instructions and/or embedded in the control codes of a processor. For example, the control codes may be provided by a medium such as a disk, a CD, or a DVD-ROM, a programmable memory device, such as a read-only memory (e.g., firmware), or a data carrier such as an optical or electric signal carrier. The system and the modules in the present disclosure may be implemented not only by a hardware circuit in a programmable hardware device in an ultra-large scale integrated circuit, a gate array chip, a semiconductor such a logic chip or a transistor, a field programmable gate array, or a programmable logic device. The system and the modules in the present disclosure may also be implemented by software to be performed by various processors, and further also by a combination of hardware and software (e.g., firmware).

It should be noted that the above description of the acoustic output device 100 and its components is only for the convenience of description, and not intended to limit the scope of the present disclosure. It should be understood that, for those skilled in the art, after understanding the principle of the apparatus, it is possible to combine each unit or form a substructure to connect with other units arbitrarily without departing from this principle. For example, the signal processor 120 or the signal processor 130 may be a part independent of the electronic frequency division unit 110. Those modifications may fall within the scope of the present disclosure.

Figure 5:
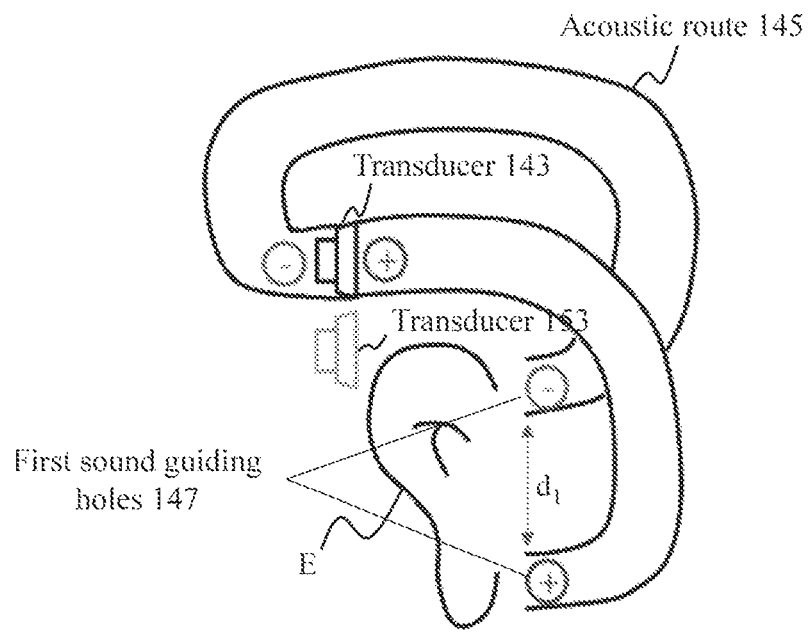
FIG. 5 is a schematic diagram illustrating an exemplary acoustic output device according to some embodiments of the present disclosure.
Figure 5:
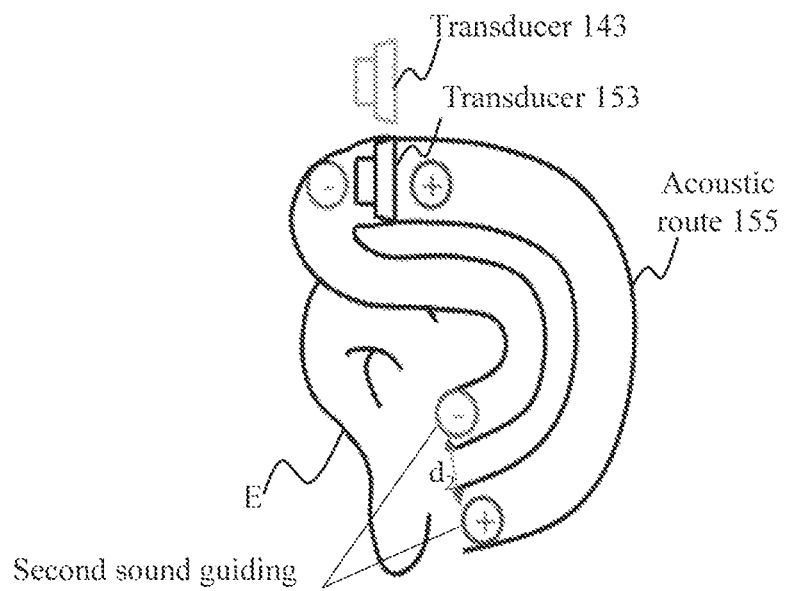

FIG. 5 is a schematic diagram illustrating an exemplary acoustic output device according to some embodiments of the present disclosure. For the purpose of illustration, an outward propagating sound formed by the same transducer coupled with different sound guiding holes may be described as an example. In FIG. 5, each transducer may have a front side and a rear side, and a corresponding front chamber (i.e., a first acoustic route) and a rear chamber (i.e., a second acoustic route) may exist on the front side or the rear side of the transducer, respectively. In some embodiments, the front chamber and the rear chamber may have the same or the substantially same equivalent acoustic impedance, such that the transducers may be loaded symmetrically. The symmetrical load of the transducer may form sound sources satisfy an amplitude and phase relationship at different sound guiding holes (such as the "two point sound sources" having the same amplitude and opposite phases as described above), such that a specific sound field may be formed in high-frequency and/or low-frequency (e.g., a near-field sound may be enhanced and a far-field leakage may be suppressed).

As shown in FIG. 5, the acoustic driver (e.g., the acoustic driver 140 or 150) may include transducers, and acoustic routes and sound guiding holes connected to the transducer. In order to describe the actual application scenarios of the acoustic output device 300 more clearly, a position of the user's ear E may also be shown in FIG. 5 for the explanation. FIG. (a) in FIG. 5 illustrates an application scenario of the acoustic driver 140. The acoustic driver 140 may include a transducer 143, and the transducer 143 may be coupled with two first sound guiding holes 147 through an acoustic route 145. FIG. (b) in FIG. 5 illustrates an application scenario of the acoustic driver 150. The acoustic driver 150 may include a transducer 153, and the transducer 153 may be coupled with two second sound guiding holes 157 through an acoustic route 155.

The transducer 143 or 153 may vibrate under the driving of an electric signal, and the vibration may generate sound with equal amplitudes and opposite phases (180 degrees inversion). The type of transducer may include, but not limited to, an air conduction speaker, a bone conduction speaker, a hydroacoustic transducer, an ultrasonic transducer, or the like, or any combination thereof. The transducer may be of a moving coil type, a moving iron type, a piezoelectric type, an electrostatic type, a magneto strictive type, or the like, or any combination thereof. In some embodiments, the transducer 143 or 153 may include a vibration diaphragm, which may vibrate when driven by an electrical signal, and the front and rear sides of the vibration diaphragm may simultaneously output a normal-phase sound and a reverse-phase sound. In FIG. 5, "+" and "−" may be used to exemplify sounds with different phases, wherein "+" may represent a normal-phase sound, and "−" may represent a reverse-phase sound.

In some embodiments, the transducer may be encapsulated by a housing (e.g., a supporting structure), and the interior of the housing may be provided with sound channels connected to the front and rear sides of the transducer, respectively, thereby forming an acoustic route. For example, the front cavity of the transducer 143 may be coupled to one of the two first sound guiding holes 147 through a first acoustic route (i.e., the first half of the acoustic route 145), and the rear cavity of the transducer 143 may acoustically be coupled to the other sound guiding hole of the two first sound guiding holes 147 through a second acoustic route (i.e., the second half of the acoustic route 145). Normal-phase sound and reverse-phase sound that output from the transducer 143 may be output from the two first sound guiding holes 147, respectively. As another example, the front cavity of the transducer 153 may be coupled to one of the two sound guiding holes 157 through a third acoustic route (i.e., the first half of the acoustic route 155), and the rear cavity of the transducer 153 may be coupled to another sound guiding hole of the two second sound guiding holes 157 through a fourth acoustic route (i.e., the second half of the acoustic route 155). The normal-phase sound and the reverse-phase sound output from the transducer 153 may be output from the two second sound guiding holes 157, respectively.

In some embodiments, acoustic routes may affect the nature of the transmitted sound. For example, an acoustic route may attenuate or change the phase of the transmitted sound to some extent. In some embodiments, the acoustic route may be composed of one of a sound tube, a sound cavity, a resonance cavity, a sound hole, a sound slit, a tuning network, or the like, or any combination of. In some embodiments, the acoustic route may also include an acoustic resistance material, which may have a specific acoustic impedance. For example, the acoustic impedance may be in the range of 5 MKS Rayleigh to 500 MKS Rayleigh. In some embodiments, the acoustic resistance material may include, but not limited to, one of plastics, textiles, metals, permeable materials, woven materials, screen materials, and mesh materials, or the like, or any combination of. In some embodiments, in order to prevent the sound transmitted by the acoustic driver's front chamber and rear chamber from being disturbed (or the same change caused by disturbance), the front chamber and rear chamber corresponding to the acoustic driver may be set to have approximately the same equivalent acoustic impedance. For example, the same acoustic resistance material, the sound guiding holes with the same size or shape, etc., may be used.

A distance between the two first sound guiding holes 147 of the low-frequency acoustic driver may be expressed as $d_1$ (i.e., a first distance). The distance between the two second sound guiding holes 157 of the high-frequency acoustic driver may be expressed as $d_2$ (i.e., a second distance). By setting the distance between the sound guiding holes corresponding to the low-frequency acoustic driver and the high-frequency acoustic driver, a higher sound volume output in the low-frequency band and a stronger ability to reduce the sound leakage in the high-frequency band may be achieved. For example, the distance between the two first sound guiding holes 147 is greater than the distance between the two second sound guiding holes 157 (i.e., $d_1 > d_2$).

In some embodiments, the transducer 143 and the transducer 153 may be housed together in a housing of an acoustic output device, and be placed in isolation in a structure of the housing.

In some embodiments, the acoustic output device 300 may include multiple sets of high-frequency acoustic drivers and low-frequency acoustic drivers. For example, the acoustic output device 300 may include a group of high-frequency acoustic drivers and a group of low-frequency acoustic drivers for simultaneously outputting sound to the left and/or right ears. As another example, the acoustic output device may include two groups of high-frequency acoustic drivers and two groups of low-frequency acoustic drivers, wherein one group of high-frequency acoustic drivers and one group of low-frequency acoustic drivers may be used to output sound to a user's left ear, and the other set of high-frequency acoustic drivers and low-frequency acoustic drivers may be used to output sound to a user's right ear.

In some embodiments, the high-frequency acoustic driver and the low-frequency acoustic driver may be configured to have different powers. In some embodiments, the low-frequency acoustic driver may be configured to have a first power, the high-frequency acoustic driver may be configured to have a second power, and the first power may be greater than the second power. In some embodiments, the first power and the second power may be arbitrary values.

Figure 6A:
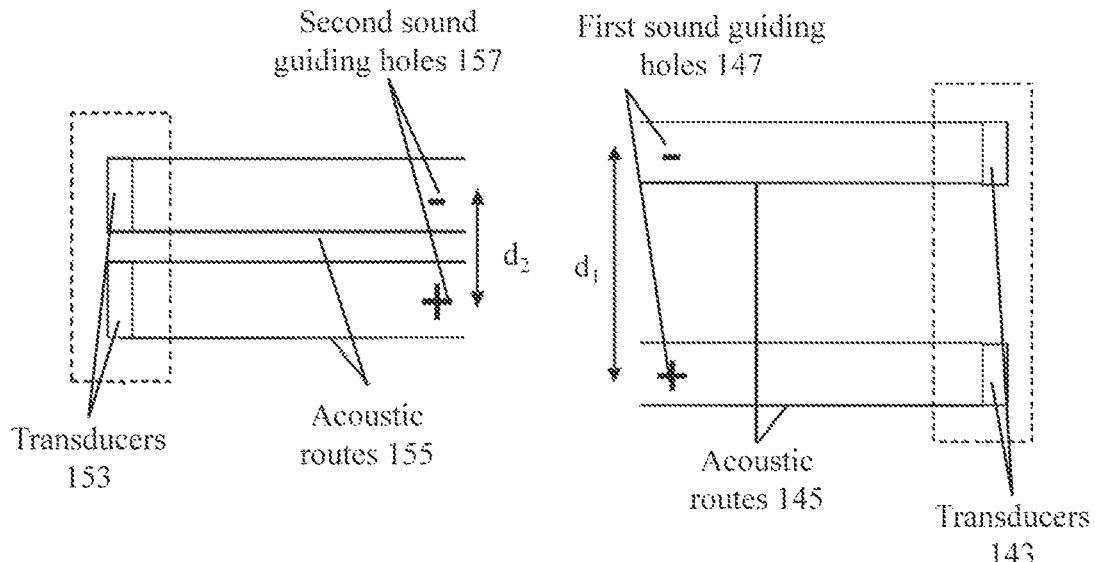
FIG. 6A is a schematic diagram illustrating a process for sound output according to some embodiments of the present disclosure.
Figure 6B:
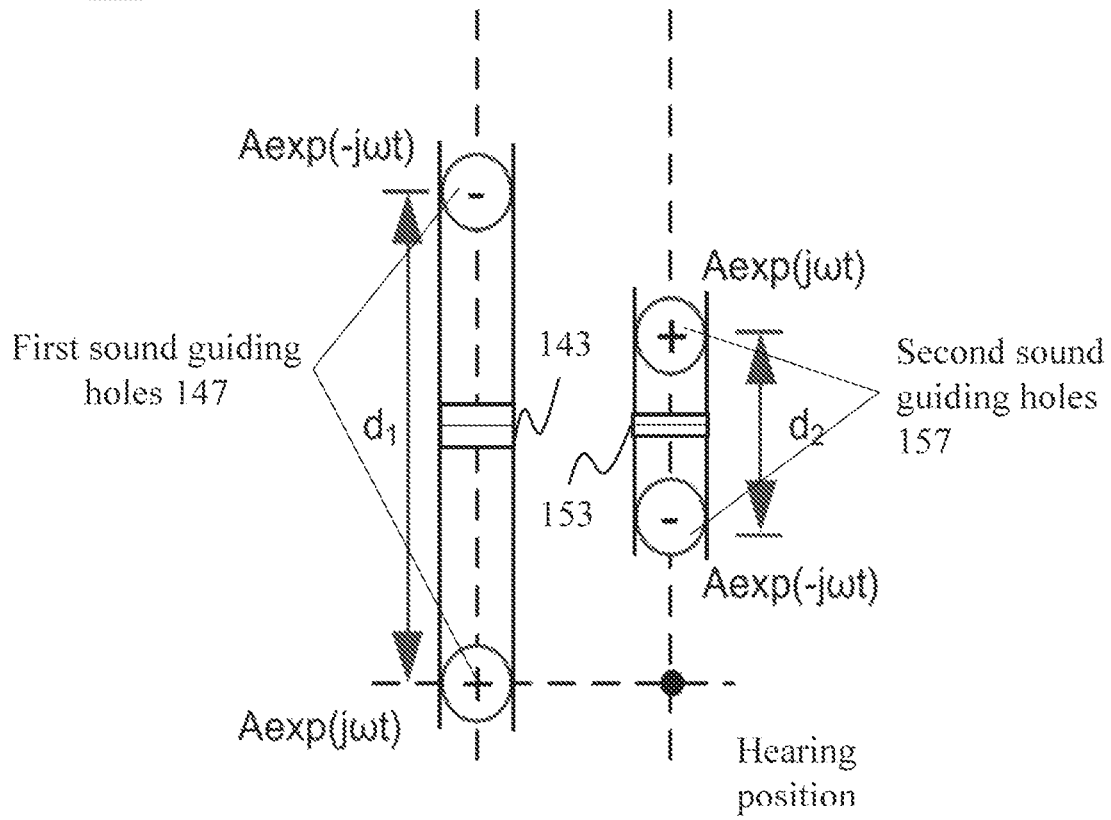
FIG. 6B is a schematic diagram illustrating another process for sound output according to some embodiments of the present disclosure.

FIG. 6A is a schematic diagram illustrating a process for sound output according to some embodiments of the present disclosure. FIG. 6B is a schematic diagram illustrating another process for sound output according to some embodiments of the present disclosure.

In some embodiments, the acoustic output device may generate sounds in the same frequency range through two or more transducers, and the sounds may propagate outwards through different sound guiding holes. In some embodiments, different transducers may be controlled by the same or different controllers, respectively, and may produce sounds that satisfy certain phase and amplitude conditions (e.g., sounds with the same amplitude but opposite phases, sounds with different amplitudes and opposite phases, etc.). For example, the controller may make the electrical signals input to the two low-frequency transducers of the acoustic driver have the same amplitude and opposite phases. In this way, when a sound is formed, the two low-frequency transducers may output low-frequency sounds with the same amplitude but opposite phases.

Specifically, the two transducers in the acoustic driver (such as the low-frequency acoustic driver 140 and the high-frequency acoustic driver 150) may be arranged side by side in an acoustic output device, one of which may be used to output normal-phase sound, and the other may be used to output reverse-phase sound. As shown in FIG. 6A, the acoustic driver 140 on the right may include two transducers 143, two acoustic routes 145, and two first sound guiding holes 147. The acoustic driver 150 on the left may include two transducers 153, two acoustic routes 155, and two second sound guiding holes 157. Driven by electrical signals with opposite phases, the two transducers 143 may generate a set of low-frequency sounds with opposite phases (180 degrees inversion). One of the two transducers 143 may output normal-phase sound (such as the transducer located below), and the other may output reverse-sound (such as the transducer located above). The two sets of low-frequency sounds with opposite phases may be transmitted to the two first sound guiding holes 147 along the two acoustic routes 145, respectively, and propagate outwards through the two first sound guiding holes 147. Similarly, driven by electrical signals with opposite phases, the two transducers 153 may generate a set of high-frequency sounds with opposite phases (180 degrees inversion). One of the two transducers 153 may output normal-phase high-frequency sound (such as the transducer located below), and the other may output a reverse-phase high-frequency sound (such as the transducer located above). The high-frequency sound with opposite phases may be transmitted to the two second sound guiding holes 157 along the two acoustic routes 155, respectively, and propagate outwards through the two second sound guiding holes 157.

In some embodiments, the two transducers in the acoustic driver (e.g., the low-frequency acoustic driver 140 and the high-frequency acoustic driver 150) may be arranged relatively close to each other along the same straight line, and one of them may be used to output a normal-phase sound and the other may be used to output a reverse-sound. As shown in FIG. 6B, the left side may be the acoustic driver 140, and the right side may be the acoustic driver 150. The two transducers 143 of the acoustic driver 140 may generate a set of low-frequency sounds of equal amplitude and opposite phases under the control of the controller, respectively. One of the transducers may output normal low-frequency sound, and transmit the normal low-frequency sound along a first acoustic route to a first sound guiding hole. The other transducer may output reverse-phase low-frequency sound, and transmit the reverse-phase low-frequency sound along the second acoustic route to another first sound guiding hole. The two transducers 153 of the acoustic driver 150 may generate high-frequency sound of equal amplitude and opposite phases under the control of the controller, respectively. One of the transducers may output normal-phase high-frequency sound, and transmit the normal-phase high-frequency sound along a third acoustic route to a second sound guiding hole. The other transducer may output reverse-phase high-frequency sound, and transmit the reverse-phase high-frequency sound along the fourth acoustic route to another second sound guiding hole.

In some embodiments, the transducer 143 and/or the transducer 153 may be of various suitable types. For example, the transducer 143 and the transducer 153 may be dynamic coil speakers, which may have the characteristics of a high sensitivity in low-frequency, a large dive depth of low-frequency, and a small distortion. As another example, the transducer 143 and the transducer 153 may be moving iron speakers, which may have the characteristics of a small size, a high sensitivity, and a large high-frequency range. As another example, the transducers 143 and 153 may be air-conducted speakers, or bone-conducted speakers. As another example, the transducer 143 and the transducer 153 may be balanced armature speakers. In some embodiments, the transducer 143 and the transducer 153 may be different types of transducers. For example, the transducer 143 may be a moving iron speaker, and the transducer 153 may be a moving coil speaker. As another example, the transducer 1043 may be a moving coil speaker, and the transducer 1053 may be a moving iron speaker.

In FIGS. 6A and 6B, the distance between the two point sound sources of the acoustic driver 140 may be $d_1$, and the distance between the two point sound sources of the acoustic driver 150 may be $d_2$, and $d_1$ may be greater than $d_2$. As shown in FIG. 6B, the hearing position (that is, the position of the ear canal when the user wears an acoustic output device) may be located on a line of a set of two point sound sources. In some alternative embodiments, the hearing position may be any suitable position. For example, the hearing position may be located on a circle centered on the center point of the two point sound sources. As another example, the hearing position may be on the same side of two sets two point sound sources connection, or in the middle of a line connecting the two sets two point sound sources.

It should be understood that the simplified structure of the acoustic output device shown in FIGS. 6A and 6B may be merely by way of example, which may be not a limitation for the present disclosure. In some embodiments, the acoustic output device 400 and/or 500 may include a supporting structure, a controller, a signal processor, or the like, or any combination thereof.

Figure 7A:
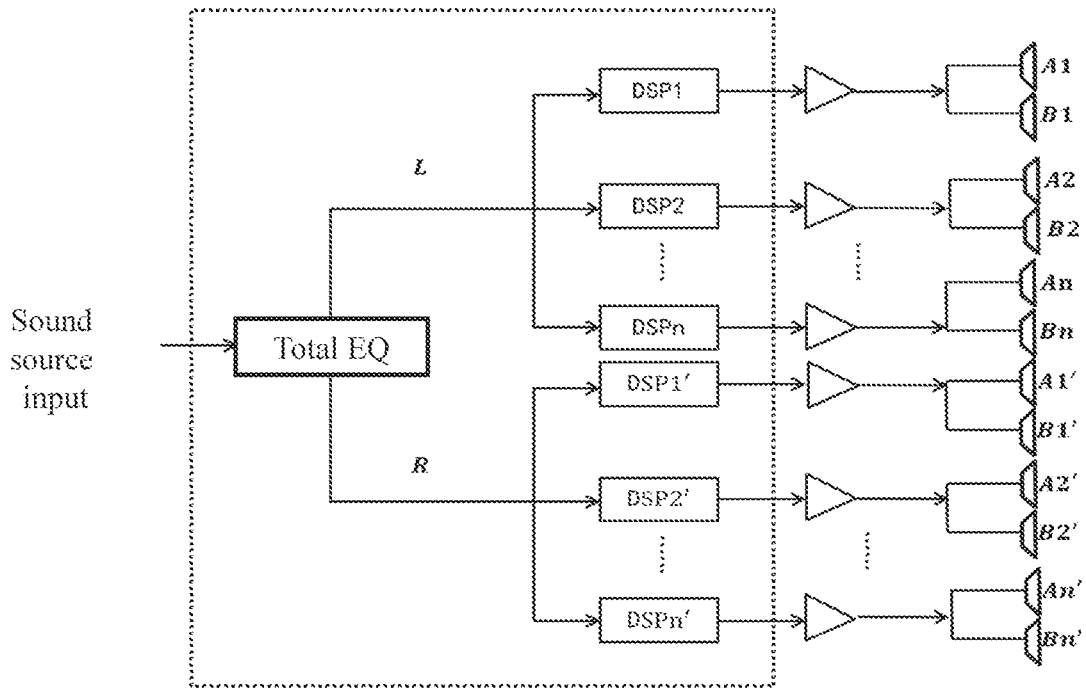
FIG. 7A is a schematic diagram illustrating an acoustic output device according to some embodiments of the present disclosure.
Figure 7B:
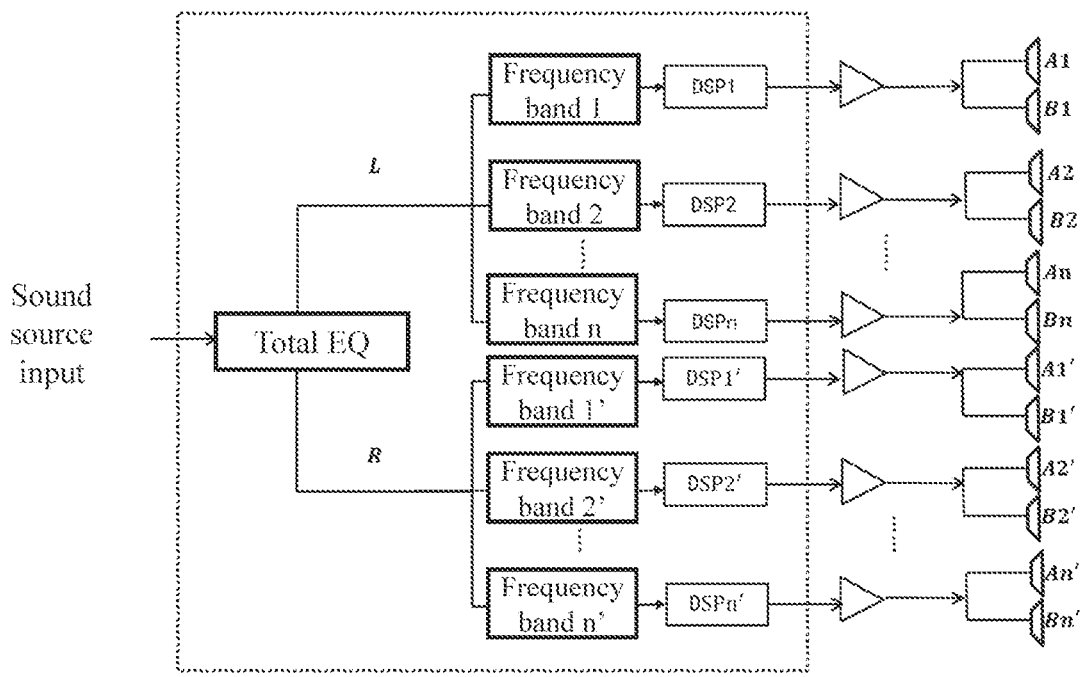
FIG. 7B is a schematic diagram illustrating another acoustic output device according to some embodiments of the present disclosure.

FIG. 7A is a schematic diagram illustrating an acoustic output device according to some embodiments of the present disclosure. FIG. 7B is a schematic diagram illustrating another acoustic output device according to some embodiments of the present disclosure.

In some embodiments, acoustic drivers (e.g., acoustic drivers 140 or 150) may include multiple groups of narrow-band speakers. As shown in FIG. 7A, the acoustic output device may include a plurality of groups of narrow-band speaker units and a signal processing unit. On the left or right side of the user, the acoustic output device may include n groups, respectively, with a total number of 2*n narrow-band speaker units. Each group of narrow-band speaker units may have different frequency response curves, and the frequency response of each group may be complementary and may collectively cover the audible sound frequency band. The narrow-band speaker herein may be an acoustic driver with a narrower frequency response range than the low-frequency acoustic driver and high-frequency acoustic driver. Taking the speaker unit located on the left side of the user shown in FIG. 7A as an example: A1~An and B1~Bn form n groups of two point sound sources, respectively. When the same electrical signal is an input, each two point sound sources may generate sound with different frequency ranges. By setting the distance dn of each two point sound sources, the near-field and far-field sound of each frequency band may be adjusted. For example, in order to enhance the volume of near-field sound and reduce the volume of far-field leakage, the distance between the higher-frequency two point sound sources may be less than the distance of the lower-frequency two point sound sources.

In some embodiments, the signal processing unit may include an Equalizer (EQ) processing unit, and a Digital Signal Processor (DSP) processing unit. The signal processing unit may be used to implement signal equalization and other general digital signal processing algorithms (such as amplitude modulation and equal modulation). The processed signal may output sound by being connected to a corresponding acoustic driver (e.g., a narrow-band speaker) structure. In some embodiments, the narrow-band speaker may be a dynamic moving coil speaker or a moving iron speaker. In some embodiments, the narrow-band speaker may be a balanced armature speaker. Two point sound sources may be constructed using two balanced armature speakers, and the sound output from the two speakers may be in opposite phases.

In some embodiments, the acoustic drivers (such as acoustic drivers 140 or 150) may include multiple groups of full-band speakers. As shown in FIG. 7B, the acoustic output device may include a plurality of sets of full-band speaker units and a signal processing unit. On the left or right side of the user, the acoustic output device may include n groups, respectively, with a total number of 2*n full-band speaker units. Each full-band speaker unit may have the same or similar frequency response curve, and may cover a wide frequency range.

Taking the speaker unit located on the left side of the user as shown in FIG. 7B as an example: A1~An and B1~Bn form n dual-point sound sources, respectively. The difference from FIG. 7A may be that the signal processing unit in FIG. 7B may include at least one set of filters for frequency division of the sound source signal, and the electric signals corresponding to different frequency ranges may be input into each group of full-band speakers. In this way, each group of speaker units (similar to the dual-point sound sources) may produce sounds with different frequency ranges separately.

Figure 8A:
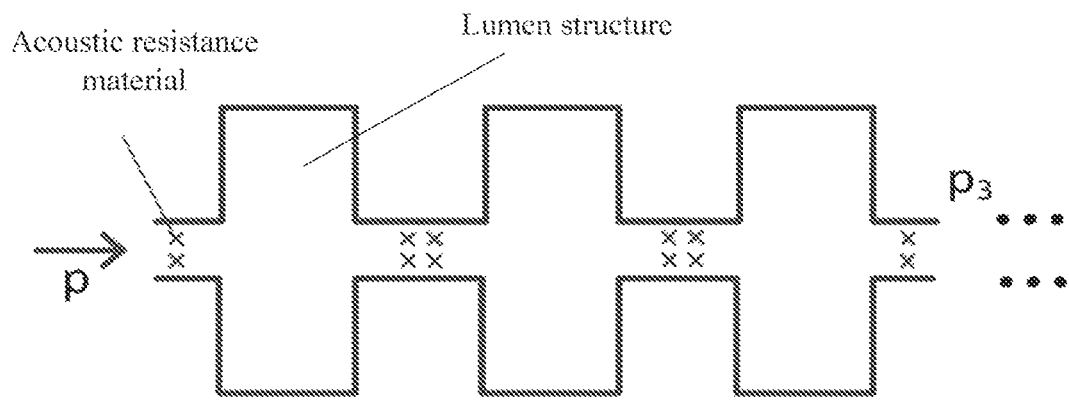
FIG. 8A is a schematic diagram illustrating an acoustic route according to some embodiments of the present disclosure.
Figure 8B:
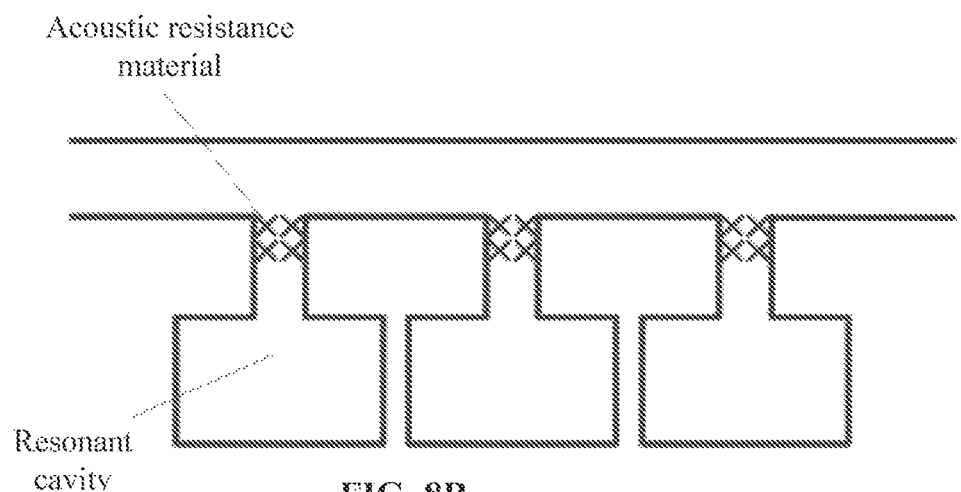
FIG. 8B is a schematic diagram illustrating another acoustic route according to some embodiments of the present disclosure.
Figure 8C:
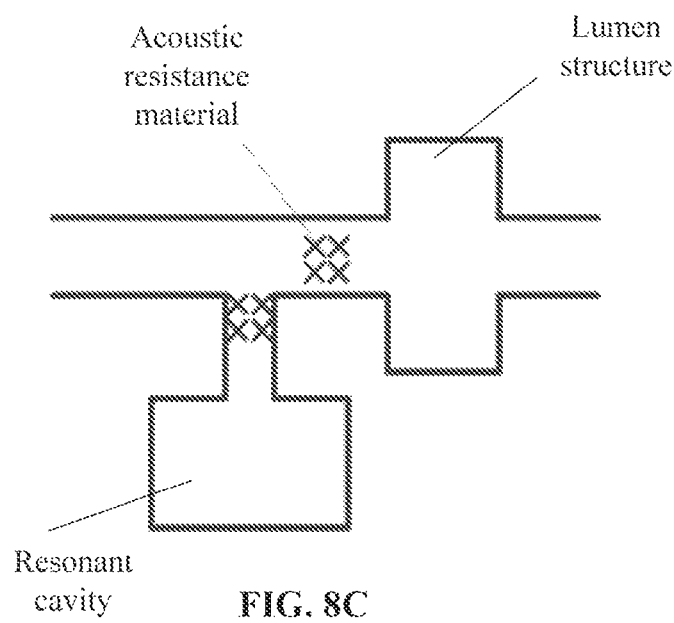
FIG. 8C is a schematic diagram illustrating a further acoustic route according to some embodiments of the present disclosure.

FIG. 8A is a schematic diagram illustrating an acoustic route according to some embodiments of the present disclosure. FIG. 8B is a schematic diagram illustrating another acoustic route according to some embodiments of the present disclosure. FIG. 8C is a schematic diagram illustrating a further acoustic route according to some embodiments of the present disclosure.

As described above, a corresponding acoustic filtering network may be constructed by setting structures such as a sound tube, a sound cavity, and a sound resistance in an acoustic route to achieve frequency division of sound. FIGS. 8A-8C show a schematic structural diagram of frequency division of a voice signal using an acoustic route. It should be noted that FIGS. 8A-8C may be examples of setting the acoustic route when using the acoustic route to divide the voice signal, and may not be a limitation on the present disclosure.

As shown in FIG. 8A, an acoustic route may be composed of one or more groups of lumen structures connected in series, and an acoustic resistance material may be provided in the lumen to adjust the acoustic impedance of the entire structure to achieve a filtering effect. In some embodiments, a band-pass filtering or a low-pass filtering may be performed on the sound by adjusting the size of the structures in the lumen and the acoustic resistance material to achieve frequency division of the sound. As shown in FIG. 8B, a structure with one or more sets of resonant cavities (e.g., Helmholtz cavity) may be constructed on the acoustic route branch, and the filtering effect may be achieved by adjusting the size of each structure and the acoustic resistance material. As shown in FIG. 8C, a combination of a lumen and a resonant cavity (e.g., a Helmholtz cavity) structure may be constructed in an acoustic route, and a filtering effect may be achieved by adjusting the size of each structure and the acoustic resistance material.

Figure 9:
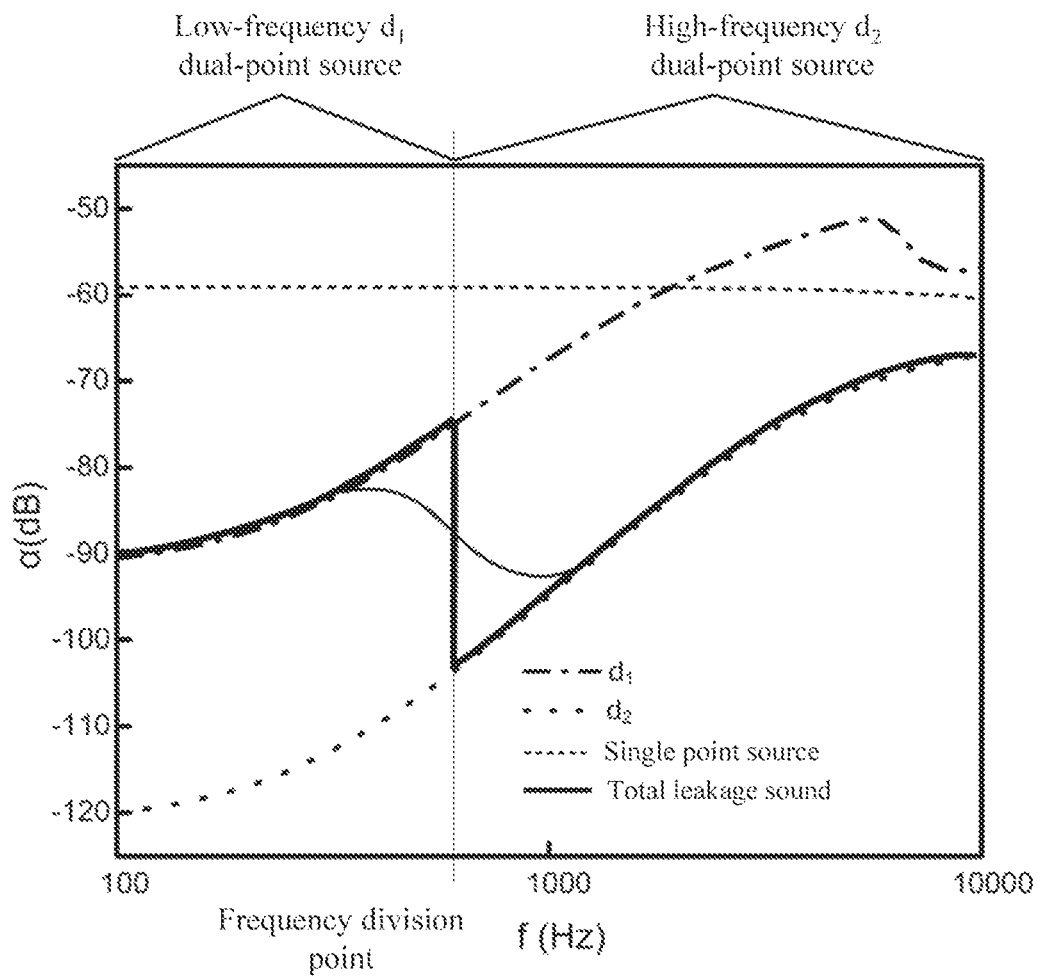
FIG. 9 is an exemplary graph illustrating sound leakage under a combined action of two sets of dual-point sound sources according to some embodiments of the present disclosure.

FIG. 9 is an exemplary graph illustrating sound leakage under a combined action of two sets of dual-point sound sources according to some embodiments of the present disclosure.

FIG. 9 shows a curve of the sound leakage of an acoustic output device (e.g., the acoustic output device 100, the acoustic output device 400, the acoustic output device 500, the acoustic output device 600, etc.) under the combined action of two sets of dual-point sound sources (e.g., a set of high-frequency dual-point sound source and a set of low-frequency dual-point sound source). The frequency division points of the two sets of dual-point sound sources may be around 700 Hz.

A normalization parameter $\alpha$ may be used to evaluate the volume of the leakage sound (for calculation of $\alpha$, see Equation (4)). As shown in FIG. 9, compared with the case of a single point sound source, the dual-point sound source may have a relatively strong ability to reduce sound leakage. In addition, compared with the acoustic output device provided with only one set of dual-point sound source, the two sets of dual-point sound sources may output high-frequency sounds and low-frequency sounds, separately. A distance between the low-frequency dual-point sound source may be greater than that of the high-frequency dual-point sound source. In the low-frequency range, by setting a larger distance ($d_1$) between two point sound sources of a dual-point sound source, increment of the volume of the near-field sound may be greater than increment of the volume of the far-field leakage and may achieve a higher volume of the near-field sound output in the low-frequency band. At the same time, in the low-frequency range, the sound leakage of the dual-point sound source may originally be relatively small. After the distance between the two point sound sources is increased, the slightly increased sound leakage may still maintain a low level. In the high-frequency range, by setting a relatively small distance ($d_2$) between the two point sound sources of the dual-point sound source, the problems of the cutoff frequency of high-frequency sound leakage reduction being too low and the audio band of the sound leakage reduction being too narrow may be overcome. By setting the distance $d_1$ between the two point sound sources of the dual-point sound source in the low-frequency band and the distance $d_2$ between the two point sound sources of the dual-point sound source in the high-frequency band, the acoustic output device provided in the embodiments of the present disclosure may obtain a stronger sound leakage suppressing capability than a single point sound source and a set of dual-point sound source.

In some embodiments, affected by factors such as the filter characteristics of the actual circuit, the frequency characteristics of the transducer, and the frequency characteristics of the acoustic channel, the actual low-frequency and high-frequency sounds of the acoustic output device may differ from those shown in FIG. 9. In addition, low-frequency and high-frequency sounds may have a certain crossover (aliasing) in the frequency band near the frequency division point, causing the total sound leakage reduction of the acoustic output device not to have a mutation at the frequency division point as shown in FIG. 9. Instead, there may be gradients and transitions in the frequency band near the frequency division point, as shown in the thin solid line in FIG. 9. It should be understood that these differences may not affect the overall leakage reduction effect of the acoustic output device provided by the embodiment of the present disclosure.

According to FIG. 4 to FIG. 9 and the related descriptions, the acoustic output device provided by the present disclosure may be used to output sounds in different frequency bands by setting at least one high-frequency dual-point sound source and at least one low-frequency dual-point sound source, so as to achieve a better sound output effect. In addition, by setting different sets of dual-point sound sources with different distances, the acoustic output device may have a relatively stronger capability to reduce the sound leakage in a high frequency band and meet the requirements of an open acoustic output device.

In another aspect of the present disclosure, another acoustic output device may be provided. The acoustic output device may include at least one set of acoustic drivers, and the sound generated by the at least one set of acoustic drivers may propagate outwards through at least two sound guiding holes acoustically coupled with the at least one set of acoustic drivers. In some embodiments, the acoustic output device may include a baffle, and the at least two sound guiding holes may be distributed on both sides of the baffle, respectively. In some embodiments, the at least two sound guiding holes may be distributed on both sides of the user's auricle. In this case, the auricle may serve as a baffle to separate the at least two sound guiding holes, and the at least two sound guiding holes may have different acoustic routes to the user's ear canal. More descriptions regarding the dual-point sound source and the baffle may be found in International applications No. PCT/CN2019/130921 and No. PCT/CN2019/130942, both filed on Dec. 31, 2019, the entire contents of each of which are hereby incorporated by reference.

Figure 10:
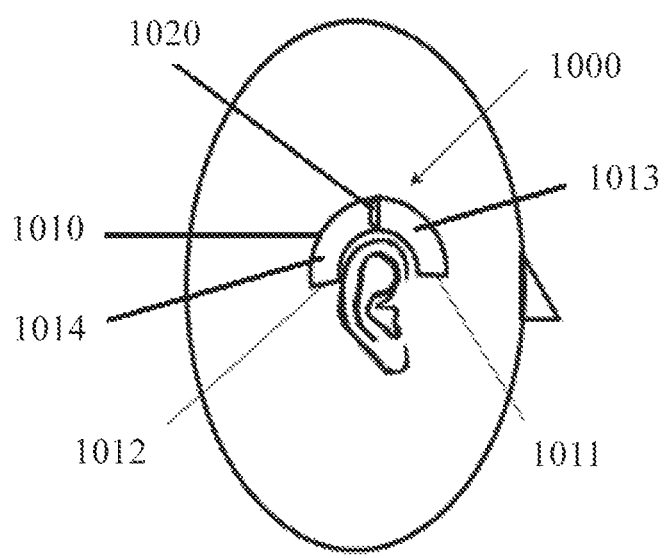
FIG. 10 is a schematic diagram illustrating an exemplary acoustic output device according to some embodiments of the present disclosure.

FIG. 10 is a schematic diagram illustrating an exemplary acoustic output device according to some embodiments of the present disclosure. As shown in FIG. 10, an acoustic output device 1000 may include a supporting structure 1010 and an acoustic driver 1020, which may be disposed in the supporting structure 1010. In some embodiments, the acoustic output device 1000 may be worn on a user's body (e.g., the head, the neck, the upper torso, etc. of the user) e.g., through the supporting structure 1010. The supporting structure 1010 and the acoustic driver 1020 may be close to and not block an ear canal of the user. The ear of the user may be in an open state. The user may hear a sound output from the acoustic output device 1000 and a sound from an external source. For example, the acoustic output device 1000 may be arranged around or partially around the user's ear and may transmit the sound via an air conduction manner or a bone conduction manner.

The supporting structure 1010 may be configured to support one or more acoustic drivers 1020. In some embodiments, the supporting structure 1010 may include an enclosed shell structure with an internal hollow, and the one or more acoustic drivers 1020 may be disposed in the supporting structure 1010. In some embodiments, the acoustic output device 1000 may be combined with a product such as a pair of glasses, a headset, a display device, an AR/VR helmet, etc. In this case, the supporting structure 1010 may be fixed near the user's ear via a hanging manner or a clamping manner. In some embodiments, the supporting structure 1010 may include a hook, a shape of the hook may be matched the shape of the auricle, and the acoustic output device 1000 may be worn on the user's ear through the hook, independently. The acoustic output device 1000, which is worn on the user's ear independently may be communicated with a signal source (e.g., a computer, a mobile phone, or other mobile devices) in a wired or wireless manner (e.g., Bluetooth). For example, the acoustic output device 1000 worn on the left ear and/or that worn on the right ear may be directly communicated with the signal source via a wireless manner. As another example, the acoustic output device 1000 worn at the left and/or right ear may include a first output part and a second output part. The first output part may be communicated with the signal source, and the second output part may be connected to the first output part via a wireless manner. The sound may be output synchronously by the first output part and the second output part controlled by one or more synchronization signals. The wireless manner may include but not limited to Bluetooth, a local area network, a wide area network, a wireless personal area network, a near-field communication, or the like, or any combination thereof.

In some embodiments, the supporting structure 1010 may include a shell structure, and a shape of the supporting structure 1010 may be matched a shape of the ear of the user. The shape of the supporting structure 1010 may include a circular ring, an oval, a (regular or irregular) polygonal, a U-shape, a V-shape, a semi-circle, etc., and the supporting structure 1010 may be directly anchored at the user's ear. In some embodiments, the supporting structure 1010 may also include one or more fixed parts. The fixed part may include an ear hook, a head beam, an elastic band, or the like, or any combination thereof, which may be used to fix the acoustic output device 1000 on the user and prevent the acoustic output device 1000 from falling. Merely by way of example, the elastic band may include a headband that may be worn around the head of the user. As another example, the elastic band may include a neckband which may be worn around the neck/shoulder of the user. In some embodiments, the elastic band may include a continuous band and be elastically stretched to be worn on the head of the user. In this case, the elastic band may also add pressure on the head of the user, thereby causing the acoustic output device 1000 to be fixed to a certain position of the head. In some embodiments, the elastic band may include a discontinuous band. For example, the elastic band may include a rigid portion and a flexible portion. The rigid portion may be made of rigid material (e.g., a plastic, a metal, etc.), and the rigid portion may be fixed to the supporting structure 1010 of the acoustic output device 1000 via a physical connection (e.g., a snap connection, a screw connection, etc.). The flexible portion may be made of an elastic material (e.g., a cloth, a composite material, a neoprene, etc.).

In some embodiments, when the user wears the acoustic output device 1000, the supporting structure 1010 may be placed above or below the auricle. The supporting structure 1010 may also include a sound guiding hole 1011 and a sound guiding hole 1012, which may be configured to transmit sounds. In some embodiments, the sound guiding hole 1011 and the sound guiding hole 1012 may be placed on two sides of the user's auricle, respectively. The acoustic driver 1020 may output sound(s) through the sound guiding hole 1011 and/or the sound guiding hole 1012.

The acoustic driver 1020 may be configured to receive an electrical signal, and convert the electrical signal into a voice signal which may be output. In some embodiments, a type of the acoustic driver 1020 may include an acoustic driver with a low-frequency, an acoustic driver with a high-frequency, an acoustic driver with a full-frequency, or the like, or any combination thereof, according to the frequency of the acoustic driver 1020. In some embodiments, the acoustic driver 120 may include a moving coil acoustic driver, a moving iron acoustic driver, a piezoelectric acoustic driver, an electrostatic acoustic driver, a magnetostrictive acoustic driver according to a principle of the acoustic driver 1020.

In some embodiments, the acoustic driver 1020 may include a vibration diaphragm. When the vibration diaphragm vibrates, sounds may be transmitted from a front side and a rear side of the vibration diaphragm, respectively. In some embodiments, a front chamber 1013 may be disposed on the front side of the vibration diaphragm in the supporting structure 1010, which may be configured to transmit the sound(s). The front chamber 1013 may be acoustically coupled with the sound guiding hole 1011. The sound transmitted from the front side of the vibration diaphragm may be transmitted from the sound guiding hole 1011 through the front chamber 1013. A rear chamber 1014 may be disposed on the rear side of the vibration diaphragm in the supporting structure 1010, which may be configured to transmit the sound(s). The rear chamber 1014 may be acoustically coupled with the sound guiding hole 1012. The sound transmitted from the rear side of the vibration diaphragm may be transmitted from the sound guiding hole 1012 through the rear chamber 1014. It should be noted that, when the vibration diaphragm vibrates, the front side and the rear side of the vibration diaphragm may simultaneously generate sounds with opposite phases. After passing through the front chamber 1013 and rear chamber 1014, respectively, the sounds may be transmitted outward from the sound guiding hole 1011 and the sound guiding hole 1012. In some embodiments, the sounds output by the acoustic driver 1020, which may be transmitted through the sound guiding hole 1011 and the sound guiding hole 1012 may meet the specific requirement by setting a structure of at least one of the front chamber 1013 and the rear chamber 1014. For example, the sound guiding hole 1011 and the sound guiding hole 1012 may transmit a set of sounds with a specific phase relationship (e.g., opposite phases) by designing a length of at least one of the front chamber 1013 and the rear chamber 1014, thereby increasing a volume in the near-field of the acoustic output device 1000, avoiding sound leakage of the acoustic output device 1000, and effectively improving the performance of the acoustic output device 1000. As used herein, a length of a front chamber refers to a length of a route between the vibration diaphragm to a sound guiding hole coupled with the front chamber when a sound (i.e., vibration) propagates from the vibration diaphragm to the sound guiding hole along the route, and a length of a rear chamber refers to a length of a route between the vibration diaphragm to a sound guiding hole coupled with the rear chamber when a sound (i.e., vibration) propagates from the vibration diaphragm to the sound guiding hole along the route.

In some alternative embodiments, the acoustic driver 1020 may include a plurality of vibration diaphragms (e.g., two vibration diaphragms). The plurality of vibration diaphragms may vibrate to generate sounds, respectively. Each of the sounds may be transmitted pass through a chamber that is connected to one of the vibration diaphragms in the supporting structure and may be output from a corresponding sound guiding hole. The plurality of vibration diaphragms may be controlled by the same controller or different controllers. The plurality of vibration diaphragms may generate sounds that satisfy a requirement of certain phase(s) and/or amplitude(s) (e.g., sounds with the same amplitude and opposite phases, sounds with different amplitudes and opposite phases, etc.).

As mentioned above (e.g., FIG. 3A, 3B and the related descriptions thereof), when a sound frequency is constant, as the distance between two point sound sources of the dual-point sound source increases, the volume of the hearing sound and the volume of the leakage sound corresponding to the dual-point sound source may increase. For a clearer description, the relationship between the volume of the hearing sound, the volume of the leakage sound, and the distance d of the two point sound sources may be further explained according to FIG. 11 to FIG. 13.

Figure 11:
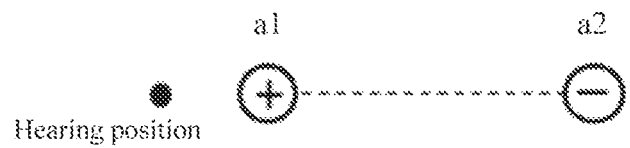
FIG. 11 is a schematic diagram illustrating two point sound sources and a hearing position according to some embodiments of the present disclosure.

FIG. 11 is a schematic diagram illustrating two point sound sources and a hearing position according to some embodiments of the present disclosure. As shown in FIG. 11, a point sound source a1 and a point sound source a2 may be disposed on the same side of the hearing position, and the point sound source a1 may be closer to the hearing position than the point sound source a2. The point sound source a1 and the point sound source a2 may output sounds with the same amplitude and opposite phases.

Figure 12:
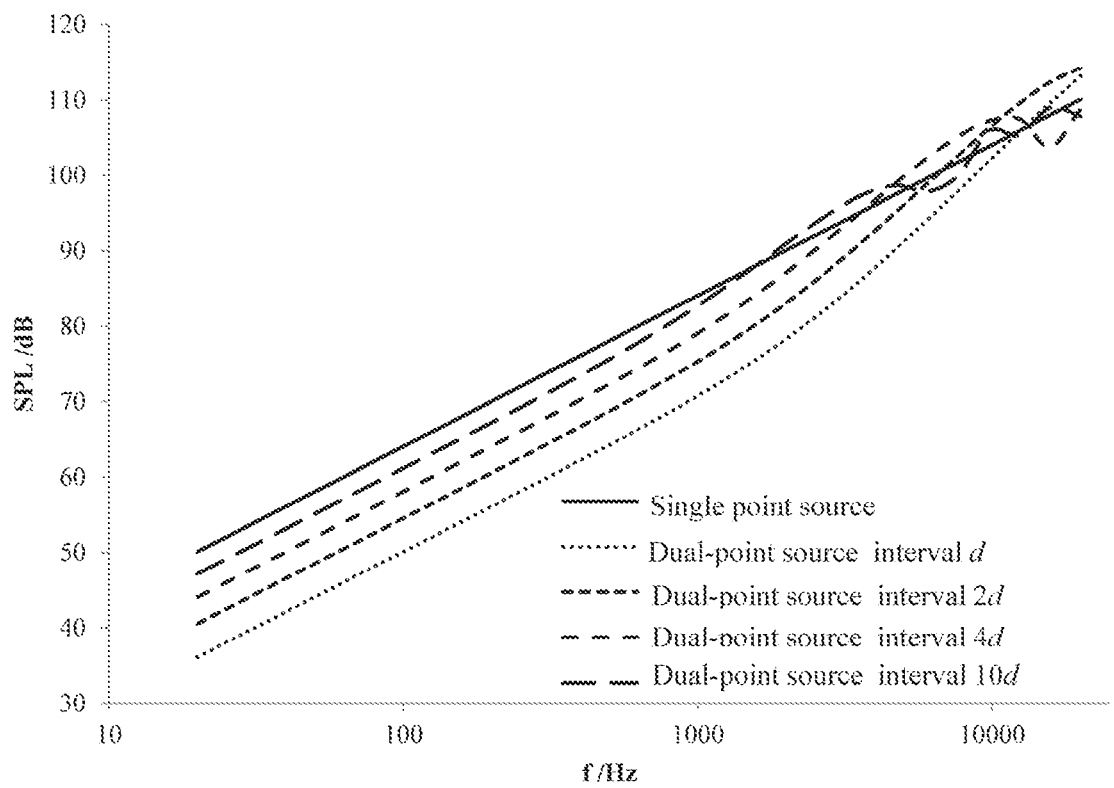
FIG. 12 is a graph illustrating a change of a volume of a hearing sound of a dual-point sound source with different distances along with a frequency according to some embodiments of the present disclosure.

FIG. 12 is a graph illustrating a change of a volume of a hearing sound of a dual-point sound source with different distances along with a frequency according to some embodiments of the present disclosure. The abscissa represents the frequency (f) of the sound output by the dual-point sound source, and the unit may be hertz (Hz). The ordinate represents the volume of the sound, and the unit may be decibel (dB). As shown in FIG. 12, as the distance between the point sound source $a_1$ and the point sound source $a_2$ gradually increases (e.g., from d to 10d), the sound volume at the hearing position may be gradually increased. As the distance between the point sound source $a_1$ and the point sound source $a_2$ increases, a difference between sound pressure amplitudes (i.e., sound pressure difference) of the two sounds reaching the hearing position may be increased, and a difference of acoustic routes may be increased, thereby reducing the sound cancellation and increasing the sound volume at the hearing position. Due to the existence of the sound cancellation, the sound volume at the hearing position may be less than that generated by a single-point sound source with the same intensity as the two-point sound sources in a middle-low-frequency (e.g., less than 1000 Hz). For a high-frequency (e.g., close to 10000 Hz), a wavelength of the sound may be decreased, a condition for enhancing the sound may be formed, and the sound volume at the hearing position generated by the two-point sound sources may be greater than a sound volume at the hearing position generated by the single-point sound source. As used herein, the sound pressure amplitude (i.e., a sound pressure) refers to a pressure generated by the sound through the vibration of the air.

Figure 13:
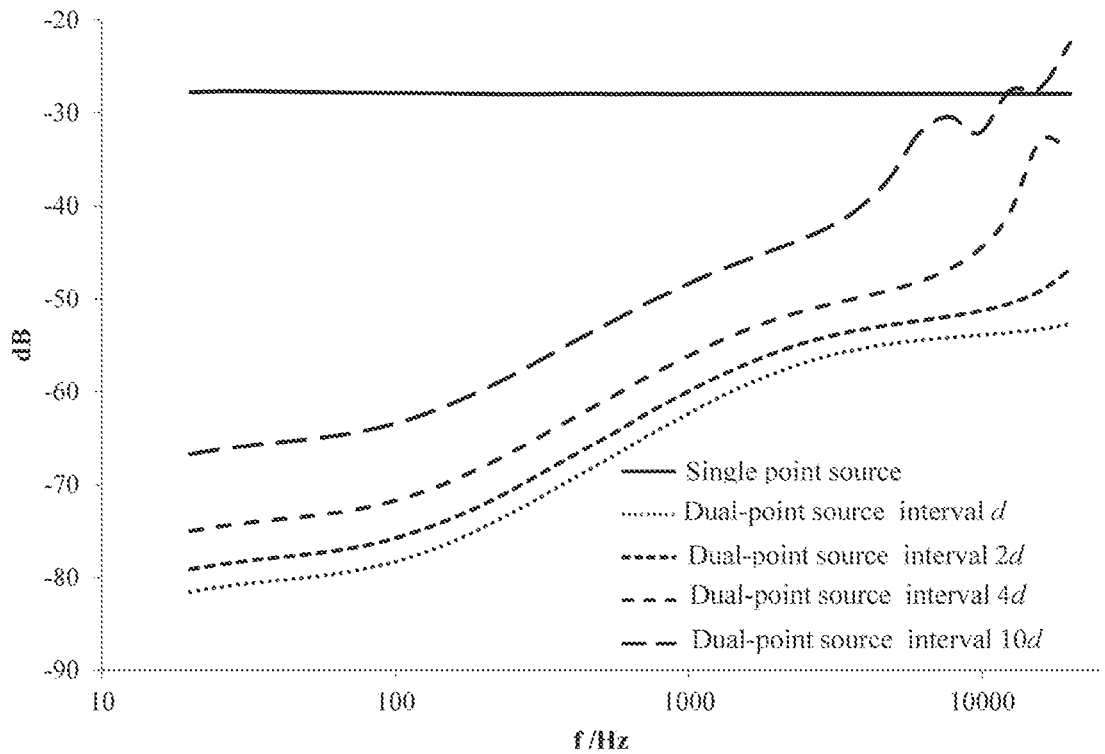
FIG. 13 is a graph illustrating a change of a normalized parameter of a dual-point sound source in a far-field along with a frequency according to some embodiments of the present disclosure.

In some embodiments, the sound volume at the hearing position may be increased by increasing the distance between the point sound sources (e.g., the point sound source $a_1$ and the point sound source $a_2$) of the dual-point sound source. As the distance increases, the sound cancellation of the dual-point sound source may be weakened, thereby increasing sound leakage in the far-field. For illustration purposes, FIG. 13 is a graph illustrating a change of a normalized parameter of a dual-point sound source in a far-field along with a frequency according to some embodiments of the present disclosure. The abscissa may represent the frequency (f) of the sound, the unit may be Hertz (Hz), the ordinate may use a normalized parameter α for evaluating the volume of the leakage sound, and the unit may be decibel (dB). As shown in FIG. 13, taking the far-field normalized parameter α of a single point sound source as a reference, as the distance between two point sound sources of the dual-point sound source increases from d to 10d, the far-field normalized parameter α may gradually increase, indicating the sound leakage may gradually increase. More descriptions regarding the normalized parameter α may be found in Equation (4) and related descriptions.

Figure 14:
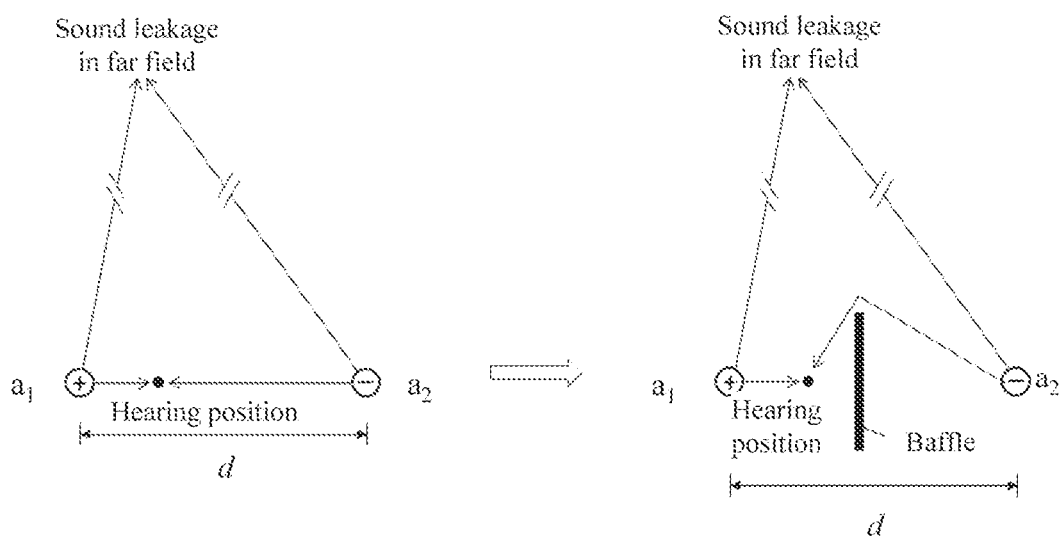
FIG. 14 is a schematic diagram illustrating an exemplary baffle disposed between two point sound sources of a dual-point sound source according to some embodiments of the present disclosure.

In some embodiments, adding a baffle to the acoustic output device may be beneficial to improve the output effect of the acoustic output device, for example, increase the sound intensity of the hearing position in the near-field and reduce the sound leakage in the far-field. For illustration purposes, FIG. 14 is a schematic diagram illustrating an exemplary baffle disposed between two point sound sources of a dual-point sound source according to some embodiments of the present disclosure. As shown in FIG. 14, when the baffle is disposed between a point sound source $a_1$ and a point sound source $a_2$, a sound field of the point sound source $a_2$ may bypass the baffle to interfere with a sound wave of the point sound source $a_1$ at a hearing position in the near-field, which may increase a length of an acoustic route between the point sound source $a_2$ and the hearing position. Assuming that the point sound source $a_1$ and the point sound source $a_2$ have the same amplitude, an amplitude difference between the sound waves of the point sound source $a_1$ and that of the point sound source $a_2$ at the hearing position may be greater than that in a case without a baffle, thereby reducing a sound cancellation of the two sounds at the hearing position, increasing a sound volume at the hearing position. In the far-field, the sound waves generated by the point sound source $a_1$ and the point sound source $a_2$ may not bypass the baffle in a relatively large space, the sound waves may be interfered (as a case without the baffle). Compared to the case without the baffle, the sound leakage in the far-field may be not increased significantly. Therefore, the baffle being disposed between the point sound source $a_1$ and the point sound source $a_2$ may significantly increase the sound volume at the hearing position in the near-field and not significantly increase that of the leakage sound in the far-field.

Figure 15:
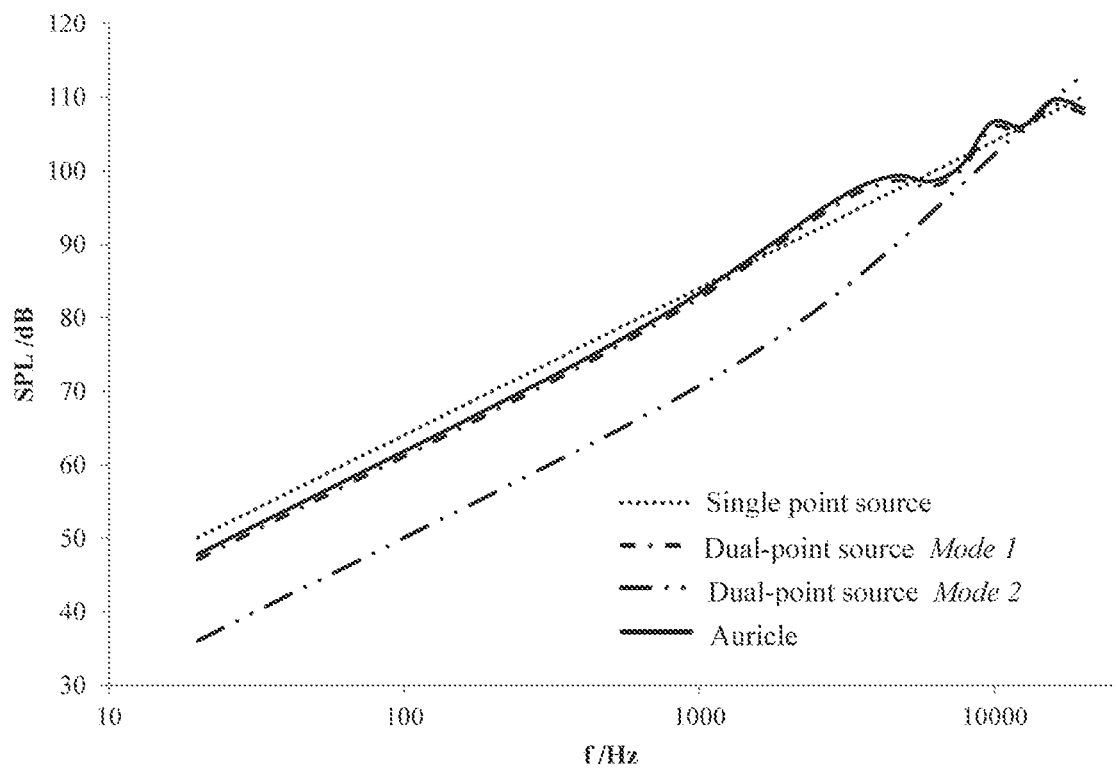
FIG. 15 is a graph illustrating a change of a volume of a hearing sound along with a frequency when a user's auricle is arranged between two point sound sources of a dual-point sound source according to some embodiments of the present disclosure.
Figure 16:
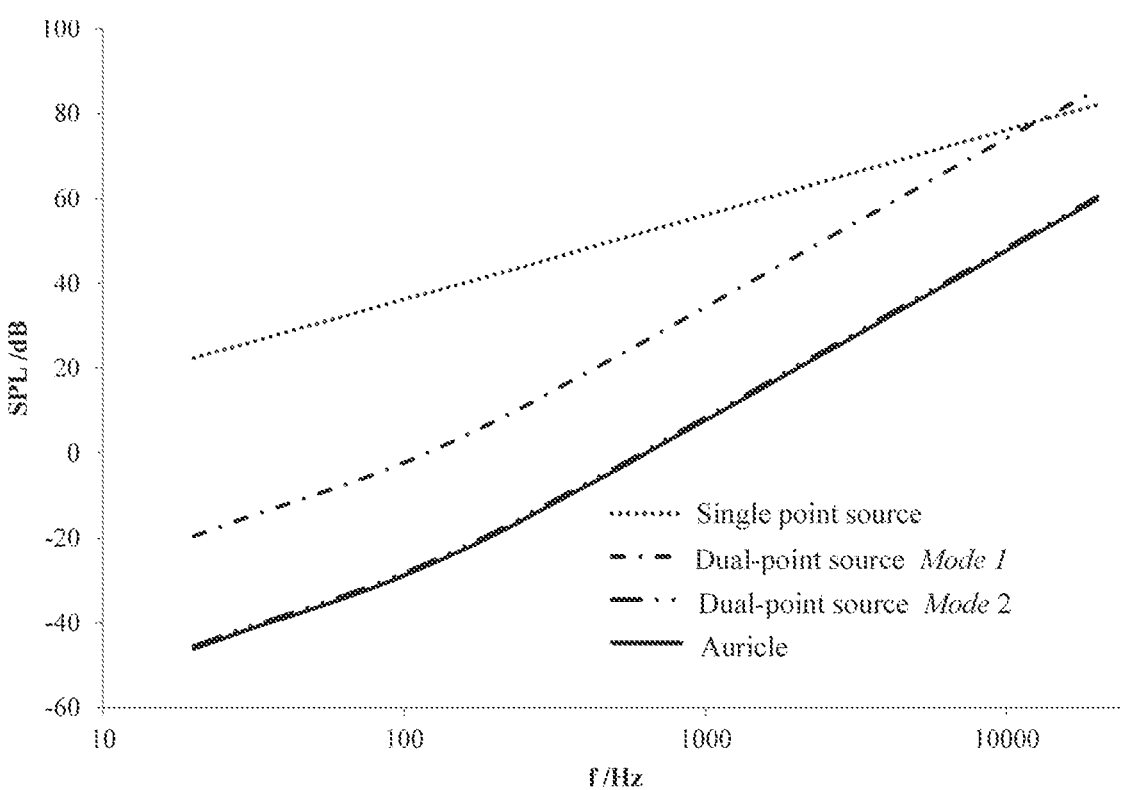
FIG. 16 is a graph illustrating a change of a volume of a leakage sound along with a frequency when an auricle is arranged between two point sound sources of a dual-point sound source according to some embodiments of the present disclosure.
Figure 17:
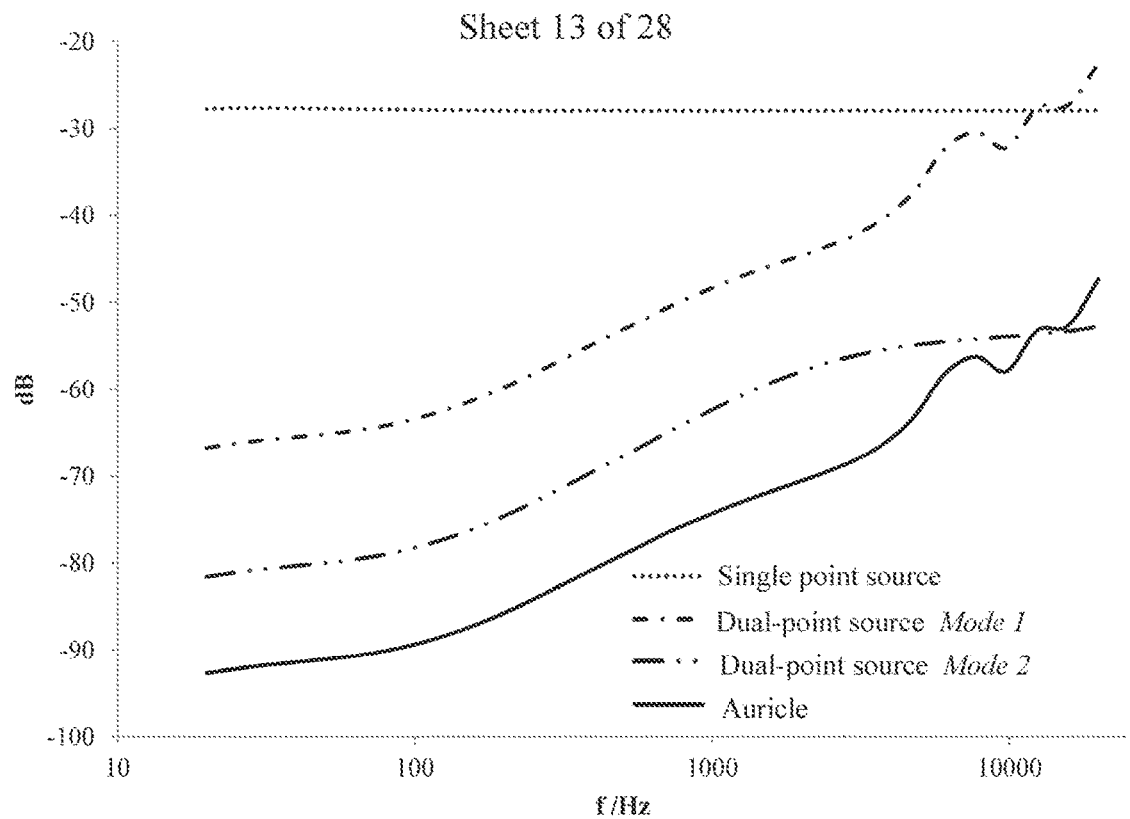
FIG. 17 is a graph illustrating a change of a normalized parameter along with a frequency when two point sound sources of a dual-point sound source of an acoustic output device are disposed on two sides of an auricle according to some embodiments of the present disclosure.

In the present disclosure, when the two point sound sources of the dual-point sound source are arranged on both sides of the auricle, the auricle may serve as a baffle, thus the auricle may also be referred to as a baffle for convenience. Merely by way of example, due to the existence of the auricle, a sound in the near-field may be generated by the dual-point sound source with a distance D1 (also referred to as Mode 1). A sound in the far-field may be generated by the dual-point sound source with a distance D2 (also referred to as Mode 2), and D1>D2. FIG. 15 is a graph illustrating a change of a volume of a hearing sound along with a frequency when a user's auricle is arranged between two point sound sources of a dual-point sound source according to some embodiments of the present disclosure. As shown in FIG. 15, for a low-frequency (e.g., a frequency less than 1000 Hz), a volume of the sound in the near-field (i.e., a sound heard by an ear of a user) may be the same as or similar to that in Mode 1 when the dual-point sound source are located on two sides of the auricle, which may be greater than a volume of a sound in the near-field in Mode 2 and may be close to a volume of a sound in a near-field of a single-point sound source. As the frequency increases (e.g., 2000 Hz~7000 Hz), the volume of the sound in the near-field in Mode 1 and generated by the two point sound sources of the dual-point sound source located on two sides of the auricle may be greater than that of the single-point sound source. It should be understood that, when the auricle is located between the two point sound sources of the dual-point sound source, the volume of the sound in the near-field transmitted from a sound source to the ear may be effectively increased. FIG. 16 is a graph illustrating a change of a volume of a leakage sound along with a frequency when an auricle is arranged between two point sound sources of a dual-point sound source according to some embodiments of the present disclosure. As shown in FIG. 16, as the frequency increases, the sound leakage in the far-field may be increased. When the dual-point sound source is located on two sides of the auricle, the sound leakage in the far-field leakage generated by the dual-point sound source may be the same as (or substantially same as) the sound leakage in the far-field in Mode 2, which may be less than the sound leakage in far-field in Mode 1 and/or the sound leakage in the far-field leakage generated by a single-point sound source. Therefore, when the auricle is located between the two point sound sources of the dual-point sound source, the sound transmitted from the sound source to the far-field may be effectively reduced, that is, the sound leakage from the sound source to the surroundings may be effectively reduced. FIG. 17 is a graph illustrating a change of a normalized parameter along with a frequency when two point sound sources of a dual-point sound source of an acoustic output device are disposed on two sides of an auricle according to some embodiments of the present disclosure. As shown in FIG. 17, when the frequency is less than 10000 Hz, the normalized parameter when two point sound sources of the dual-point sound source are distributed on both sides of the auricle may be less than the normalized parameter in the Mode 1 (in which there is no the baffle disposed between the two point sound sources of the dual-point sound source, and a distance between the two point sound sources is $D_1$), a Mode 2 (in which there is no baffle disposed between the two point sound sources of the dual-point sound source, and the distance between the two point sound sources is $D_2$), or a single point sound source, which may indicate that when the two point sound sources of the dual-point sound source are disposed on the two sides of the auricle, the acoustic output device may have a better capability to reduce the sound leakage.

In order to further explain an effect on the acoustic output of the acoustic output device 100 with or without a baffle between two point sound sources of a dual-point sound source or two sound guiding holes, a volume of a sound at the hearing position in a near-field and/or a volume of sound leakage in a far-field leakage under different conditions may be described below.

Figure 18:
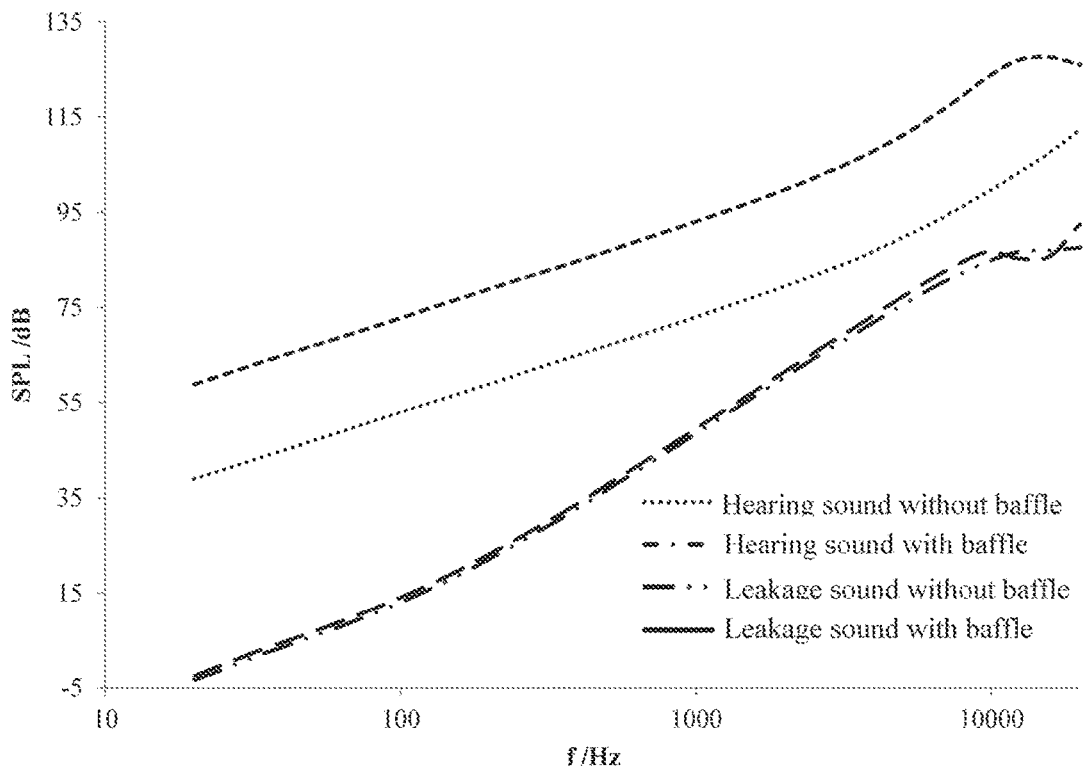
FIG. 18 is a graph illustrating a change of a volume of hearing sound and a volume of leakage sound along with a frequency with and without a baffle between two point sound sources of a dual-point sound source according to some embodiments of the present disclosure.

FIG. 18 is a graph illustrating a change of a volume of hearing sound and a volume of leakage sound along with a frequency with and without a baffle between two point sound sources of a dual-point sound source according to some embodiments of the present disclosure. As shown in FIG. 18, when the baffle is disposed between the two point sound sources of the dual-point sound source (i.e., two sound guiding holes) of the acoustic output device, a distance between the two point sound sources of the dual-point sound source may be increased in the near-field, and the volume of the sound at the hearing position in the near-field may be equivalent to being generated by dual-point sound source with a relatively large distance, thereby increasing the volume of the sound in the near-field compared to a case without the baffle. In the far-field, the interference of sound waves generated by the dual-point sound source may be not significantly affected by the baffle, the sound leakage may be regarded as being generated by a set of dual-point sound source with a relatively small distance, and the sound leakage may be not changed significantly with or without the baffle. The baffle disposed between the two sound guiding holes (the dual-point sound source) may improve the performance of the acoustic output device by reducing the sound leakage, and increase the volume of the sound in the near-field, thereby reducing requirements for a component that plays an acoustic role in the acoustic output device, reducing the electrical loss of the acoustic output device, and prolonging a working time of the acoustic output device.

Figure 19:
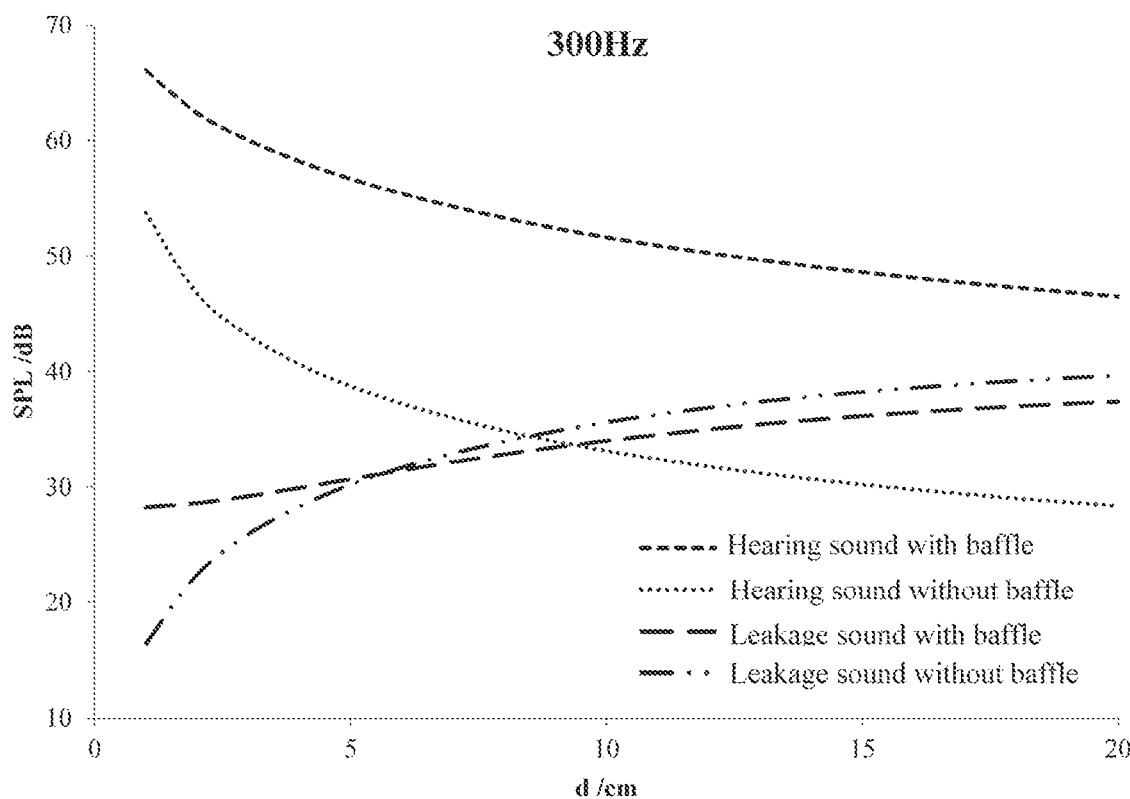
FIG. 19 is a graph illustrating changes of a volume of a hearing sound and a volume of a leakage sound along with a distance between two point sound sources of a dual-point sound source at a frequency of 300 Hz and with or without a baffle according to some embodiments of the present disclosure.
Figure 20:
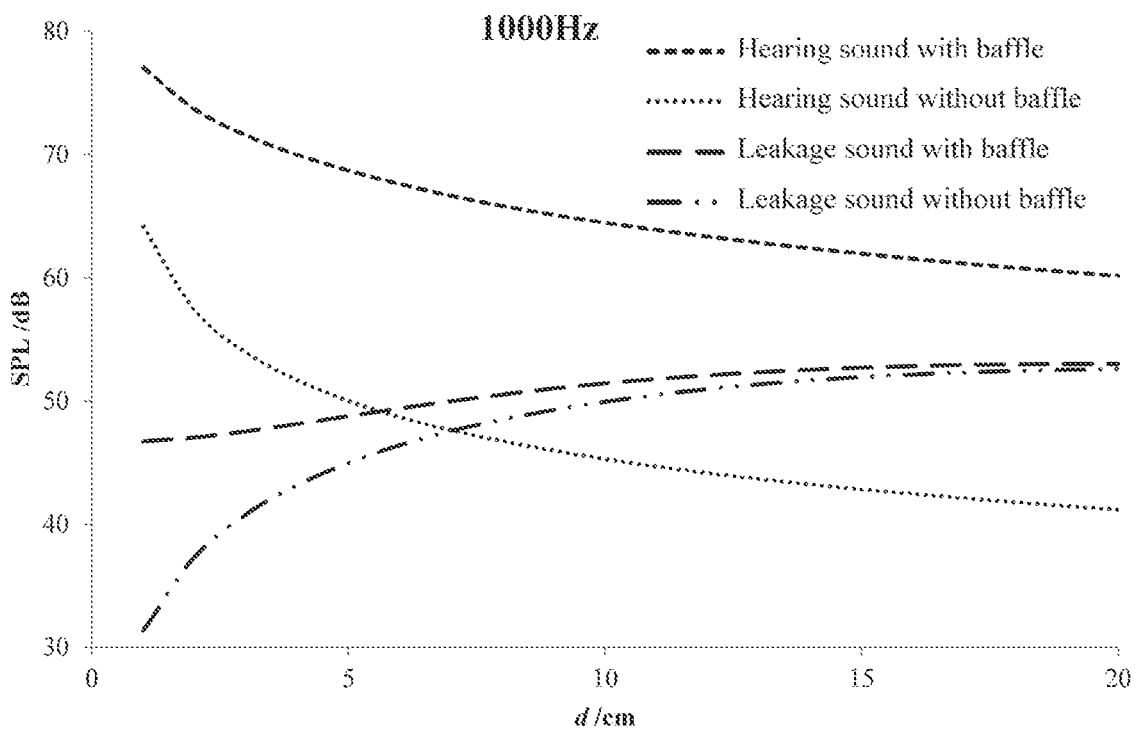
FIG. 20 is a graph illustrating changes of a volume of a hearing sound and a volume of a leakage sound along with a distance between two point sound sources of a dual-point sound source at a frequency of 1000 Hz and with or without a baffle according to some embodiments of the present disclosure.

FIG. 19 is a graph illustrating changes of a volume of a hearing sound and a volume of a leakage sound along with a distance between two point sound sources of a dual-point sound source at a frequency of 300 Hz and with or without a baffle according to some embodiments of the present disclosure. FIG. 20 is a graph illustrating changes of a volume of a hearing sound and a volume of a leakage sound along with a distance between two point sound sources of a dual-point sound source at a frequency of 1000 Hz and with or without a baffle according to some embodiments of the present disclosure. As shown in FIG. 19 and FIG. 20, in the near-field, when the frequency is 300 Hz or 1000 Hz, a volume of a heard sound when a baffle is disposed between the two point sound sources of the dual-point sound source is greater than a volume of a heard sound when the baffle is not disposed between the two point sound sources of the dual-point sound source as the distance d of the dual-point sound source is increased. In this case, the baffle disposed between the two point sound sources of the dual-point sound source may effectively increase the volume of the heard sound in the near-field when the frequency is 300 Hz or 1000 Hz. In a far-field, a volume of a leakage sound when the baffle is disposed between the two point sound sources of the dual-point sound source may be equivalent to (or substantially equivalent to) a volume of the leakage sound when the baffle is not disposed between the two point sound sources of the dual-point sound source, which may show that the baffle disposed between the two point sound sources of the dual-point sound source may not affect on the sound leakage in the far-field when the frequency is 300 Hz or 1000 Hz.

Figure 21:
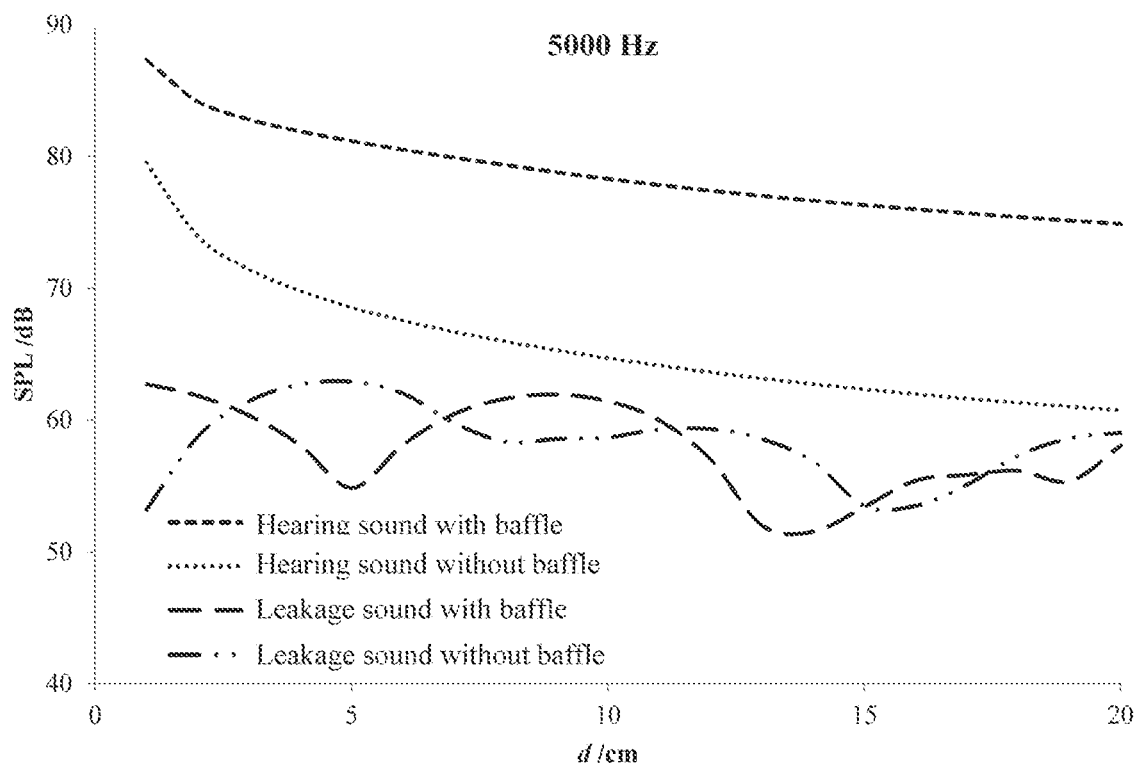
FIG. 21 is a graph illustrating changes of a volume of a hearing sound and a volume of a leakage sound along with a distance between two point sound sources of a dual-point sound source at a frequency of 5000 Hz and with or without a baffle according to some embodiments of the present disclosure.

FIG. 21 is a graph illustrating changes of a volume of a hearing sound and a volume of a leakage sound along with a distance between two point sound sources of a dual-point sound source at a frequency of 5000 Hz and with or without a baffle according to some embodiments of the present disclosure. As shown in FIG. 21, in the near-field, when the frequency is 5000 Hz, a volume of a heard sound when a baffle is disposed between the two point sound sources of the dual-point sound source is greater than a volume of a heard sound when the baffle is disposed between the two point sound sources of the dual-point sound source as the distance d of the dual-point sound source is increased. In the far-field, a volume of a leakage sound of the dual-point sound source may be fluctuant as a function of the distance d when the baffle is disposed and not disposed between the two point sound sources of the dual-point sound source. Overall, whether the baffle is disposed between the two point sound sources of the dual-point sound source may have little effect on the sound leakage in the far-field.

Figure 22:
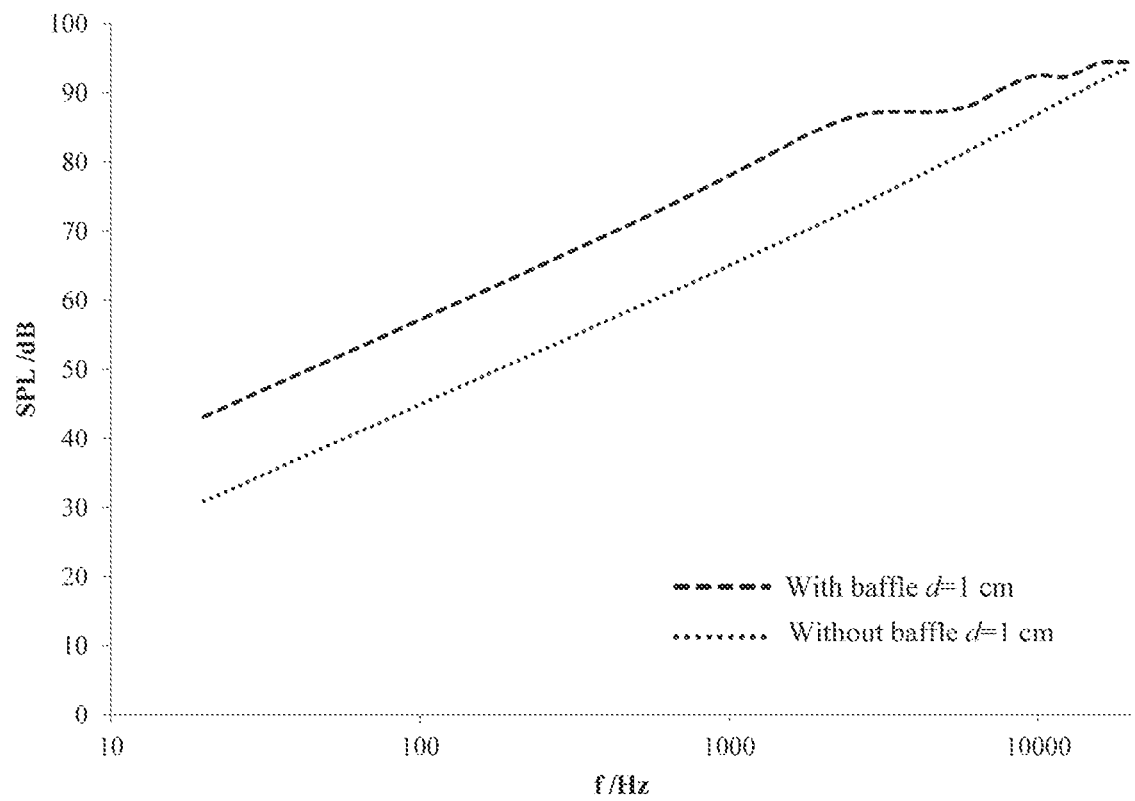
FIG. 22 is a graph illustrating a change of a volume of hearing sound along with a frequency when a distance d between two point sound sources of a dual-point sound source is 1 cm according to some embodiments of the present disclosure.
Figure 23:
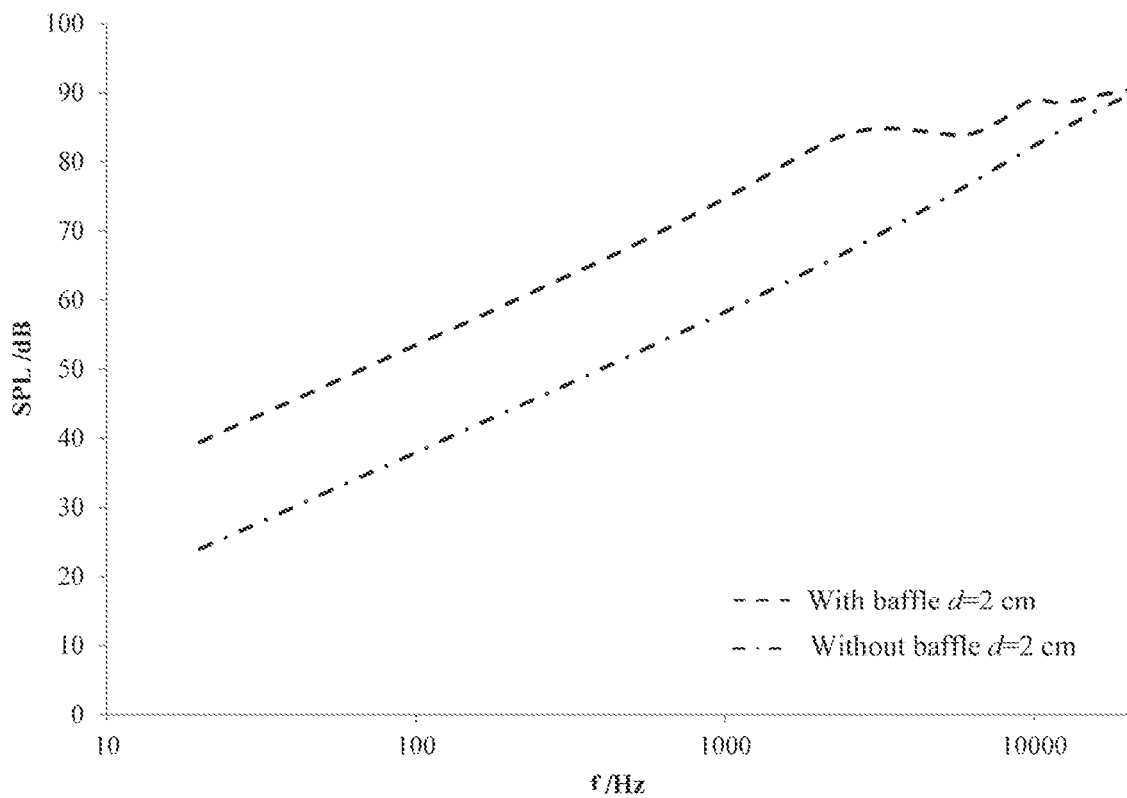
FIG. 23 is a graph illustrating a change of a volume of a hearing sound along with a frequency when a distance d between two point sound sources dual-point sound source is 2 cm according to some embodiments of the present disclosure.
Figure 24:
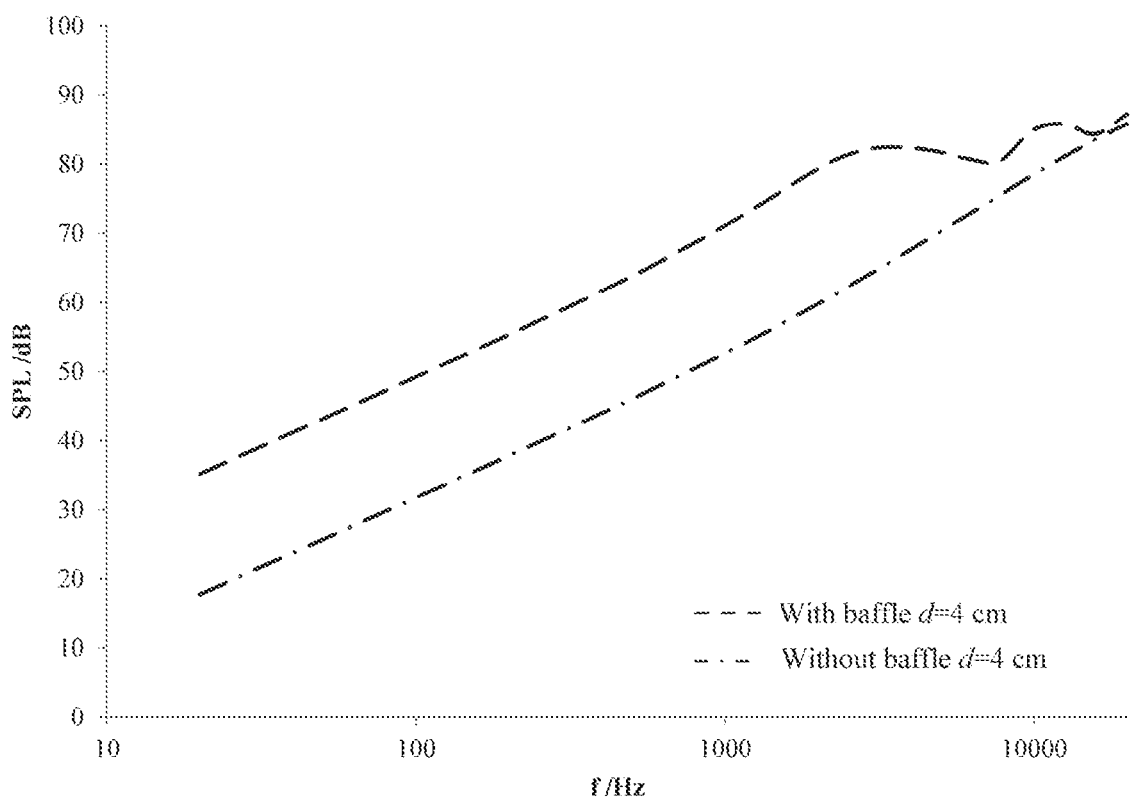
FIG. 24 is a graph illustrating a change of a volume of hearing sound along with a frequency when a distance d between two point sound sources of a dual-point sound source is 4 cm according to some embodiments of the present disclosure.
Figure 25:
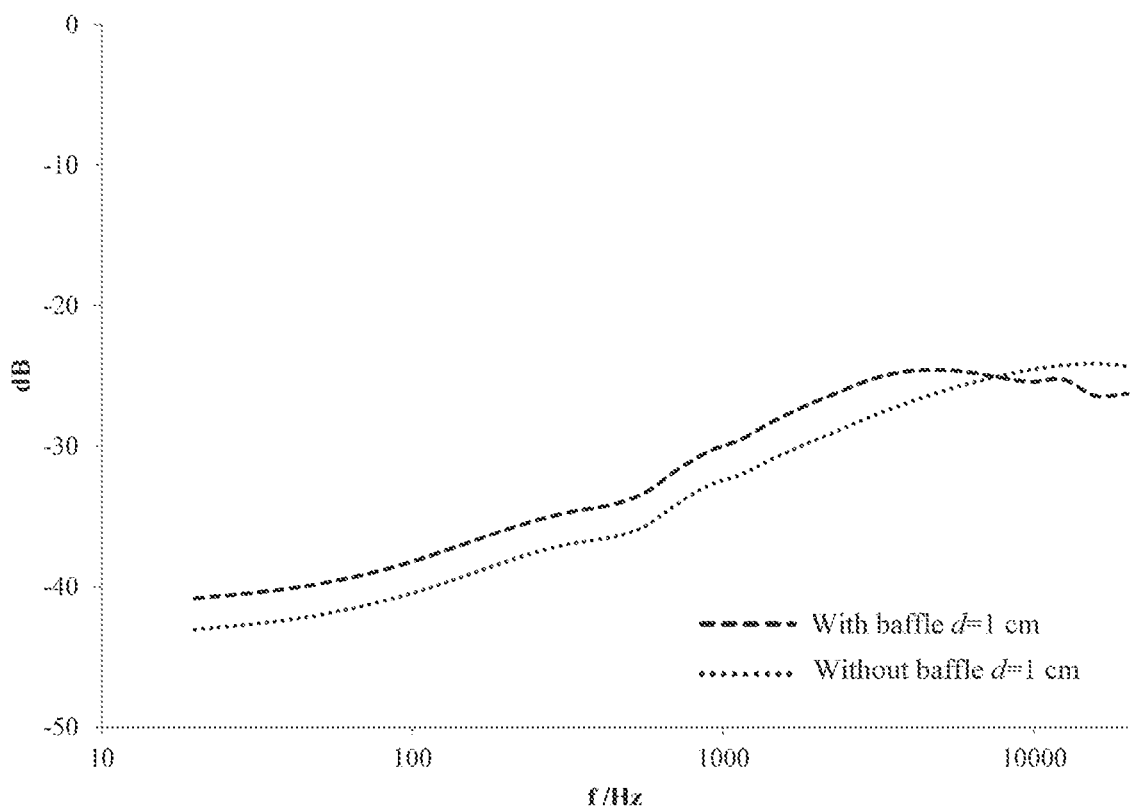
FIG. 25 is a graph illustrating a change of a normalized parameter along with a frequency when a distance d between two point sound sources of a dual-point sound source is 1 cm according to some embodiments of the present disclosure.
Figure 26:
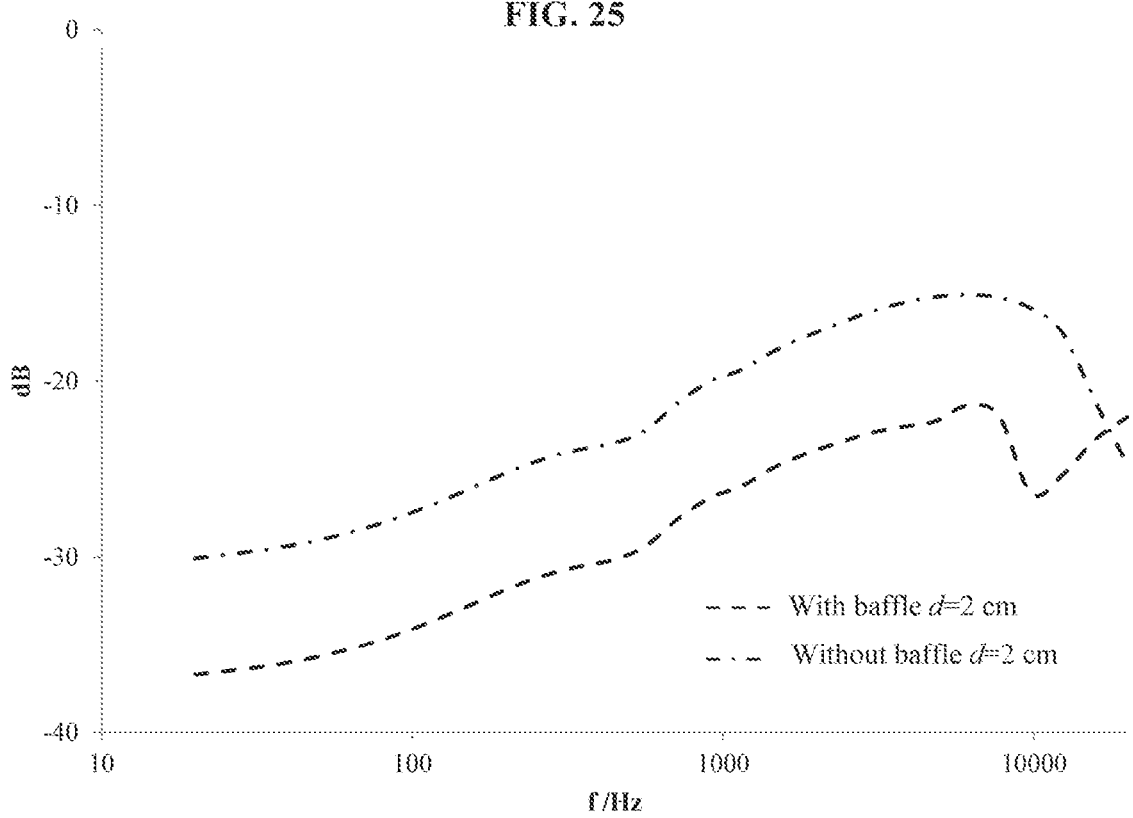
FIG. 26 is a graph illustrating a change of a normalized parameter along with a frequency when a distance d between two point sound sources of a dual-point sound source is 2 cm according to some embodiments of the present disclosure.
Figure 27:
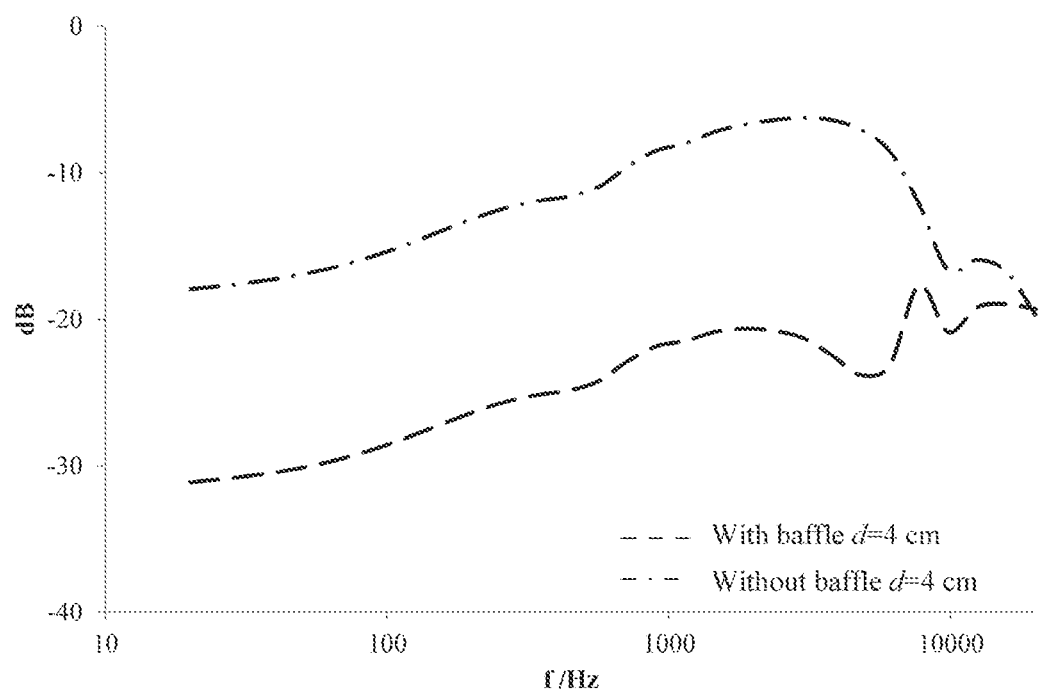
FIG. 27 is a graph illustrating a change of a normalized parameter along with a frequency when a distance d between two point sound sources of a dual-point sound source is 4 cm according to some embodiments of the present disclosure.

FIG. 22 is a graph illustrating a change of a volume of hearing sound along with a frequency when a distance d between two point sound sources of a dual-point sound source is 1 cm according to some embodiments of the present disclosure. FIG. 23 is a graph illustrating a change of a volume of a hearing sound along with a frequency when a distance d between two point sound sources dual-point sound source is 2 cm according to some embodiments of the present disclosure. FIG. 24 is a graph illustrating a change of a volume of hearing sound along with a frequency when a distance d between two point sound sources of a dual-point sound source is 4 cm according to some embodiments of the present disclosure. FIG. 25 is a graph illustrating a change of a normalized parameter along with a frequency when a distance d between two point sound sources of a dual-point sound source is 1 cm according to some embodiments of the present disclosure. FIG. 26 is a graph illustrating a change of a normalized parameter along with a frequency when a distance d between two point sound sources of a dual-point sound source is 2 cm according to some embodiments of the present disclosure. FIG. 27 is a graph illustrating a change of a normalized parameter along with a frequency when a distance d between two point sound sources of a dual-point sound source is 4 cm according to some embodiments of the present disclosure. As shown in FIG. 22 to FIG. 24, for different distance d (e.g., 1 cm, 2 cm, 4 cm) between sound guiding holes, at a certain frequency, in a hearing position in the near-field (e.g., an ear of a user), a volume of a sound generated by two sound guiding holes which may be disposed on two sides of the auricle (i.e., in the case of "without baffle" shown in FIGS. 22-24) may be greater than a volume of a sound generated by two sound guiding holes which may be not disposed on the two sides of the auricle. The certain frequency may be below 10000 Hz, 5000 Hz, or 1000 Hz.

As shown in FIGS. 25 to 27, for different distances d (e.g., 1 cm, 2 cm, 4 cm, etc.) between sound guiding holes, at a certain frequency, in far-field (e.g., a position away from an ear of a user), a volume of a leakage sound generated by the two sound guiding holes which may be disposed on two sides of an auricle, may be smaller than that generated by the two sound guiding holes which may be not disposed on two sides of the auricle. It should be noted that as the distance between the two sound guiding holes or two-point sound sources increases, the interference cancellation of a sound at a position in the far-field may be weakened, the sound leakage in the far-field may be increased, and the ability for reducing the sound leakage may be reduced. The distance d between the two sound guiding holes or the two-point sound sources may be not greater than a distance threshold. In some embodiments, the distance d between the two sound guiding holes may be set to be less than 20 cm to increase the volume in the near-field and reduce the sound leakage in the far-field. In some embodiments, the distance d between the two sound guiding holes may be set to be less than 12 cm. In some embodiments, the distance d between the two sound guiding holes may be set to be less than 10 cm. In some embodiments, the distance d between the two sound guiding holes may be set to be less than 6 cm. In some embodiments, considering a size of the acoustic output device and a structural requirement for the sound guiding hole(s), the distance d between the two sound guiding holes may be set to be no less than 1 cm and no greater than 12 cm. In some embodiments, the distance d between the two sound guiding holes may be set to be no less than 1 cm and no more than 10 cm. In some embodiments, the distance d between the two sound guiding holes may be set to be no less than 1 cm and no more than 8 cm. In some embodiments, the distance d between the two sound guiding holes may be set to be no less than 1 cm and no more than 6 cm. In some embodiments, the distance d between the two sound guiding holes may be set to be no less than 1 cm and no more than 3 cm.

It should be noted that the above description is merely for the convenience of description, and not intended to limit the scope of the present disclosure. It should be understood that, for those skilled in the art, after understanding the principle of the present disclosure, various modifications and changes in the forms and details of the acoustic output device may be made without departing from this principle. For example, in some embodiments, a plurality of sound guiding holes may be set on two sides of the baffle. The count of the plurality of sound guiding holes disposed on each of the two sides of the baffle may be the same or different. For example, the count of sound guiding holes disposed on one side of the baffle may be two, and the count of sound guiding holes disposed on the other side may be two or three. These modifications and changes may still be within the protection scope of the present disclosure.

Figure 28:
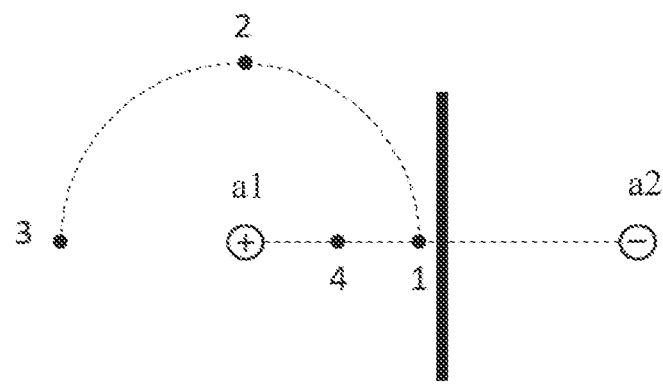
FIG. 28 is a schematic diagram illustrating exemplary hearing positions according to some embodiments of the present disclosure.

In some embodiments, for a certain distance between the two point sound sources of the dual-point sound source, a relative position of the hearing position to the dual-point sound source may affect the volume of the sound in the near-field and the sound leakage in the far-field. To improve the acoustic output performance of the acoustic output device, in some embodiments, the acoustic output device may include at least two sound guiding holes. The at least two sound guiding holes may include two sound guiding holes which may be disposed on a front side and/or a rear side of the auricle of a user, respectively. In some embodiments, a sound propagated from the sound guiding hole disposed on the rear side of the auricle may bypass the auricle to an ear canal of the user, and an acoustic route between the sound guiding hole disposed on the front side of the auricle and the ear canal (i.e., the acoustic distance from the sound guiding hole to an ear canal entrance) may be shorter than an acoustic route between the sound guiding hole disposed on the rear side of the auricle and the ear. FIG. 28 is a schematic diagram illustrating exemplary hearing positions according to some embodiments of the present disclosure. In order to further explain an effect of the hearing position on the acoustic output, four hearing positions (i.e., a hearing position 1, a hearing position 2, a hearing position 3, and a hearing position 4) may be selected as shown in FIG. 28, which may be used to describe the effect and criteria of the hearing positions. A distance between each of the hearing position 1, the hearing position 2, and the hearing position 3 and a point sound source $a_1$ may be equal, which may be denoted by $r_1$. A distance between the hearing position 4 and the point sound source $a_1$ may be denoted by $r_2$, and $r_2 < r_1$. The point sound source $a_1$ and a point sound source $a_2$ may generate sounds with opposite phases.

Figure 29:
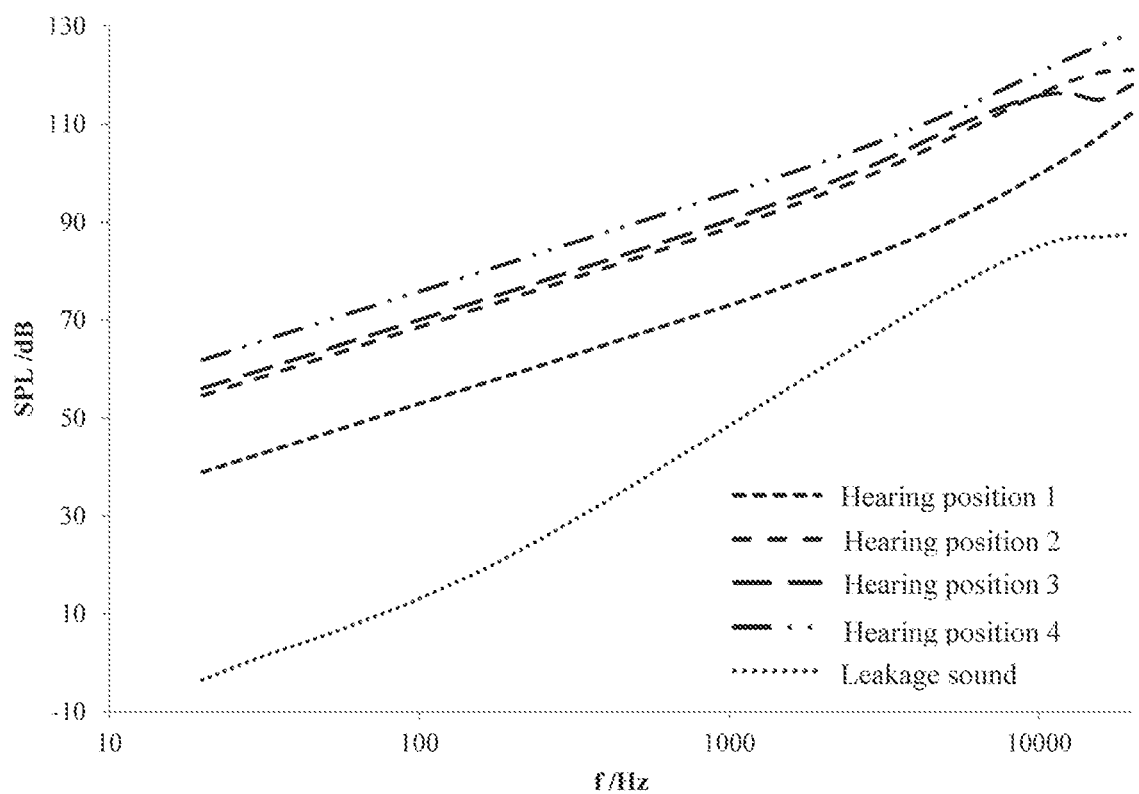
FIG. 29 is a graph illustrating a volume of a hearing sound generated by a dual-point sound source without baffle at different hearing positions in a near field along with a frequency according to some embodiments of the present disclosure.
Figure 30:
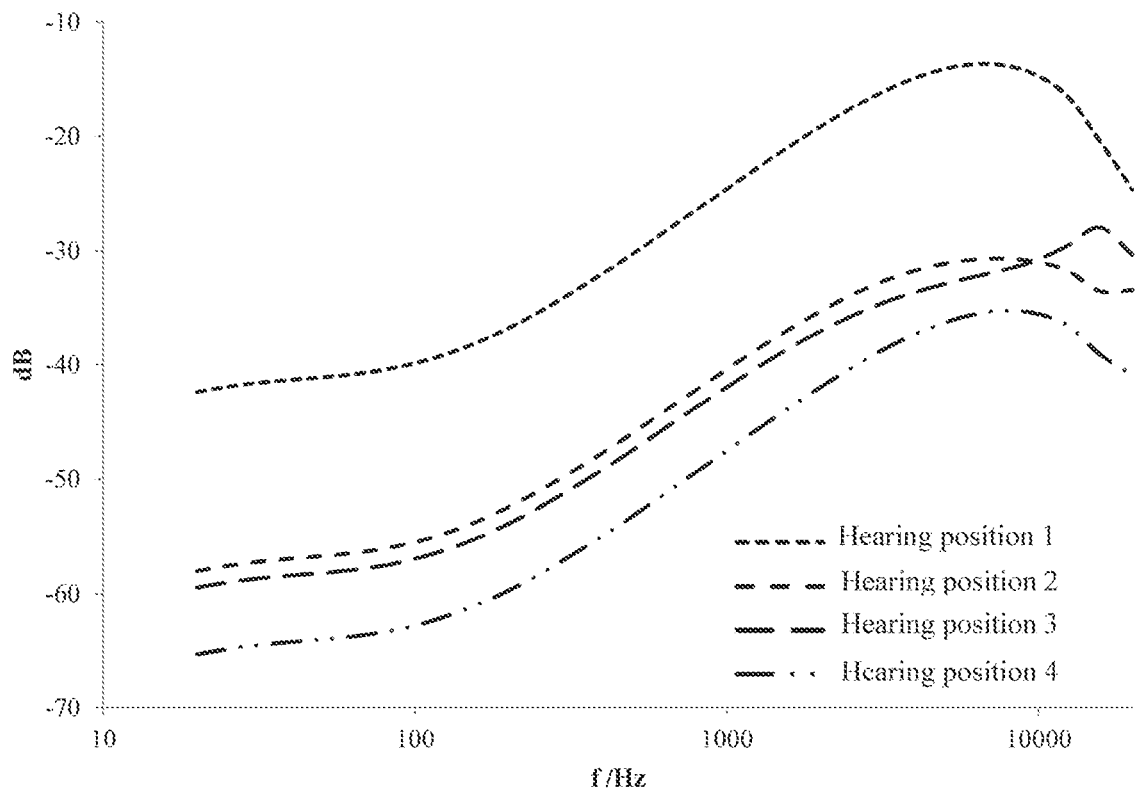
FIG. 30 is a graph illustrating a normalized parameter at different hearing positions along with a frequency.

FIG. 29 is a graph illustrating a volume of a hearing sound generated by a dual-point sound source without baffle at different hearing positions in a near field along with a frequency according to some embodiments of the present disclosure. FIG. 30 is a graph illustrating a normalized parameter at different hearing positions obtained with reference to Equation (4) on the basis of FIG. 29 along with a frequency. As shown in FIGS. 29 and 30, an acoustic route difference between an acoustic route from the point sound source $a_1$ to the hearing position 1 and an acoustic route from the point sound source $a_2$ to the hearing position 1 is relatively small, and accordingly an interference of sounds generated by the dual-point sound source at the hearing position 1 may decrease the volume of a heard sound at the hearing position 1 to be relatively smaller than that of other hearing positions. For a hearing position 2, compared with the hearing position 1, a distance between the hearing position 2 and the point sound source $a_1$ may be the same as that between the hearing position 1 and the point sound source $a_1$, that is, an acoustic route from the point sound source $a_1$ to the hearing position 2 may be the same as that from the point sound source $a_1$ to the hearing position. A distance between the hearing position 2 and the point sound source $a_2$ may be longer than that between the hearing position 1 and the point sound source $a_2$, and an acoustic route from the point sound source $a_2$ to the hearing position 2 may be greater than that from the point sound source $a_2$ to the hearing position 1. An amplitude difference between the sound generated by the point sound source $a_1$ and the sound generated by the point sound source $a_2$ may be increased at the hearing position 2. Accordingly, a volume of the sound transmitted from the dual-point sound source after being interfered at the hearing position 2 may be greater than that at the hearing position 1. Among a plurality of positions on an arc with a radius of $r_1$, a difference between the acoustic route from the point sound source $a_1$ to the hearing position 3 and the acoustic route from the point sound source $a_2$ to the hearing position 3 may be the longer than other acoustic routes. Compared with the hearing position 1 and the hearing position 2, a volume of a heard sound at the hearing position 3 may be higher than that at other hearing positions. For the hearing position 4, a distance between the hearing position 4 and the point sound source $a_1$ may be relatively short, a sound amplitude of a sound generated by the point sound source $a_1$ at the hearing position 4 may be greater than the sound amplitude of the sound generated by the point sound source $a_1$ at other hearing positions, and a volume of a heard sound at the hearing position 4 may be greater than other volumes of heard sounds at other hearing positions. In closing, the volume of the heard sound at the hearing position in the near-field may be changed when the hearing position and/or a relative position of the dual-point sound source is changed. When the hearing position (e.g., hearing position 3) is on the line between the two point sound sources of the dual-point sound source and on the same side of the dual-point sound source, the acoustic route difference between the two point sound sources of the dual-point sound source at the hearing position may be the largest (the acoustic route difference may be the distance d between the two point sound sources of the dual-point sound source). In this case (i.e., when the auricle is not used as a baffle), the volume of the heard sound at the hearing position may be greater than that at other positions. According to Equation (4), the sound leakage in the far-field is constant, the normalized parameter corresponding to the hearing position may be relatively small, and a capability for reducing the sound leakage may be relatively strong. Further, the distance $r_1$ between the hearing position (e.g., the hearing position 4) and the point sound source $A_1$ may be decreased, thereby increasing the volume of the heard sound at the hearing position, reducing the sound leakage parameter, and improving the capability of reducing sound leakage.

Figure 31:
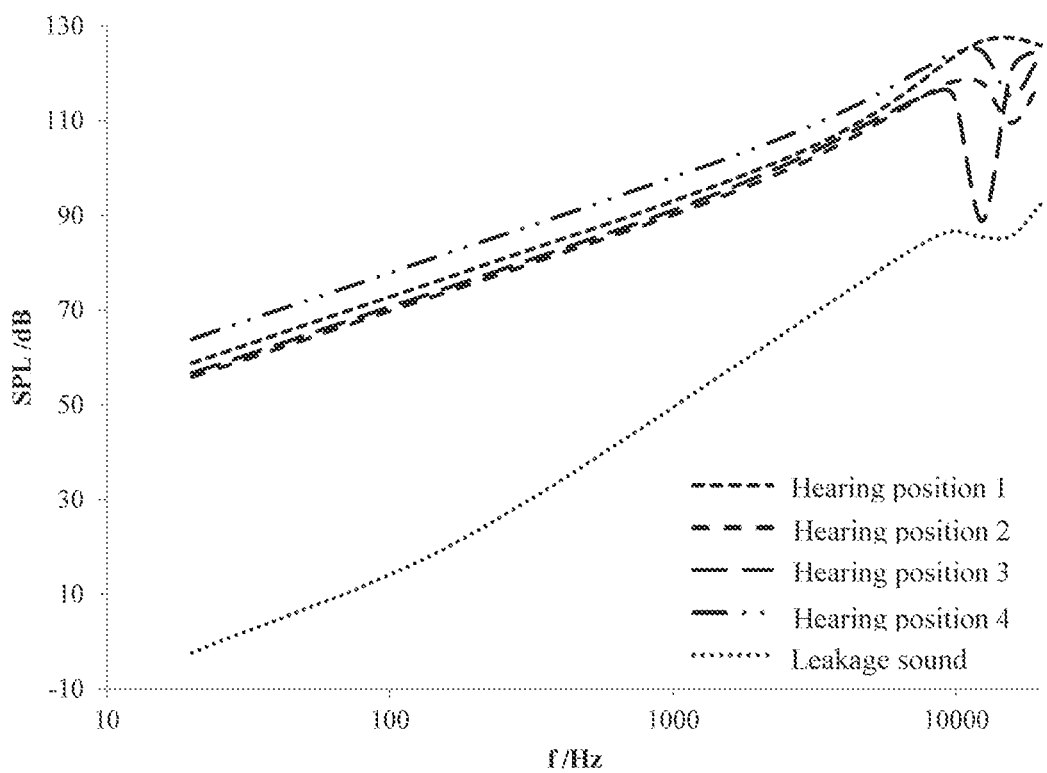
FIG. 31 is a graph illustrating a volume of a hearing sound at different hearing positions in a near field of a dual-point sound source with a baffle along with a frequency according to some embodiments of the present disclosure.
Figure 32:
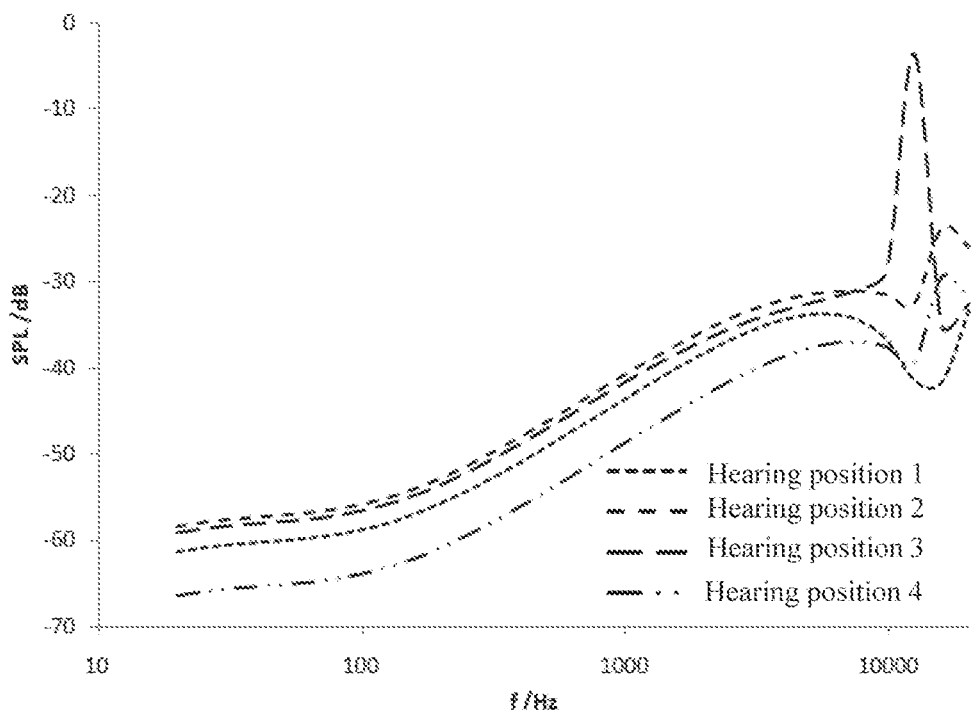
FIG. 32 is a graph illustrating a normalized parameter at different hearing positions along with a frequency.

FIG. 31 is a graph illustrating a volume of a hearing sound at different hearing positions in a near field of a dual-point sound source (shown in FIG. 28) with a baffle along with a frequency according to some embodiments of the present disclosure. FIG. 32 is a graph illustrating a normalized parameter at different hearing positions obtained with reference to Equation (4) on the basis of FIG. 31 along with a frequency. As shown in FIGS. 31 and 32, compared to a case without a baffle, a volume of a heard sound generated by the dual-point sound source at the hearing position 1 may be increased when the baffle is disposed between the two point sound sources of the dual-point sound source. The volume of the heard sound at the hearing position 1 may be greater than that at the hearing position 2 and/or the hearing position 3. An acoustic route from the point sound source $a_2$ to the hearing position 1 may be increased when the baffle is disposed between the two point sound sources of the dual-point sound source, and accordingly, an acoustic route difference between the two point sound sources of the dual-point sound source and the hearing position 1 may be increased. An amplitude difference between the sounds generated by the dual-point sound source at the hearing position 1 may be increased, and the sound interference cancellation may be not formed, thereby increasing the volume of the heard sound generated at the hearing position 1. At the hearing position 4, a distance between the hearing position 4 and the point sound source $a_1$ may be decreased, the sound amplitude of the point sound source $a_1$ at the hearing position may be relatively great. The volume of the heard sound at the hearing position 4 may be greater than that at other hearing positions (i.e., the hearing position 1, the hearing position 2, and/or the hearing position 3). For the hearing position 2 and the hearing position 3, an effect of the baffle on the acoustic route from the point sound source $a_2$ to the hearing positions may be not obvious, the increase of the volume of the heard sound at the hearing position 2 and the hearing position 3 may be less than that at the hearing position 1 and the hearing position 4 which are located close to the baffle.

The volume of leakage sound in the far-field may be not changed, and the volume of the heard sound at the hearing position in the near-field may be changed when the hearing position is changed. In this case, according to Equation (4), the normalized parameter of the acoustic output device may be different at different hearing positions. Specifically, a hearing position with a relatively large volume of the heard sound (e.g., the hearing position 1 and/or the hearing position 4) may correspond to a small normalized parameter and a strong capability for reducing the sound leakage. A hearing position with a low volume of the heard sound (e.g., the hearing position 2 and hearing position 3) may correspond to a large normalized parameter and a weak capability for reducing the sound leakage.

According to an actual application scenario of the acoustic output device, an auricle of a user may be served as the baffle. In this case, the two sound guiding holes on the acoustic output device may be arranged on a front side and a rear side of the auricle, respectively, and an ear canal may be located between the two sound guiding holes as a hearing position. In some embodiments, a distance between the sound guiding hole on the front side of the auricle and the ear canal may be smaller than a distance between the sound guiding hole on the rear side of the auricle and the ear canal by adjusting positions of the two sound guiding holes on the acoustic output device. In this case, the acoustic output device may produce a relatively large sound amplitude at the ear canal since the sound guiding hole on the front side of the auricle is close to the ear canal. The sound amplitude formed by the sound guiding hole on the rear side of the auricle may be smaller at the ear canal, which may avoid the interference cancellation of the sounds from the two sound guiding holes at the ear canal, thereby ensuring a relatively large volume of the heard sound at the ear canal. In some embodiments, the acoustic output device may include one or more contact points (e.g., "an inflection point" on a supporting structure to match a shape of the ear) which may contact with the auricle when the acoustic output device is worn. The contact point(s) may be located on a line connecting the two sound guiding holes or on one side of the line connecting the two sound guiding holes. And a ratio of a distance between the sound guiding hole disposed on the front side of the auricle and the contact point(s) and a distance between the sound guiding hole disposed on the rear side of the auricle and the contact point(s) may be 0.05-20. In some embodiments, the ratio may be 0.1-10. In some embodiments, the ratio may be 0.2-5. In some embodiments, the ratio may be 0.4-2.5.

Figure 33:
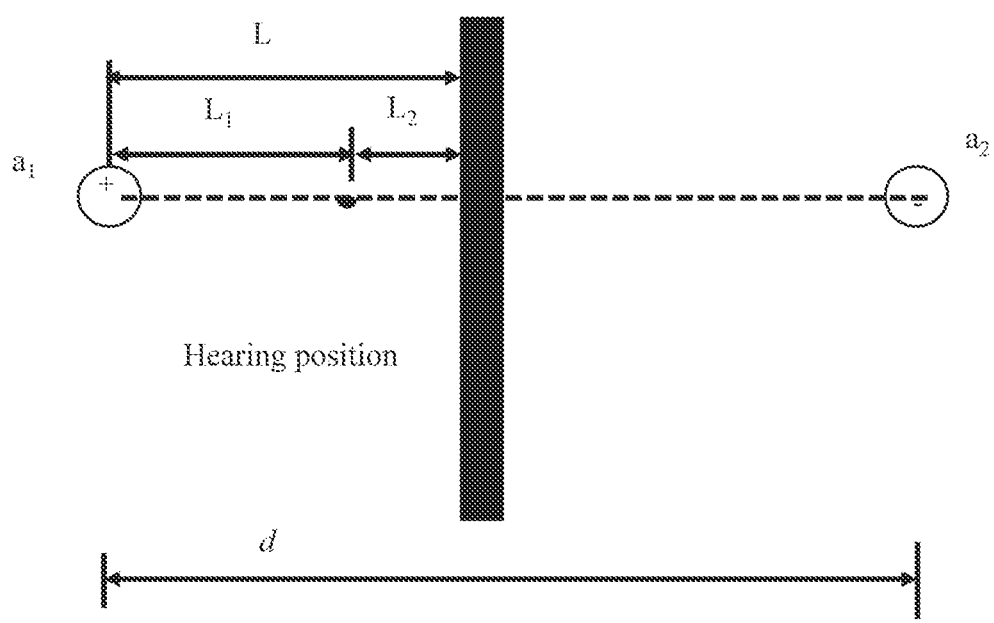
FIG. 33 is a schematic diagram illustrating a dual-point sound source and a baffle according to some embodiments of the present disclosure.

FIG. 33 is a schematic diagram illustrating a dual-point sound source and a baffle (e.g., an auricle) according to some embodiments of the present disclosure. In some embodiments, a position of the baffle disposed between the two sound guiding holes may affect the acoustic output of an acoustic output device. Merely by way of example, as shown in FIG. 33, the baffle may be disposed between a point sound source $a_1$ and a point sound source $a_2$, a hearing position may be located on a line connecting the point sound source $a_1$ and the point sound source $a_2$. In addition, the hearing position may be located between the point sound source $a_1$ and the baffle. A distance between the point sound source $a_1$ and the baffle may be L. A distance between the point sound source $a_1$ and the point sound source $a_2$ may be d. A distance between the point sound source $a_1$ and the heard sound may be $L_1$. A distance between the hearing position and the baffle may be $L_2$. When the distance $L_1$ is constant, a movement of the baffle may change a ratio of L to d, and a volume of the heard sound at the hearing position and/or a volume of a sound leakage in a far-field may be obtained.

Figure 34:
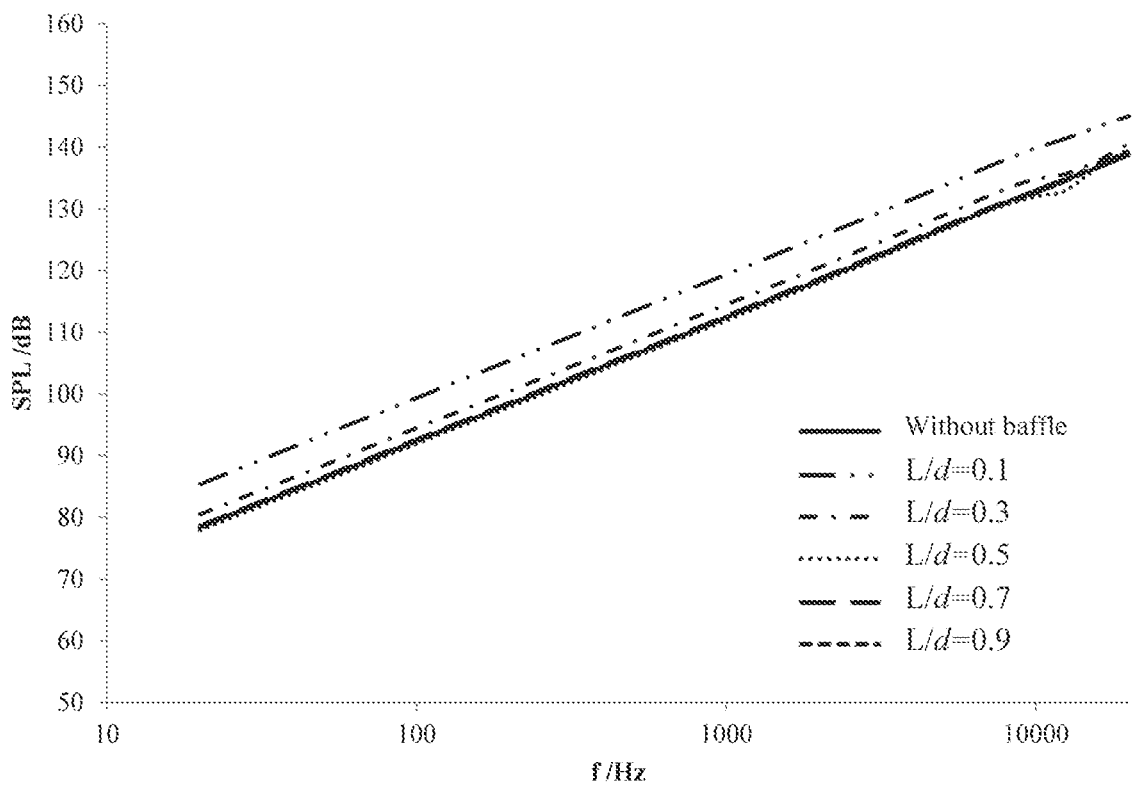
FIG. 34 is a graph illustrating a change of a volume of a sound in a near-field along with a frequency when a baffle is at different positions according to some embodiments of the present disclosure.
Figure 35:
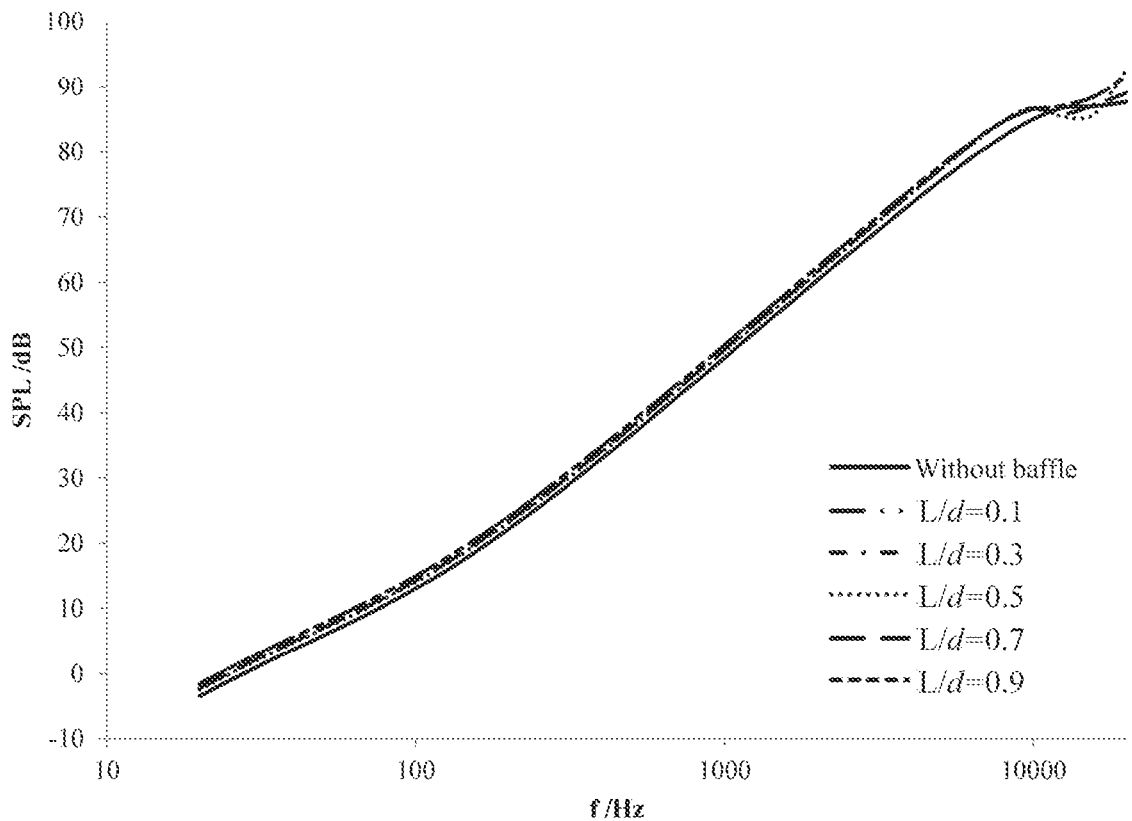
FIG. 35 is a graph illustrating a change of a volume of a leakage sound in a far-field along with a frequency when a baffle is at different positions according to some embodiments of the present disclosure.
Figure 36:
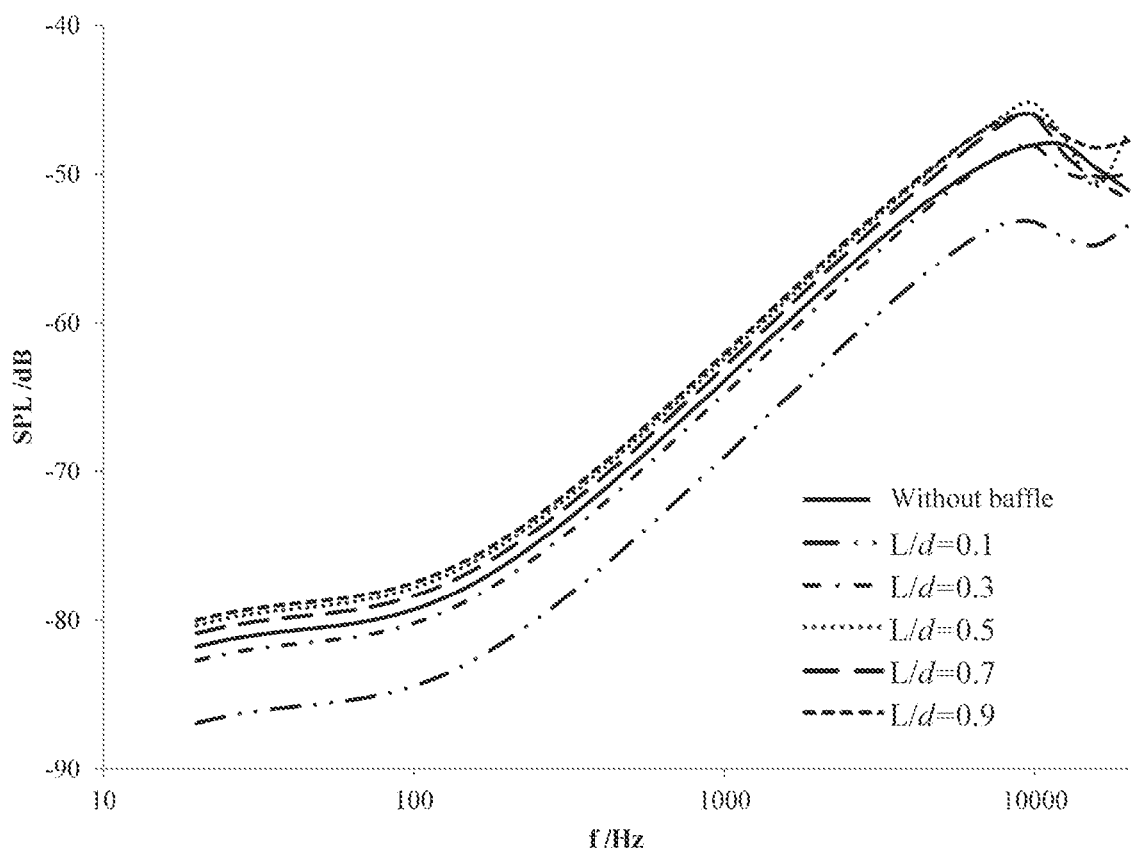
FIG. 36 is a graph illustrating a change of a normalized parameter along with a frequency when a baffle is at different positions according to some embodiments of the present disclosure.

FIG. 34 is a graph illustrating a change of a volume of a sound in a near-field along with a frequency when a baffle is at different positions according to some embodiments of the present disclosure. FIG. 35 is a graph illustrating a change of a volume of a leakage sound in a far-field along with a frequency when a baffle is at different positions according to some embodiments of the present disclosure. FIG. 36 is a graph illustrating a change of a normalized parameter along with a frequency when a baffle is at different positions according to some embodiments of the present disclosure. As shown in FIGS. 34-36, the sound leakage in the far-field may be not changed or a change of the sound leakage in the far-field may be less than a sound threshold when the position of the baffle is changed between the two point sound sources of the dual-point sound source. When a distance d between the point sound source $a_1$ and the point sound source $a_2$ is constant, when L is decreased, a volume of a sound at a hearing position may be increased, the normalized parameter may be decreased, and the capability for reducing sound leakage may be enhanced. When L increases, the volume at the hearing position may be increased, the normalized parameter may be increased, and the capability for reducing the sound leakage may be weakened. When L is relatively small, the hearing position may be close to the baffle, an acoustic route of a sound wave from the point sound source $a_2$ to the hearing position may be increased in the existence of the baffle. In this case, an acoustic route difference between an acoustic route from the point sound source a to the hearing position and an acoustic route from the point sound source $a_2$ to the hearing position may be increased and the interference cancellation of the sound may be reduced. The volume of the sound at the hearing position may be increased in the existence of the baffle. When L is relatively large, the hearing position may be far away from the baffle. The baffle may not affect (or barely affect) the acoustic route difference. The volume at the hearing position may be not changed when the baffle is added.

As described above, by adjusting positions of the sound guiding holes on the acoustic output device, the auricle of the user may be served as the baffle to separate sound guiding holes when the user wears the acoustic output device. In this case, the structure of the acoustic output device may be simplified, and the output effect of the acoustic output device may be further improved. In some embodiments, the positions of the two sound guiding holes may be determined so that a ratio of a distance between the sound guiding hole on the front side of the auricle and the auricle (or a contact point on the acoustic output device for contact with the auricle) to a distance between the two sound guiding holes may be less than or equal to 0.5 when the user wears the acoustic output device. In some embodiments, the ratio of the distance between the sound guiding hole on the front side of the auricle and the auricle to the distance between the two sound guiding holes may be less than or equal to 0.3. In some embodiments, the ratio of the distance between the sound guiding hole on the front side of the auricle and the auricle to the distance between the two sound guiding holes may be less than or equal to 0.1. In some embodiments, the ratio of the distance between the sound guiding hole on the front side of the auricle and the auricle to the distance between the two sound guiding holes may be larger than or equal to 0.05. In some embodiments, a ratio of the distance between the two sound guiding holes to a height of the auricle may be greater than or equal to 0.2. In some embodiments, the ratio may be less than or equal to 4. In some embodiments, the height of the auricle may refer to a length of the auricle in a direction perpendicular to a sagittal plane.

It should be noted that an acoustic route from an acoustic driver to a sound guiding hole in the acoustic output device may affect the volume of the sound in the near-field and sound leakage in the far-field. The acoustic route may be changed by adjusting a length of a chamber between a vibration diaphragm in the acoustic output device and the sound guiding hole. In some embodiments, the acoustic driver may include the vibration diaphragm. A front side and a rear side of the vibration diaphragm may be coupled to two sound guiding holes through a front chamber and a rear chamber, respectively. The acoustic route from the vibration diaphragm to each of the two sound guiding holes may be different. In some embodiments, a ratio of the acoustic route from the vibration diaphragm to one of the two sound guiding holes to the acoustic route from the vibration diaphragm to another of the two sound guiding holes may be 0.5-2. In some embodiments, the ratio may be 0.6-1.5. In some embodiments, the ratio may be 0.8-1.2.

In some embodiments, when the two sound guiding holes transmit the sounds with opposite phases, amplitudes of the sounds may be adjusted to improve the output performance of the acoustic output device. Specifically, the amplitude of the sound transmitted by each of the two sound guiding holes may be adjusted by adjusting an impedance of an acoustic route between the sound guiding hole and an acoustic driver. In some embodiments, the impedance may refer to a resistance that an acoustic wave overcomes when the acoustic wave is transmitted in a medium. In some embodiments, the acoustic route may be or may not be filled with damping material (e.g., a tuning net, tuning cotton, etc.)

to adjust the sound amplitude. For example, a resonance cavity, a sound hole, a sound slit, a tuning net, a tuning cotton, or the like, or any combination thereof, may be disposed in the acoustic route to adjust the acoustic resistance, thereby changing the impedance of the acoustic route. As another example, a hole size of each of the two sound guiding holes may be adjusted to change the acoustic resistance of the acoustic route. In some embodiments, a ratio of acoustic impedance between the acoustic driver (e.g., the vibration diaphragm of the acoustic driver) and the two sound guiding holes may be 0.5-2. In some embodiments, the ratio of the acoustic impedance between the acoustic driver and the two sound guiding holes may be 0.8-1.2.

It should be noted that the above descriptions are merely for illustration purposes, and not intended to limit the present disclosure. It should be understood that, for those skilled in the art, after understanding the principle of the present disclosure, various modifications and changes may be made in the forms and details of the acoustic output device without departing from this principle. For example, the hearing position may not be on the line connecting the dual-point sound source, but may also be above, below, or in an extension direction of the line connecting the dual-point sound source. As another example, a method for measuring the distance between a point sound source and the auricle, and a method for measuring the height of the auricle may also be adjusted according to different conditions. These similar changes may be all within the protection scope of the present disclosure.

Figure 37:
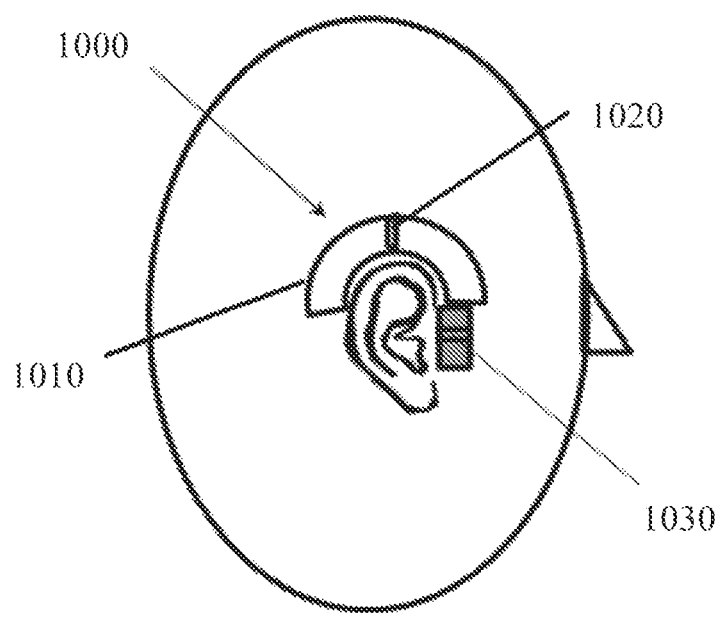
FIG. 37 is a structural diagram illustrating an exemplary acoustic output device according to some embodiments of the present disclosure.

FIG. 37 is a structural diagram illustrating an exemplary acoustic output device according to some embodiments of the present disclosure.

For a human ear, a frequency band of a sound that can be heard may be in a middle-low-frequency band. An optimization goal of the acoustic output device in the mid-low-frequency bands may be to increase a volume of a heard sound. When a hearing position is fixed, parameters of the dual-point sound source may be adjusted to increase the volume of the heard sound and not increase a volume of a leakage sound (e.g., an increase of the volume of the heard sound may be greater than an increase of the volume of the leakage sound). In a high-frequency band, a sound leakage of the dual-point sound source may be not decreased significantly. In the high-frequency band, an optimization goal of the acoustic output device may be reducing the sound leakage. The sound leakage may be further reduced and a leakage-reducing frequency band may be expanded by adjusting the parameters of the dual-point sound source of different frequencies. In some embodiments, the acoustic output device 1000 may include an acoustic driver 1030. The acoustic driver 1030 may output sound through two of the second sound guiding holes. More descriptions regarding the acoustic driver 1030, the second sound guiding holes, and a structure therebetween may be described with reference to the acoustic driver 1020 and/or the first sound guiding holes and the relevant descriptions thereof. In some embodiments, the acoustic driver 1030 and the acoustic driver 1020 may output sounds with different frequencies, respectively. In some embodiments, the acoustic output device 1000 may include a controller configured to cause the acoustic driver 1020 to output a sound within a first frequency range and cause the acoustic driver 1030 to output a sound within a second frequency range. Each frequency within the second frequency range may be higher than each frequency within the first frequency range. For example, the first frequency range may be 100 Hz-1000 Hz, and the second frequency range may be 1000 Hz-10000 Hz.

In some embodiments, the acoustic driver 1020 may be a low-frequency speaker, and the acoustic driver 1030 may be a middle-high-frequency speaker. Due to different frequency response characteristics of the low-frequency speaker and the middle-high-frequency speaker, frequency bands of sounds output by the acoustic driver 1020 and the acoustic driver 1030 may be different. A high-frequency band and a low-frequency band may be divided using the low-frequency speaker and the middle-high-frequency speaker, and accordingly, a dual-point sound source with a low-frequency and a dual-point sound source with a middle-high-frequency may be constructed to output sound in the near-field output and/or reduce sound leakage in the far-field. For example, the dual-point sound source for outputting low-frequency sound may be formed when the acoustic driver 1020 outputs the low-frequency sound through the sound guiding hole 1011 and the sound guiding hole 1012 shown in FIG. 1. The dual-point sound source with low-frequency may be disposed on two sides of an auricle to increase a volume heard by an ear near the near-field. A dual-point sound source for outputting middle-high-frequency sound may be formed when the acoustic driver 1030 outputs the middle-high-frequency sound through two second sound guiding holes. A middle-high-frequency sound leakage may be reduced by adjusting a distance between the two second sound guiding holes. The dual-point sound source with middle-high-frequency may be disposed on two sides of the auricle, or the same side of the auricle. Alternatively, the acoustic driver 1020 may provide a dual-point sound source for outputting full-frequency sound through the sound guiding hole 1011 and the sound guiding hole 1012 to increase the volume of the sound in the near-field.

Further, a distance $d_2$ between the two second sound guiding holes may be less than a distance $d_1$ between the sound guiding hole 1011 and the sound guiding hole 1012, that is, $d_1$ may be greater than $d_2$. For illustration purposes, as shown in FIG. 9, two sets of dual-point sound sources may have a stronger sound leakage reduction capability than that of a single point sound source and that of one single set of dual-point sound source, and the two sets of dual-point sound sources may include one set of a low-frequency dual-point sound source and one set of a high-frequency dual-point sound source, and a distance between two point sound sources of each set of the dual-point sound sources may be different.

It should be noted that the sound guiding holes of the acoustic output device may be not limited to the two sound guiding holes 1011 and 1012 corresponding to the acoustic driver 1720 shown in FIG. 37 distributed on two sides of the auricle, and the two sound guiding holes corresponding to the acoustic driver 1030 may be distributed on the front side of the auricle. For example, in some embodiments, the two second sound guiding holes corresponding to the acoustic driver 1030 may be disposed on the same side of the auricle (e.g., a rear side, an upper side, or a lower side of the auricle). As another example, the two second sound guiding holes corresponding to the acoustic driver 1030 may be disposed on two sides of the auricle. In some embodiments, when the sound guiding holes 1011 and the sound guiding hole 1012 and/or the two second sound guiding holes are disposed on the same side of the auricle, a baffle may be disposed between the sound guiding holes 1011 and the sound guiding hole 1012 and/or the two second sound guiding holes to further increase the volume of the sound in the near-field and reduce the sound leakage in the far-field.

As yet another example, the two sound guiding holes corresponding to the acoustic driver 1020 may be disposed on the same side of the auricle (e.g., the front side, the rear side, the upper side, the lower side, etc. of the auricle).

Figure 38:
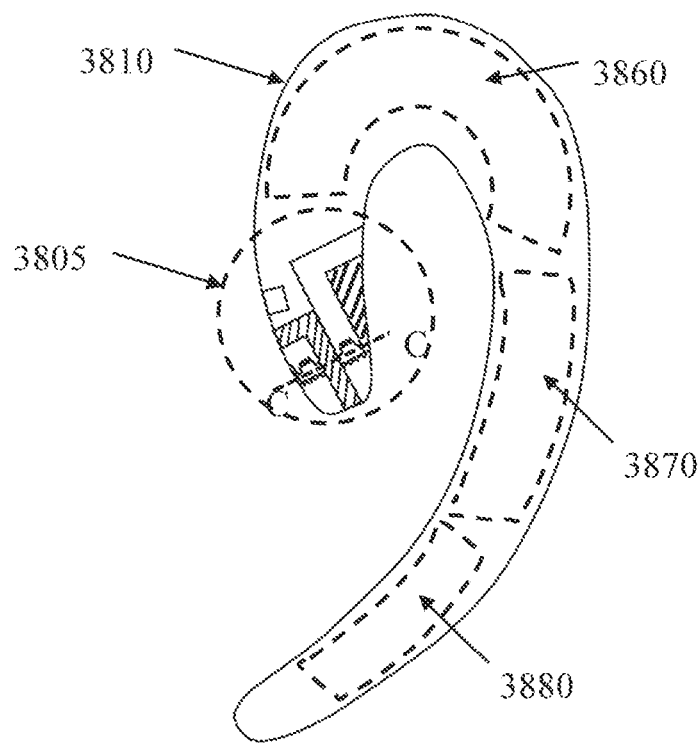
FIG. 38 is a cross-sectional view of an exemplary open binaural earphone according to some embodiments of the present disclosure.
Figure 39:
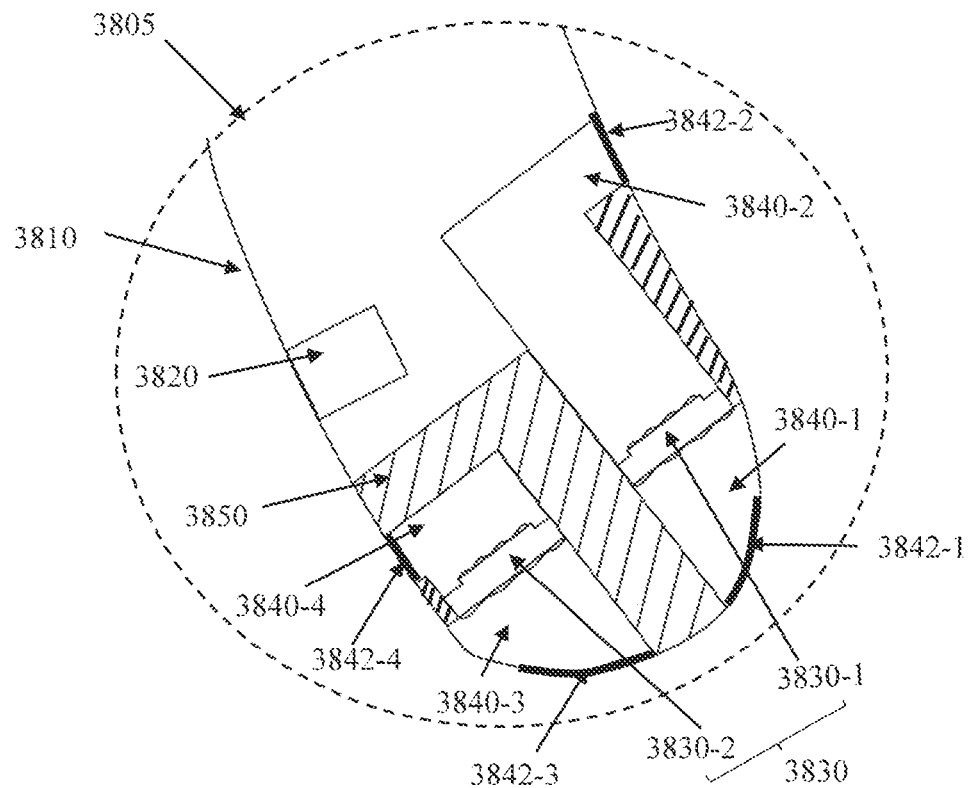
FIG. 39 is a schematic diagram illustrating a sound generation structure of an exemplary open binaural earphone according to some embodiments of the present disclosure.
Figure 40:
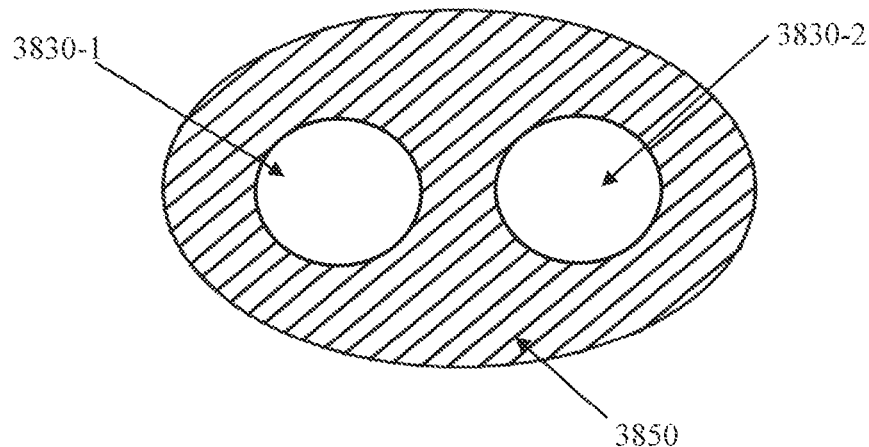
FIG. 40 is a cross-sectional view of a baffle of an exemplary open binaural earphone according to some embodiments of the present disclosure.

FIG. 38 is a cross-sectional view of an exemplary open binaural earphone according to some embodiments of the present disclosure. FIG. 39 is a schematic diagram illustrating a sound generation structure of an exemplary open binaural earphone according to some embodiments of the present disclosure. In some embodiments, a sound generation structure 3900 may be an exemplary embodiment of a sound generation structure 3850 of an open binaural earphone 3800. FIG. 40 is a cross-sectional view of a baffle of an exemplary open binaural earphone according to some embodiments of the present disclosure. In some embodiments, the cross-sectional view of a baffle 4000 in FIG. 40 may be an exemplary embodiment of a cross-sectional view of a baffle of the open binaural earphone 3800 along a C-C section. As shown in FIG. 38, FIG. 39, and FIG. 40, the open binaural earphone 3800 may include a housing 3810, at least one microphone 3820, one or more acoustic drivers 3830, and at least one guiding tube (e.g., a guiding tube 3840-1, a guiding tube 3840-2, a guiding tube 3840-3, a guiding tube 3840-4, etc.) corresponding to the acoustic driver(s) 3830, the baffle 3850, a circuit board 3860, a Bluetooth module 3870, and a power source module 3880. In some embodiments, the open binaural earphone 3800 may further include an electronic frequency division unit (not shown in the figure, please refer to the electronic frequency division unit 110). In some embodiments, the electronic frequency division unit, the acoustic driver(s) 3830, and the guiding tube may be collectively referred to as an acoustic output device. More descriptions regarding the acoustic output device may be found elsewhere in the present disclosure. See, e.g., FIG. 1 to FIG. 37 (e.g., the acoustic output device 100, the acoustic output device 300, the acoustic output device 400, the acoustic output device 500, the acoustic output device 600, the acoustic output device 1000, etc.) and the relevant descriptions thereof.

In some embodiments, the electronic frequency division unit may be disposed in the housing 3810. Exemplary electronic frequency division units may include a passive filter, an active filter, an analog filter, a digital filter, or the like, or any combination thereof. In some embodiments, the acoustic driver(s) 3830 with different frequency response characteristics (e.g., a low-frequency transducer, an intermediate-frequency transducer, and/or a high-frequency transducer) may be disposed, and the transducers with different frequency responses may output sound including different frequency components. In some embodiments, frequency division processing of an audio signal may also be implemented in acoustic routes. For example, the acoustic driver(s) 3830 may generate a full-band sound, and the sound output by the acoustic driver(s) 3830 may be acoustically filtered in acoustic routes with different acoustic impedances, and the sound output through different acoustic routes may have different frequency components. More descriptions regarding the frequency division based on acoustic routes may be found elsewhere in the present disclosure. Sec, e.g., FIG. 4, FIGS. 8A to 8C and the relevant descriptions thereof. In some embodiments, the frequency division processing of the audio signal may be implemented by two or more of the manners mentioned above.

Voice signals with different frequency components generated by the acoustic driver(s) 3830 may be output to the user from different sound guiding holes 3842 (e.g., a sound guiding hole 5942-1, a sound guiding hole 3842-2, a sound guiding hole 3842-3, a guide hole 3842-4, etc.) through the guiding tube. It should be noted that the guiding tube may be only an exemplary embodiment of the acoustic route through which sound may propagate in the open binaural earphone 3800. Those skilled in the art may use other acoustic routes (e.g., an acoustic cavity, a resonant cavity, an acoustic hole, an acoustic slit, a tuning net, etc., or any combination thereof) or other ways to make the sound propagate in the open binaural earphone 3800, which may be not limited herein.

In some embodiments, frequency-divided signals generated after the audio signal is processed may have narrower frequency bands than a frequency band of the audio signal. The frequency bands of the frequency-divided signals may be within the frequency band of the audio signal. For example, the frequency band of the audio signal may be from 10 Hz to 30 kHz. The frequency bands of the frequency-divided signal may be 100 Hz to 200 Hz, which may be narrower than the frequency band of the audio signal and within the frequency band of the audio signal. In some embodiments, a combination of the frequency bands of the frequency-divided signals may cover the frequency band of the audio signal. Additionally or alternatively, the combination of frequency bands of the frequency-divided signal may partially cover the frequency band of the audio signal. In some embodiments, at least two of the frequency-divided signals may have different frequency bands. As used herein, the different frequency bands may refer to two frequency bands that have different frequency band center values and/or different frequency bandwidths. Optionally, each frequency-divided signal may have a characteristic frequency band that is different from that of other frequency-divided signals. That is, the frequency band of a frequency-divided signal may not overlap with the frequency bands of other frequency-divided signals. Different frequency-divided signals may have the same frequency bandwidth or different frequency bandwidths. In some embodiments, an overlap between the frequency bands of two adjacent frequency-divided signals in a frequency domain may be avoided, thereby improving the quality of the output sound. Among the generated frequency-divided signals, two frequency-divided signals with close center frequencies may be considered to be adjacent to each other in the frequency domain. More descriptions regarding the frequency bands of a pair of adjacent frequency-divided signals may be found elsewhere in the present disclosure. See, e.g., 42A and 42B and the relevant descriptions thereof. In some embodiments, a low-frequency sound and a high-frequency sound actually output by the open binaural earphone 3800 may be affected by various factors such as filtering characteristics of actual circuits, frequency characteristics of the transducers, frequency characteristics of the acoustic routes, etc., and the low frequency sound and the high frequency sound may have a certain overlap (e.g., an aliasing portion) in the frequency band near a frequency-divided point. It should be understood that the overlap may not affect an overall sound leakage reduction effect of the open binaural earphone 3800.

The housing 3810 may be an external structure of the open binaural earphone 3800, and a shape of the housing 3810 may be determined according to a wearing type (e.g., ear-hook earphone, a headband earphone, etc.) and a usage requirement, which is not limited herein. For example, the housing 3810 may match the auricle of the user and may be hung on the ear of the user such that the open binaural earphone 3800 may not fall easily. The open binaural earphone 3800 with the housing 3810 may be referred to as an ear-hook earphone. As another example, the housing 3810 may cross the user's head and immobilize on the head of the user in a manner similar to a headband. Two ends of the housing 3810 may have a distance from the user's ears. The open binaural earphone with the housing 3810 may be referred to as a headband open binaural earphone.

The housing 3810 may include a hollow structure. The microphone 3820, the acoustic driver(s) 3830, the guiding tube, the baffle 3850, the circuit board 3860, the Bluetooth module 3870, the power source module 3880, etc., may be disposed in the hollow structure. As shown in FIG. 38, the microphone 3820 and the acoustic driver(s) 3830 may be disposed at a front end of the housing 3810. The circuit board 3860 may be disposed in a middle portion of the housing 3810. The Bluetooth module 3870 and the power source module 3880 may be disposed at a rear end of the housing 3810. As used herein, the front end of the housing 3810 refers to an end of the housing 3810 close to an ear canal of a user when the user wears the open binaural earphone, the rear end of the housing 3810 refers to an end of the housing 3810 away from the ear canal of the user when the user wears the open binaural earphone, the middle portion of the housing 3810 refers to a portion of the housing between the front end of the housing 3810 and the rear end of the housing 3810. In some embodiments, the microphone 3820, the acoustic driver(s) 3830, the guiding tube, the baffle 3850, the circuit board 3860, the Bluetooth module 3870, and the power source module 3880 may be disposed in any other suitable positions of the housing 3810, which are not limited herein. For example, the acoustic driver 3830-1, the microphone 3820, the circuit board 3860, etc., may be disposed at the front end of the housing 3810, the Bluetooth module 3870 may be disposed in the middle portion of the housing 3810, and the acoustic driver 3830-2, the battery module 3880 may be disposed at the rear end of the housing 3810. As another example, the Bluetooth module 3870 and the power source module 3880 may be disposed at the front end of the housing 3810, the microphone 3820 and the circuit board 3860 may be disposed at the middle portion of the housing 3810, the acoustic driver 3830-1 and the acoustic driver 3830-2 may be disposed at the rear end of the housing 3810, and the sound guiding hole may be disposed at the front end of the housing 3810 through a guiding tube. It should be noted that the positions of the microphone 3820, the acoustic driver(s) 3830, the guiding tube, the baffle 3850, the circuit board 3860, the Bluetooth module 3870, and the power source module 3880 in the housing 3810 may be determined based on an actual requirement for the open binaural earphone 3800, and the specific positions of the components in the drawings are only for illustration purposes and do not limit the protection scope of the present disclosure. As shown in FIG. 40, the acoustic driver 3830-1 and the acoustic driver 3830-2 may be separated by the baffle 3850.

In some embodiments, the housing 3810 may be integrally formed. In some embodiments, the housing 3810 may be assembled via a plugging manner, a snapping manner, etc. In some embodiments, the housing 3810 may be made of a metal (e.g., copper, aluminum, titanium, gold, etc.), an alloy (e.g., aluminum alloy, a titanium alloy, etc.), a plastic (e.g., polyethylene, polypropylene, epoxy resin, nylon, etc.), a fiber (e.g., acetate fiber, propionate fiber, carbon fiber, etc.). In some embodiments, a protective cover may be disposed outside the housing 3810. The protective cover may be made of a soft material with certain elasticity, such as a soft silica gel, a rubber, etc., to provide a better touch sense for the user.

The surface of the housing 3810 may include one or more sound guiding holes, for example, the first sound guiding hole 3842-1, the second sound guiding hole 3842-2, the third sound guiding hole 3842-3, and the fourth sound guiding hole 3842-4. The open binaural earphone 3800 may transmit sound to the user through the air via the sound guiding holes. The acoustic driver(s) 3830 may convert the frequency-divided signals (e.g., an electrical signal) into a voice signal, transmit the voice signal to the sound guiding hole corresponding to the acoustic driver through the guiding tube corresponding to the sound guiding hole, and transmit the voice signal to the user through the sound guiding hole. To illustrate the effect of the sound guiding holes on the housing 3810 on the sound output by the open binaural earphone 3800, the sound guiding holes on the open binaural earphone 3800 may be regarded as sound sources for outputting sound (actually, the sound source may be still an acoustic output device) considering that the sound may be regarded as propagating from the sound guiding holes in the present disclosure. For the convenience of description and the purposes of illustration, when the sound guiding hole on the open binaural earphone 3800 has a relatively small size, each sound guiding hole may be regarded (or approximately regarded) as a point sound source.

The microphone 3820 may be configured to receive an external voice signal (e.g., a user's voice signal), and convert the received voice signal into an electrical signal. The voice signal received by the microphone 3820 may be processed to generate an audio signal (or frequency-divided signals). The process of the voice signal may include filtering, denoising, amplifying, smoothing and/or frequency division, or the like, or any combination thereof. The audio signal may be sent to an object or a device that is communicated with the open binaural earphone 3800 through other components (e.g., a Bluetooth assembly, a wireless fidelity (WIFI) assembly, etc.) of the open binaural earphone 3800.

The acoustic driver(s) 3830 may be configured to convert an input electrical signal into a voice signal and output the voice signal. The conversion technique may include a technique of vibrating and generating a sound. In some embodiments, the acoustic driver(s) 3830 may process the received audio signal into frequency-divided signals due to different frequency responses of the acoustic drive(s) 3830, convert the frequency-divided signals into voice signals with different frequency bands, and output the voice signals to the user who wears the open binaural earphone 3800. In some embodiments, the acoustic driver(s) 3830 may directly receive frequency-divided signals with different frequency bands, convert the received frequency-divided signals into voice signals, and output the voice signals to the user who wears the open binaural earphones 3800. In some embodiments, the acoustic driver(s) 3830 may include at least two loudspeaker units (or transducers). For example, only two loudspeaker units are shown in FIG. 38, FIG. 39, and FIG. 40 (i.e., a first loudspeaker unit 3830-1 and a second loudspeaker unit 3830-2). The first loudspeaker unit 3830-1 may correspond to a low-frequency signal, and the second loudspeaker unit 3830-2 may correspond to a high-frequency signal. In some embodiments, the acoustic driver(s) 3830 may include an air conductive loudspeaker, a bone conductive loudspeaker, a hydro-acoustic transducer, an ultrasonic transducer, or the like, or any combination thereof. In some embodiments, the acoustic driver(s) 3830 may include a moving coil loudspeaker, a moving iron loudspeaker, a piezoelectric loudspeaker, an electrostatic loudspeaker, a magnetostrictive loudspeaker, a balanced armature loudspeaker, or the like, or any combination thereof. In some embodiments, the loudspeaker units may have the same frequency response characteristic. In some embodiments, the loudspeaker units may have different frequency response characteristics.

It may be noted that a specific loudspeaker unit corresponding to a specific frequency-divided signal may indicate that a frequency band of the frequency-divided signal input to the specific loudspeaker unit may be the same as the frequency band of the specific frequency-divided signal, may indicate that the specific loudspeaker unit may generate the specific voice signal, or may indicate that the frequency band of the specific voice signal transmitted through the sound guiding hole after that the specific voice signal processed and transmitted by the specific loudspeaker unit may be the same as that of the specific frequency-divided signal.

Each loudspeaker unit may be configured to convert the input electrical signals (e.g., different frequency-divided signals) into voice signals using the technique of vibrating and generating the sound and output the voice signals. In some embodiments, each loudspeaker unit may correspond to two sound guiding holes. Each loudspeaker unit may output a set of voice signals with opposite phases and the same intensity, which may be respectively transmitted to the user through the guiding tube and the corresponding two sound guiding holes 3842. For example, the loudspeaker unit may include a vibration diaphragm, which may be driven by an electric signal to generate vibration, and a front side and a rear side of the vibration diaphragm may simultaneously output a positive phase sound and a reverse-phase sound. In some embodiments, by setting positions of the sound guiding holes, the positive phase sound and the reverse phase sound may have the same or similar phase at a hearing position and may be superimposed at the hearing position (i.e., the near-field such as a center position of an ear hole of a human ear). In addition, the positive phase sound and the reverse phase sound in the far-field may have different phases (e.g., a common leakage point in the surrounding environment) and may be canceled out in the far-field, thereby improving a volume of a sound in the near-field and reducing sound leakage in the far-field. In some embodiments, sound guiding holes corresponding to the same loudspeaker unit may be referred to as a dual-point sound source. For example, the first sound guiding hole 3842-1 and the second sound guiding hole 3842-2 corresponding to the loudspeaker unit 3830-1 may be referred to as a dual-point sound source, and/or the third sound guiding hole 3842-2 and the fourth sound guiding hole 3842-3 corresponding to the loudspeaker unit 3830-2 may be referred to as a dual-point sound source. In some embodiments, frequency bands and amplitudes of frequency-divided signals transmitted from sound guiding holes of the dual-point sound source may be the same, respectively, and phases thereof may be different (e.g., the phases may be opposite). In some embodiments, the frequency bands of the frequency-divided signals transmitted from the sound guiding holes in the dual-point sound source may be the same, and the phases may be the same. In some embodiments, a loudspeaker unit may correspond to one single sound guiding hole. That is, the loudspeaker unit may correspond to a single point sound source. In other words, the loudspeaker unit may output only one frequency-divided signal. For example, a side of the loudspeaker unit 3830-1 facing the sound guiding hole 3842-2 may be sealed. A dual-point sound source may be constructed by two loudspeaker units (i.e., two single point sound sources). For example, two balanced armature loudspeakers may be configured to construct a high-frequency dual-point sound source (i.e., the dual-point sound source corresponding to a high-frequency signal). In some embodiments, a frequency, a phase, an amplitude, and other parameters of the frequency-divided signal corresponding to each point sound source in each set of dual-point sound sources may be adjusted individually. For example, the frequency of each point sound source in each set of dual-point sound sources may be the same, and the phase may be the same or different. As another example, the frequency of each point sound source in each set of dual-point sound sources may be the same, and the amplitude may be the same or different.

In some embodiments, the higher the frequency band of the frequency-divided signal corresponding to the loudspeaker unit is, the shorter a distance between two sound guiding holes corresponding to the loudspeaker unit may be. For example, the first loudspeaker unit 3830-1 may be configured to output low-frequency signals, and the second loudspeaker unit 3830-2 may be configured to output high-frequency signals. A distance between the first sound guiding hole 3842-1 and the second sound guiding hole 3842-2 corresponding to the first loudspeaker unit 3830-1 may be greater than a distance between the third sound guiding hole 3842-3 and the fourth sound guiding hole 3842-4 corresponding to the second loudspeaker unit 3830-2. By setting the distance of the sound guiding holes corresponding to the loudspeaker units in this manner, the sound leakage of the open binaural earphone 3800 may be reduced. It may be because when the distance between the two point sound sources of the dual-point sound source is constant, the leakage sound generated by the dual-point sound source may be increased with the increment of the audio frequency, and the leakage reduction may be reduced with the increment of the audio frequency. When the audio frequency is greater than a certain value, the leakage sound of the dual-point sound source may be more than that of the single-point sound source, and the certain value may be an upper limit frequency at which the dual-point sound source may reduce the sound leakage. More descriptions regarding the distance, the dual-point sound source, and the upper limit frequency of sound leakage may be found elsewhere in the present disclosure. See, e.g., FIG. 2 and FIG. 3 and the relevant descriptions thereof. For different frequency-divided signals, by setting a plurality of sets of dual-point sound sources the point sound sources in each of which may be with different distances, a stronger leakage reduction ability than that of the single-point sound source may be obtained. For example, the audio signal may be divided into three frequency bands such as a low frequency band, a medium frequency band, and a high frequency band. A low-frequency dual-point sound source, a mid-frequency dual-point sound source, and a high-frequency dual-point sound source may be generated by setting different distances between two point sound sources of each of the dual-point sound sources. The low-frequency dual-point sound source may have a relatively large distance than the high-frequency dual-point sound source and mid-frequency dual-point sound source, the mid-frequency dual-point sound source may have a middle distance between the low-frequency dual-point sound source and high-frequency dual-point sound source, and the high-frequency dual-point sound source may have a relatively small distance than the low-frequency dual-point sound source and mid-frequency dual-point sound source. In the low-frequency band, due to the increment of the volume of the sound is greater than the increment of the volume of the leakage sound when the distance between the sound sources is enlarged, a sound with a relatively high volume may be output in the low-frequency band. Due to the sound leakage of the dual-point sound source in the low-frequency band is relatively small, when the distance between the sound sources is enlarged, the sound leakage may be slightly increased and kept at a relatively low level. In the high-frequency band, a relatively low upper limit frequency of high-frequency leakage reduction may be improved and a relatively narrow audio frequency range of the leakage reduction may be enlarged by decreasing the distance between the sound sources. The open binaural earphone 3800 may have a relatively strong sound leakage reduction effect in higher-frequency bands, which may satisfy the requirements of open binaural.

In some embodiments, the acoustic driver(s) 3830 may include the first loudspeaker unit 3830-1 and the second loudspeaker unit 3830-2, the first loudspeaker unit 3830-1 may correspond to a low-frequency signal, and the second loudspeaker unit 3830-2 may correspond to a high-frequency signal. In some embodiments, the frequency division point between the low frequency and the high frequency may be between 600 Hz and 1.2 kHz. In some embodiments, the first loudspeaker unit 3830-1 may correspond to the sound guiding hole 3842-1 and the sound guiding hole 3842-2, and the second loudspeaker unit 3830-2 may correspond to the sound guiding hole 3842-3 and the sound guiding hole 3842-4. A distance $d_l$ between the sound guiding hole 3842-1 and the sound guiding hole 3842-2 and the distance $d_h$ between the sound guiding hole 3842-3 and the sound guiding hole 3842-4 may be various. Merely by way of example, $d_l$ may be not larger than 40 millimeters, for example, in the range of 20 millimeters-40 millimeters, and $d_h$ may be not larger than 12 millimeters and $d_l$ is larger than $d_h$. In some embodiments, $d_l$ may be not less than 12 millimeters, and $d_h$ may be not greater than 7 millimeters, for example, in the range of 3 millimeters-7 millimeters. In some embodiments, $d_l$ may be 30 millimeters, and $d_h$ may be 5 millimeters. As another example, $d_l$ may be at least twice of $d_h$. In some embodiments, $d_l$ may be at least 3 times of $d_h$. In some embodiments, $d_l$ may be at least 5 times of $d_h$. In some embodiments, a range of $$\frac{d_l}{d_h}$$

may be 2-10. In some embodiments, the range $$\frac{d_l}{d_h}$$

may be 2.5-9.5. In some embodiments, the range of $$\frac{d_l}{d_h}$$

may be 3-9. In some embodiments, the range of $$\frac{d_l}{d_h}$$

may be 3.5-8.5. In some embodiments, the range of $$\frac{d_l}{d_h}$$

may be 4-8. In some embodiments, the range of $$\frac{d_l}{d_h}$$

may be 4.5-7.5. In some embodiments, the range of $$\frac{d_l}{d_h}$$

may be 5-7. In some embodiments, the range of $$\frac{d_l}{d_h}$$

may be 5.5-6.5. In some embodiments, the range of $$\frac{d_l}{d_h}$$

may be 6.

Figure 41:
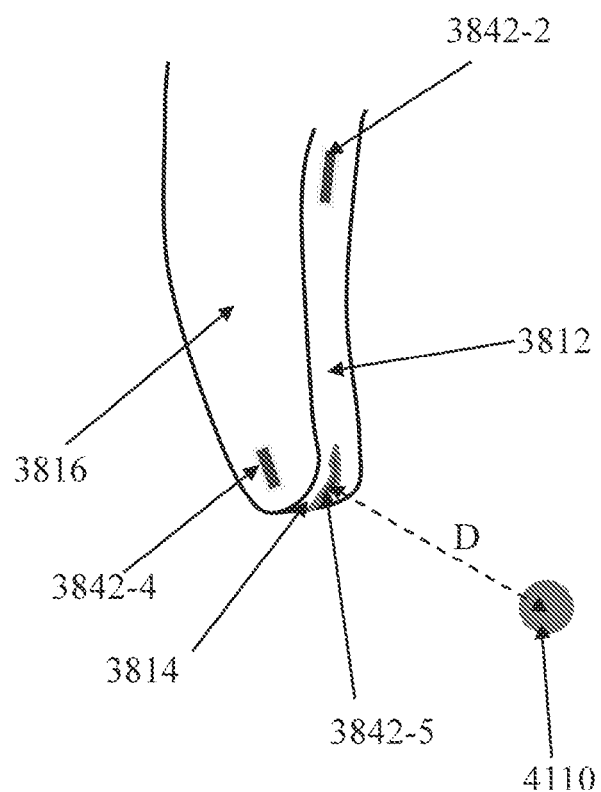
FIG. 41 is a schematic diagram illustrating exemplary positions of sound guiding holes according to some embodiments of the present disclosure.

In some embodiments, each set of dual-point sound sources may include a near-ear point sound source and a far-ear point sound source. For example, when the user wears the open binaural earphones 3800, the first sound guiding hole 3842-1 may be closer to the ear hole than the second sound guiding hole 3842-2, and the third sound guiding hole 3842-3 may be closer to the ear hole than the fourth sound guiding hole 3842-4, and accordingly, the first sound guiding hole 3842-1 and the third sound guiding hole 3842-3 may be referred to as the near-ear point sound sources, the second sound guiding hole 3842-2 and the fourth sound guiding hole 3842-4 may be referred to as the far-ear point sound sources. In some embodiments, a distance L between the first sound guiding hole 3842-1 and the third sound guiding hole 3842-3 may be not greater than 20 millimeters. In some embodiments, the distance L may be not greater than 18 millimeters. In some embodiments, the distance L may be not greater than 16 millimeters. In some embodiments, the distance L may be not greater than 14 millimeters. In some embodiments, the distance L may be not greater than 12 millimeters. In some embodiments, the distance L may not greater than 10 millimeters. In some embodiments, the distance L may be not greater than 9 millimeters. In some embodiments, the distance L may be not greater than 8 millimeters. In some embodiments, the distance L may be not greater than 7 millimeters. In some embodiments, the distance L may be not greater than 6 millimeters. In some embodiments, the distance L may be not greater than 5 millimeters. In some embodiments, the distance L may be not greater than 4 millimeters. In some embodiments, the distance L may be not greater than 3. mm. In some embodiments, the distance L may be not greater than 2 millimeters. In some embodiments, the distance L may be not greater than 1 millimeter. In some embodiments, the distance L may be equal to zero. When the distance L is equal to 0, the near-ear point sound sources in each set of dual-point sound sources may be combined into one sound guiding hole and configured as a main sound guiding hole to transmit sound to the ear hole of the user. For example, the first sound guiding hole 3842-1 and the third sound guiding hole 3842-3 may be combined into one sound guiding hole (e.g., a sound guiding hole 3842-5 in FIG. 41). In some embodiments, at least a portion of at least one sound guiding hole may face the user's ear. In this case, the sound from the sound guiding hole may be transmitted to the user's ear hole (as shown in FIG. 41).

In some embodiments, a shape of the sound guiding hole may include a strip-shape, a circle, an ellipse, a square, a trapezoid, a rounded quadrilateral, a triangle, an irregular shape, or the like, or any combination thereof. In some embodiments, the shapes of the sound guiding holes may be the same or different. For example, a shape of the first sound guiding hole 3842-1 and a shape of the third sound guiding hole 3842-3 may be circular, and a shape of the second sound guiding hole 3842-2 and a shape of the fourth sound guiding hole 3842-4 may be oval. As another example, the shape of the first sound guiding hole 3842-1 may be strip-shaped, the shape of the second sound guiding hole 3842-2 may be an oval, the shape of the third sound guiding hole 3842-3 may be a circle, and the shape of the fourth sound guiding holes 3842-4 may be triangular. As yet another example, the shapes of the first sound guiding hole 3842-1, the second sound guiding hole 3842-2, the third sound guiding hole 3842-3, and the fourth sound guiding hole 3842-4 may be all strip-shaped.

In some embodiments, apertures or sizes of sound guiding holes corresponding to different loudspeaker units may be the same or different. In some embodiments, when the sizes of the sound guiding holes are different, the volumes of the corresponding sound and/or leakage sound may be different. In some embodiments, by setting a near-to-far aperture ratio (i.e., the ratio of the aperture of a sound guiding hole near an ear, i.e., a near-ear point sound source to the aperture of a sound guiding hole far away the ear, i.e., far-ear point sound source), the dual-point sound source may obtain relatively strong leakage reduction capability. In some embodiments, the higher a frequency band of a frequency-divided signal corresponding to a dual-point sound source is, the smaller the near-to-far aperture ratio may be. As the frequency band of the frequency-divided signal corresponding to the dual-point sound source becomes higher, the aperture of the near-ear point sound source and the aperture of the far-ear point sound source may gradually become the same. For example, for the dual-point sound source corresponding to low-frequency signals, the aperture of the near-ear point sound source may be greater than the aperture of the far-ear point sound source. For the dual-point sound source corresponding to high-frequency signals, the aperture of the near-ear point sound source may be the same as or similar to that of the far-ear point sound source.

In some embodiments, the near-to-far aperture ratio of the dual-point sound source corresponding to the low-frequency signals may be not less than 1. In some embodiments, the near-to-far aperture ratio of the dual-point sound source corresponding to the low-frequency signals may be not less than 5. In some embodiments, the near-to-far aperture ratio may be not less than 10. In some embodiments, the near-to-far aperture ratio of the dual-point sound source corresponding to the low-frequency signals may be not less than 15. In some embodiments, the near-to-far aperture ratio of the dual-point sound source corresponding to the low-frequency signals may be not less than 20. In some embodiments, the near-to-far aperture ratio of the dual-point sound source corresponding to the low-frequency signals may be not less than 25. In some embodiments, the near-to-far aperture ratio of the dual-point sound source corresponding to the low-frequency signals may be not less than 30.

In some embodiments, the near-to-far aperture ratio of a dual-point sound source corresponding to the high-frequency signals may be not greater than 10. In some embodiments, the near-to-far aperture ratio of the dual-point sound source corresponding to the high-frequency signals may be not greater than 8. In some embodiments, the near-to-far aperture ratio of the dual-point sound source corresponding to the high-frequency signals may be not greater than 6. In some embodiments, the near-to-far aperture ratio of the dual-point sound source corresponding to the high-frequency signals may be not greater than 4. In some embodiments, the near-to-far aperture ratio of the dual-point sound source corresponding to the high-frequency signals may be not greater than 3. In some embodiments, the near-to-far aperture ratio of the dual-point sound source corresponding to the high-frequency signals may be not greater than 2. In some embodiments, the near-to-far aperture ratio of the dual-point sound source corresponding to the high-frequency signals may be equal to 1.

In some embodiments, by adjusting the positions of different sound guiding holes, the user may obtain different listening effects. More descriptions regarding the positions of the sound guiding holes and a hearing position may be found elsewhere in the present disclosure. See, e.g., FIG. 28 and the relevant descriptions thereof. In some embodiments, when the user wears the open binaural earphone 3800, a distance $D_n$ between a center point of the near-ear point sound source of each set of dual-point sound source and a center point of the user's ear hole may be no more than 10 centimeters, thereby improving the user's listening experience. In some embodiments, the distance $D_n$ may be no more than 9 centimeters. In some embodiments, the distance $D_n$ may be no more than 8 centimeters. In some embodiments, the distance $D_n$ may be no more than 7 centimeters. In some embodiments, the distance $D_n$ may be no more than 6 centimeters. In some embodiments, the distance $D_n$ may be no more than 5 centimeters. In some embodiments, the distance $D_n$ may be no more than 4 centimeters. In some embodiments, the distance $D_n$ may be no more than 3 centimeters. In some embodiments, the distance $D_n$ may be no more than 2.5 centimeters. In some embodiments, the distance $D_n$ may be no more than 2 centimeters. In some embodiments, the distance $D_n$ may be no more than 1.5 centimeters. In some embodiments, the distance $D_n$ may be no more than 1 centimeters. In some embodiments, the distance $D_n$ may be no more than 0.5 centimeters. In some embodiments, the distance $D_n$ may be no more than 0.4 centimeters. In some embodiments, the distance $D_n$ may be no more than 0.3 centimeters. In some embodiments, the distance $D_n$ may be no more than 0.2 centimeters. In some embodiments, the distance $D_n$ may be no more than 0.1 centimeters.

In some embodiments, the open binaural earphone 3800 may include a low-frequency loudspeaker unit and a high-frequency loudspeaker unit, and the near-ear sound guiding hole corresponding to the low-frequency loudspeaker unit may be combined with the near-ear sound guiding hole corresponding to the high-frequency loudspeaker unit into one single sound guiding hole. For example, as shown in FIG. 41, the first sound guiding hole 3842-1 and the third sound guiding hole 3842-3 may be combined into the sound guiding hole 3842-5. In some embodiments, one end of the sound guiding hole 3842-5 may be disposed on an end surface 3812, and the other end of the sound guiding hole 3842-5 may be disposed on an end surface 3814. When the user wears the open binaural earphones 3800, the first sound guiding hole 3842-1 and the third sound guiding hole 3842-3

(i.e., near-ear point sound sources) may face the user's ear hole, and the user may hear the sound (i.e., hearing sound) with a relatively high volume. In some embodiments, the second sound guiding hole 3842-2 may be disposed on the end surface 3812. The fourth sound guiding hole 3842-4 may be disposed on an end surface 3816. In some embodiments, the first sound guiding hole 3842-1, the second sound guiding hole 3842-2, the third sound guiding hole 3842-3, and the fourth sound guiding hole 3842-4 may all be disposed on the end surface 3812 (or the end surface 3816). In some embodiments, the third sound guiding hole 3842-3 may be disposed on the end surface 3812 and the fourth sound guiding hole 3842-4 may be disposed on a surface opposite to the end surface 3812. In some embodiments, as shown in FIG. 38, the first sound guiding hole 3842-1 and the second sound guiding hole 3842-2 may be disposed at any position of the front end of the housing 3810 (e.g., the end face 3812, the end face 3814, the end face 3816, etc.), the third sound guiding hole 3842-3 and the fourth sound guiding hole 3842-4 may be disposed at any position of the rear end of the housing 3810. In some embodiments, the first sound guiding hole 3842-1 and the third sound guiding hole 3842-3 may be disposed at the front end of the housing 3810, and the second sound guiding hole 3842-2 and the fourth sound guiding hole 3842-4 may be disposed at the rear end of the housing 3810. In some embodiments, when the user wears the open binaural earphone 3800, a distance D between a center point of the sound guiding hole 3842-5 and a center point of the ear hole close to the center point of the sound guiding hole 3842-5 may be not greater than 10 centimeters. In some embodiments, the distance D may be not greater than 9 centimeters. In some embodiments, the distance D may be not greater than 8 centimeters. In some embodiments, the distance D may be not greater than 7 centimeters. In some embodiments, the distance D may be not greater than 6 centimeters. In some embodiments, the distance D may be not greater than 5 centimeters. In some embodiments, the distance D may be not greater than 4 centimeters. In some embodiments, the distance D may be not greater than 3 centimeters. In some embodiments, the distance D may be not greater than 2.5 centimeters. In some embodiments, the distance D may be not greater than 2 centimeters. In some embodiments, the distance D may be not greater than 1.5 centimeters. In some embodiments, the distance D may be not greater than 1 centimeters. In some embodiments, the distance D may be not greater than 0.5 centimeters. In some embodiments, the distance D may be not greater than 0.4 centimeters. In some embodiments, the distance D may be not greater than 0.3 centimeters. In some embodiments, the distance D may be not greater than 0.2 centimeters. In some embodiments, the distance D may be not greater than 0.1 centimeters.

In some embodiments, a baffle may be disposed between two point sound sources of a dual-point sound source, and the volume of the near-field sound may be significantly increased under the condition that the volume of the far-field sound leakage is not increased significantly, thereby improving the user's listening experience. More descriptions regarding the baffle between the two point sound sources of a dual-point sound source may be found elsewhere in the present disclosure. See, e.g., FIG. 11 to FIG. 34 and the relevant descriptions thereof. In some embodiments, a low-frequency dual-point sound source may include a sound guiding hole disposed at a near-ear point (i.e., a near-ear sound guiding hole or near-ear point sound source), and a sound guiding hole at a far-ear point may be disposed at a rear end of the housing 3810 (i.e., a far-ear sound guiding hole or far-ear point sound source). When the user wears the open binaural earphone 3800, the near-ear point sound source and the far-ear point sound source may be separated by the user's auricle. On this occasion, the auricle may act as a baffle, thereby significantly increasing the volume of the near-field sound, and improving the user's listening experience.

In some embodiments, internal friction or viscous force of a medium in the guiding tube may affect sound propagation, and a diameter of the guiding tube may be not too small, otherwise, it may cause sound loss and reduce output volume. However, when the diameter of a guiding tube is too great, when the transmitted sound is greater than a certain frequency, high-order waves may be generated in the guiding tube. To avoid the generation of the high-order waves, the diameter of the guiding tube may be determined reasonably. In some embodiments, the radius of the guiding tube may be 0.5 millimeters-10 millimeters. In some embodiments, the radius of the guiding tube may be 0.5 millimeters-9 millimeters. In some embodiments, the radius of the guiding tube may be 0.7 millimeters-8 millimeters. In some embodiments, the radius of the guiding tube may be 0.9 millimeters-7.5 millimeters. In some embodiments, the radius of the guiding tube may be 1 millimeters-7 millimeters. In some embodiments, the radius of the guiding tube may be 1.5 millimeters-6.5 millimeters. In some embodiments, the radius of the guiding tube may be 1.75 millimeters-5 millimeters. In some embodiments, the radius of the guiding tube may be 1.75 millimeters-6 millimeters. In some embodiments, the radius of the guiding tube may be 2 millimeters-6 millimeters. In some embodiments, the radius of the guiding tube may be 2.5 millimeters-5.5 millimeters. In some embodiments, the radius of the guiding tube may be 3 millimeters-5 millimeters. In some embodiments, the radius of the guiding tube may be 3.5 millimeters-4.5 millimeters. In some embodiments, the radius of the guiding tube may be 3.7 millimeters-4.2 millimeters.

In some embodiments, a radiation impedance of a guiding tube and a radiation impedance of a nozzle (also referred to as a sound guiding hole) may interact with each other, which may cause a sound with a specific frequency to form a standing wave in the guiding tube, and one or more peaks/valleys may be formed at one or more frequencies of an output sound, thereby affecting the quality of the output sound. Generally, the longer a length of the guiding tube is, the lower the frequency of forming the one or more peaks/valleys is, and the greater the count of the one or more peaks/valleys may be. In some embodiments, the length of the guiding tube may be not greater than 300 millimeters. In some embodiments, the length of the guiding tube may be not greater than 250 millimeters. In some embodiments, the length of the guiding tube may be not greater than 200 millimeters. In some embodiments, the length of the guiding tube may be not greater than 150 millimeters. In some embodiments, the length of the guiding tube may be not greater than 100 millimeters. In some embodiments, the length of the guiding tube may be not greater than 50 millimeters. In some embodiments, the length of the guiding tube may be not greater than 30 millimeters. In some embodiments, the length of the guiding tube may be not greater than 20 millimeters. In some embodiments, the length of the guiding tube may be not greater than 10 millimeters. In some embodiments, an impedance matching layer may be disposed at the sound guiding hole to reduce the effect of the one or more peaks/valleys. In some embodiments, a length-to-diameter ratio (i.e., a ratio of the length to the diameter) of the guiding tube may affect the sound generated in the guiding tube. The effect of the length-to-diameter may be the same as or similar to the effect of low-pass filtering and the effect of damping, which may attenuate the volume, and the attenuation of a volume of a high-frequency sound may be greater than the attenuation of a volume of a low-frequency sound. To avoid that the attenuation affects a hearing sound, in some embodiments, the length to diameter ratio of the guiding tube may be not greater than 200. In some embodiments, the length to diameter ratio of the guiding tube may be not greater than 180. In some embodiments, the length to diameter ratio of the guiding tube may be not greater than 160. In some embodiments, the length to diameter ratio of the guiding tube may be not greater than 150. In some embodiments, the length to diameter ratio of the guiding tube may be not greater than 130. In some embodiments, the length to diameter ratio of the guiding tube may be not greater than 110. In some embodiments, the length to diameter ratio of the guiding tube may be not greater than 80. In some embodiments, the length to diameter ratio of the guiding tube may be not greater than 50. In some embodiments, the length to diameter ratio of the guiding tube may be not greater than 30. In some embodiments, the length to diameter ratio of the guiding tube may be not greater than 10.

In some embodiments, parameters (e.g., a length, a radius, a length-to-diameter ratio, etc.) of each guiding tube may be the same or different. For example, a length of the first guiding tube 3840-1 may be 5 millimeters, and a length of the second guiding tube 3840-2 may be 30 millimeters. As another example, the lengths of the first guiding tube 3840-1 and the third guiding tube 3840-3 may both be 5 millimeters.

In some embodiments, the phases of frequency-divided signals corresponding to point sound sources may be different, and the volumes of the hearing sound and the leakage sound may be different. Therefore, different output effects may be achieved by adjusting the phases of the point sound sources. In some embodiments, to reduce the far-field leakage sound of the open binaural earphone 3800, the acoustic driver 3830-1 may generate low-frequency sounds with the same (or substantially the same) amplitude and opposite (or substantially opposite) phases at the first sound guiding hole 3842-1 and the second sound guiding hole 3842-2, respectively, and the acoustic driver 3830-2 may generate high-frequency sounds with the same (or substantially the same) amplitude and opposite (or substantially opposite) phases at the first sound guiding hole 3842-3 and the second sound guiding hole 3842-4, respectively. In some embodiments, the higher the frequency bands of the frequency-divided signals corresponding to the dual-point sound source is, the greater a phase difference between the frequency-divided signals may be. For example, in the dual-point sound source including two loudspeaker units, for a dual-point sound source corresponding to low-frequency signals, the phase difference between the low-frequency signals transmitted from the dual-point sound source may be adjusted to be equal (or substantially equal) to 0°. For a dual-point sound source corresponding to high-frequency signals, the phase difference between the high-frequency signals transmitted from the dual-point sound source may be adjusted to be equal (or substantially equal) to 180°. In some embodiments, the phase of the dual-point sound source may be adjusted, and the phase difference of sounds generated by the dual-point sound source at the near-field position (or a center point of the ear hole) may be equal (or substantially equal) to 0°, and the phase difference between the sound at the far-field position may be equal (or substantially equal) to 180°. In some embodiments, a phase difference of sounds output by two point sound sources of the dual-point sound source may be equal to 5°, 10°, 20°, 50°, 70°, 90°, 100°, 120°, 130°, 150°, 170°, 175°, 180°, or the like, or any combination thereof.

The circuit board 3860 may be configured to integrate one or more components to realize various functions. For example, a frequency division processing unit may be integrated into the circuit board to realize the frequency division function on audio signals. As another example, a signal processing unit may be integrated into the circuit board to adjust the phases and/or amplitudes of the audio signals. The Bluetooth module 3870 may be configured to communicate the open binaural earphone 3800 with an external device. For example, the open binaural earphone 3800 may be communicated with an external audio device through Bluetooth module 3870. In some embodiments, the Bluetooth module 3870 may be integrated on the circuit board 3860. The power source module 3880 may be configured to provide power to the one or more components of the open binaural earphone 3800. In some embodiments, the power source module 3880 may include an accumulator, a dry battery, a lithium battery, a Daniell battery, a fuel battery, or the like. Other components such as the circuit board 3860, the Bluetooth unit 3870, and the power source module 3880 of the open binaural earphone 3800 may be referred to the settings of general earphones in the prior art, which are not repeated herein.

It should be noted that the descriptions of the open binaural earphone 3800 may be intended to be illustrative, which does not limit the scope of the present disclosure. Various substitutions, modifications, and changes may be obvious to those skilled in the art. The features, structures, methods, and other features of the exemplary embodiments described herein may be combined in various ways to obtain additional and/or alternative exemplary embodiments. For example, the open binaural earphone 3800 may include one or more additional components, and one or more components of the open binaural earphone 3800 described above may be omitted. Merely by way of example, a feedback microphone may be added to the open binaural earphone 3800. The feedback microphone may be configured to reduce a residual noise (e.g., a circuit current noise). As another example, the baffle 3850 may be omitted. As yet another example, one or more buttons (e.g., a volume increase button, a volume decrease button, a power button, a Bluetooth switch button, etc.) may be disposed on the housing 3810. As yet another example, the open binaural earphone 3800 may be connected with a user terminal through the Bluetooth module 3870. The user terminal may display a control interface, and the user may issue a control instruction through the control interface, for example, increasing or decreasing the volume, etc. The control signal may be received by the Bluetooth module 3870 and realize the control of the open binaural earphone 3800. In some embodiments, the Bluetooth module 3870 may be omitted. The open binaural earphone 3800 may communicate with an external device through a data cable.

Figure 42A:
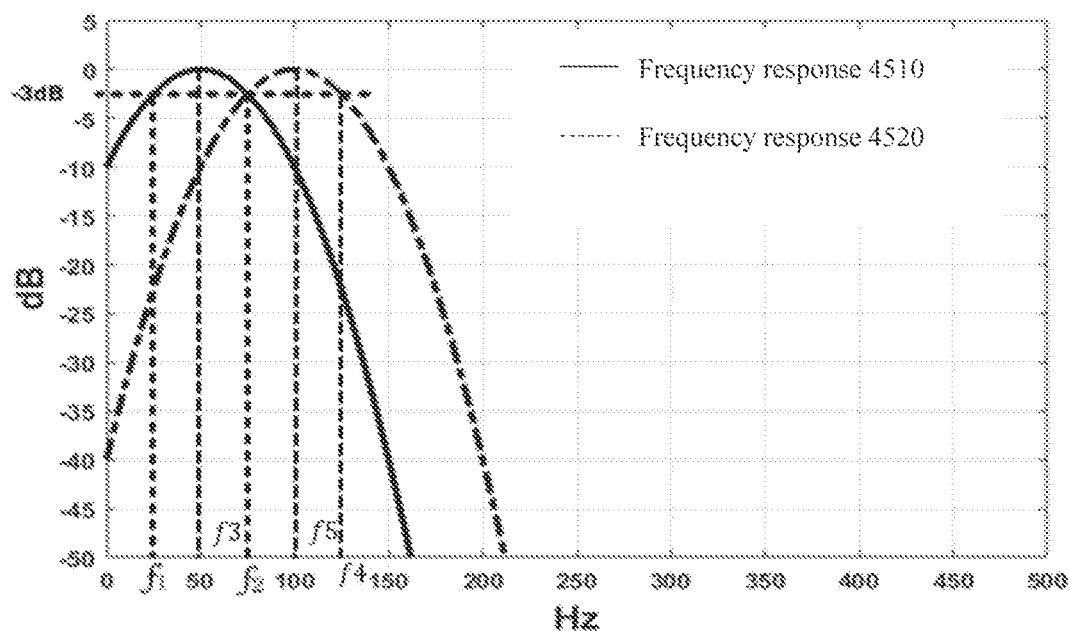
FIG. 42A is a schematic diagram illustrating an exemplary frequency response of a first loudspeaker unit and an exemplary frequency response of a second loudspeaker unit according to some embodiments of the present disclosure.
Figure 42B:
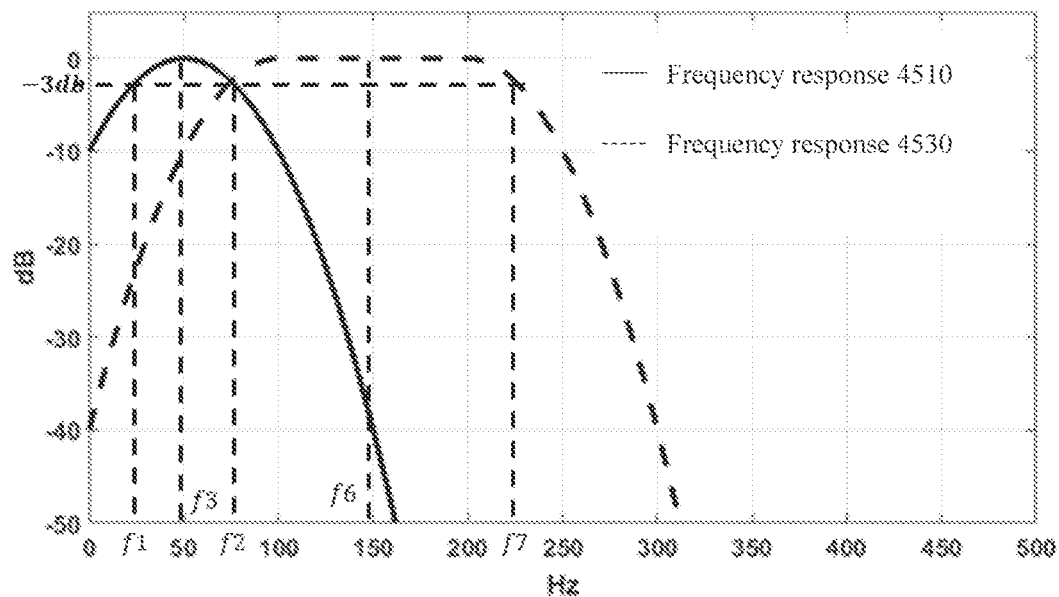
FIG. 42B is a schematic diagram illustrating an exemplary frequency response of a first loudspeaker unit and an exemplary frequency response of a second loudspeaker unit according to some embodiments of the present disclosure.

FIG. 42A is a schematic diagram illustrating an exemplary frequency response 4210 of the first loudspeaker unit 3830-1 and an exemplary frequency response 4220 of the second loudspeaker unit 3830-2 as shown in FIG. 38 according to some embodiments of the present disclosure. FIG. 42B is a schematic diagram illustrating the exemplary frequency response 4210 of the first loudspeaker unit 3830-1 and another exemplary frequency response 4230 of the second loudspeaker unit 3830-2 as shown in FIG. 38 according to some embodiments of the present disclosure. The first loudspeaker unit 3830-1 may be configured to process an audio signal to generate a first frequency-divided signal. The second loudspeaker unit 3830-2 may be configured to process an audio signal to generate a second frequency-divided signal. In the frequency-divided signals, the second frequency-divided signal may be adjacent to the first frequency-divided signal in a frequency domain.

In some embodiments, the frequency response of the first loudspeaker unit 3830-1 and the frequency response of the second loudspeaker unit 3830-2 may have the same frequency bandwidth. For example, as shown in FIG. 42A, the frequency response 4210 of the first loudspeaker unit 3830-1 may have a low half power point f1, a high half power point f2, and a center frequency f3. As used herein, a half-power point of a certain frequency response may refer to a frequency point with a specific power suppression (e.g.,-3 dB). The frequency bandwidth of the frequency response 4210 may be equal to a difference between the high half power point f2 and the low half power point f1. The frequency response 4220 of the second loudspeaker unit 3830-2 may have a low half power point f2, a high half power point f4, and a center frequency f5. The frequency bandwidth of the frequency response 4220 may be equal to a difference between the high half power point f4 and the low half power point f2. The frequency bandwidth of the first loudspeaker unit 3830-1 may be equal to the frequency bandwidth of the second loudspeaker unit 3830-2.

In some embodiments, the frequency response of the first loudspeaker unit 3830-1 and the frequency response of the second loudspeaker unit 3830-2 may have different frequency bandwidths. For example, as shown in FIG. 42B, the frequency response 4230 of the second loudspeaker unit 3830-2 may have a low half power point f2, a high half power point f7 (which is greater than f4), and a center frequency f6. The frequency bandwidth of the frequency response 4230 of the second loudspeaker unit 3830-2 may be equal to a difference between the high half power point f7 and the low half power point f2, and the difference (i.e., the frequency bandwidth of the frequency response 4230 of the second loudspeaker unit 3830-2) may be greater than the frequency bandwidth of the frequency response 4210 of the first loudspeaker unit 3830-1.

In some embodiments, the frequency response of the first loudspeaker unit 3830-1 and the frequency response of the second loudspeaker unit 3830-2 may intersect at a specific frequency point. The intersection of the frequency responses may indicate that an overlap between the first frequency response and the second frequency response. On an ideal occasion, the frequency response of the first loudspeaker unit 3830-1 may not overlap with the frequency response of the second loudspeaker unit 3830-2. Actually, the frequency response of the first loudspeaker unit 3830-1 may overlap with the frequency response of the second loudspeaker unit 3830-2, which may cause an interference range between the first frequency-divided signal and the second frequency-divided signal, and affect the quality of the first frequency-divided signal and the second frequency-divided signal. For example, the larger the overlapping range is, the larger the interference range may be, and the lower the quality of the first frequency-divided signal and the second frequency-divided signal may be.

In some embodiments, the specific frequency point at which the frequency response of the first loudspeaker unit 3830-1 and the frequency response of the second loudspeaker unit 3830-2 intersect may be close to the half power point of the frequency response of the first loudspeaker unit 3830-1 and/or the half power point of the frequency response of the second loudspeaker unit 3830-2. Taking FIG. 42A as an example, the frequency response 4210 and the frequency response 4220 intersect at the high half power point f2 of the frequency response 4210, and the high half power point f2 may be the low half power point of the frequency response 4220. As used herein, when a power level difference between the frequency point and the half-power point is not greater than a threshold (e.g., 2 dB), it may be considered that the frequency point is close to the half power point. In this case, relatively little energy loss or repetition may be formed in the frequency response of the first loudspeaker unit 3830-1 and the frequency response of the second loudspeaker unit 3830-2. which may cause an overlapping range between the frequency response of the first loudspeaker unit 3830-1 and the frequency response of the second loudspeaker unit 3830-2. Merely by way of example, assuming that the half power point is −3 dB and the threshold is −2 dB, when the frequency responses intersect at a frequency point with a power level greater than −5 dB and/or less than −1 dB, the overlapping range may be considered to be relatively small. In some embodiments, the center frequency and/or the bandwidth of the frequency response of the first loudspeaker unit 3830-1 and the center frequency and/or the bandwidth of the frequency response of the second loudspeaker unit 3830-2 may be adjusted to generate a relatively narrow or an required overlapping range between the frequency response of the first loudspeaker unit 3830-1 and the frequency response of the second loudspeaker unit 3830-2, thereby avoiding the overlapping between the frequency band of the first frequency-divided signal and the frequency band of the second frequency-divided signal.

It should be noted that the descriptions of the embodiments in FIG. 42A and FIG. 42B are intended to be illustrative, which does not limit the scope of the present disclosure. Various substitutions, modifications, and changes may be obvious to those skilled in the art. The features, structures, methods, and other features of the exemplary embodiments described herein may be combined in various ways to obtain additional and/or alternative exemplary embodiments. For example, one or more parameters (e.g., the frequency bandwidth, the high half power point, the low half power point, and/or the center frequency) of the frequency response of the first loudspeaker unit 3830-1 and/or the frequency response of the second loudspeaker unit 3830-2 may be changed.

Figure 43:
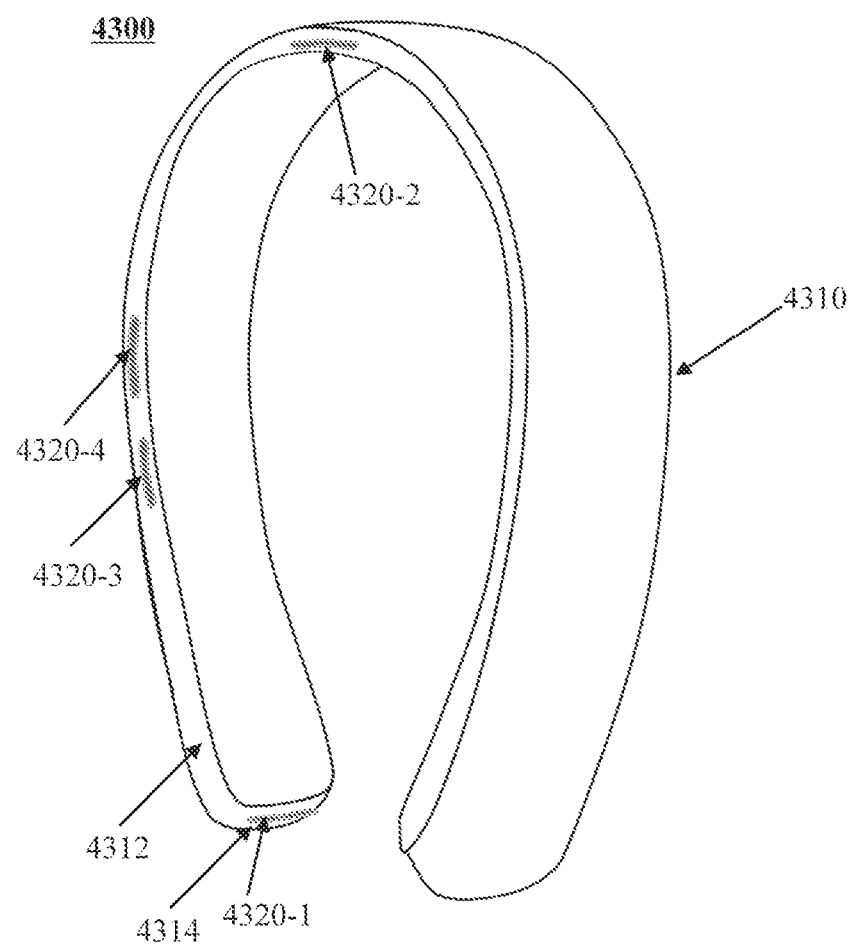
FIG. 43 is a schematic diagram illustrating an exemplary open binaural headphone according to some embodiments of the present disclosure.

FIG. 43 is a schematic diagram illustrating an exemplary open binaural headphone according to some embodiments of the present disclosure. As shown in FIG. 43, an open binaural headphone 4300 may be called a headband headphone. The open binaural headphone 4300 may have a similar configuration to the open binaural earphone 3800. For example, the open binaural headphone 4300 may include a housing 4310, a microphone, one or more acoustic drivers (e.g., one or more loudspeaker units), one or more guiding tube corresponding to the acoustic driver(s), a baffle, a circuit board, a Bluetooth module, and a power source module. The housing 4310 may include a first sound guiding hole 4320-1, a second sound guiding hole 4320-2, a third sound guiding hole 4320-3, and a fourth sound guiding hole 4320-4 corresponding to the acoustic driver(s). As shown in FIG. 43, the first sound guiding hole 4320-1 and the second sound guiding hole 4320-2 of the open binaural headphone 4300 may correspond to a low-frequency loudspeaker unit, and the third sound guiding hole 4320-3 and the fourth sound guiding hole 4320-4 may correspond to a high-frequency loudspeaker unit. In some embodiments, the first sound guiding hole 4320-1 may be disposed on an end surface 4314 of the open binaural headphone 4300, the second sound guiding hole 4320-2 may be disposed on an end surface 4312 of the open binaural headphone 4300 and located at the top of the housing 4310, and the third sound guiding hole 4320-3 and the fourth sound guiding hole 4320-4 may both be disposed on the end surface 4312 and located at a middle portion of a left end and/or a right end of the housing 4310. More descriptions of the open binaural headphone 4300 may be combined with the description of the open binaural earphone 3800, which may be not repeated herein. For example, when a user wears the open binaural headphone 4300, a distance between a center point of the first sound guiding hole 4320-1 and a center point of a user's ear hole close to the center point of the first sound guiding hole 4320-1 may be the same as the distance between the center point of the sound guiding hole 3842-5 of the open binaural earphone 3800 and the center point of a user's ear hole close to the center point of the sound guiding hole 3842-5. As another example, shapes and/or sizes of the first sound guiding hole 4320-1, the second sound guiding hole 4320-2, the third sound guiding hole 4320-3, and the fourth sound guiding hole 4320-4 of the open binaural earphone 4300 may be the same as that of the first sound guiding hole 3842-1, the second sound guiding hole 3842-2, the third sound guiding hole 3842-3, and the fourth sound guiding hole 3842-4 of the open binaural earphone 3800, respectively.

It should be noted that an ear-hook earphone may be taken as an example to describe the open binaural earphone according to some embodiments of the present disclosure, which is not limited that the principle may be applied to other open binaural headphones. The positions of the acoustic driver(s), the guiding tubes, and the sound guiding holes of the open binaural headphone disclosed in the present disclosure may be only examples, which does not limit the scope of the present disclosure. Various substitutions, modifications, and changes may be obvious to those skilled in the art. The features, structures, methods, and other features of the exemplary embodiments described herein may be combined in various ways to obtain additional and/or alternative exemplary embodiments. For example, the open binaural earphone 3800 may include three loudspeaker units, and the three loudspeaker units may correspond to a voice signal in a low-frequency band, a voice signal in a mid-frequency band, and a voice signal in a high-frequency band (i.e., a low-frequency loudspeaker unit, a mid-frequency loudspeaker unit, and a high-frequency loudspeaker unit), respectively. The low-frequency loudspeaker unit, the corresponding guiding tube, and the corresponding sound guiding holes may be disposed at the front end of the housing, the mid-frequency loudspeaker unit, the corresponding guiding tube, and the corresponding sound guiding holes may be disposed in a middle portion of the housing, the high-frequency loudspeaker unit, the corresponding guiding tube, and the corresponding sound guiding holes may be disposed at the rear end of the housing. As another example, the low-frequency loudspeaker unit, the mid-frequency loudspeaker unit, and the high-frequency loudspeaker unit may be disposed at the rear end of the housing, and the sound guiding holes may be disposed at the front end of the housing through the guiding tube corresponding to the loudspeaker unit. As yet another example, the high-frequency loudspeaker unit and/or the low-frequency loudspeaker unit of the open binaural headphone 4300 may correspond to four guiding tubes and four sound guiding holes. The four sound guiding holes may be disposed in pairs on a left side and a right side of the housing 4310 as a low-frequency dual-point sound source for the left and right ears of the user.

The beneficial effects of the embodiments of the present disclosure may include but be not limited to the following. (1) An open coupling of an acoustic output device and an ear hole is realized, thereby avoiding hearing loss of an ear, and avoiding safety hazard caused by that the user wears a conventional earphone for a long time; (2) The sound with different frequency bands may be output by setting a high-frequency dual-point sound source and a low-frequency dual-point sound source, thereby improving the quality of the output sound; (3) The leakage reduction performance of an acoustic output device may be improved by setting that two point sound sources of the dual-point sound source with different distances, thereby satisfying requirements of an open binaural acoustic output device. It should be noted that different embodiments may have different beneficial effects. In different embodiments, the possible beneficial effects may be any one or a combination of the beneficial effects described above, or any other beneficial effects.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended for those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:

1. An open binaural earphone, comprising:
a housing configured to accommodate a transducer, wherein the housing matches a user's auricle and is hung on the user's ear such that the open binaural earphone can be placed on the user's ear without blocking the user's ear canal; wherein
the transducer is configured to output sounds from at least two sound guiding holes disposed on the housing, wherein a first sound guiding hole of the at least two sound guiding holes is closer to the user's ear canal than a second sound guiding hole of the at least two sound guiding holes, and a distance between the first sound guiding hole and the second sound guiding hole is not greater than 12 mm,
wherein a first aperture of the first sound guiding hole is greater than a second aperture of the second sound guiding hole, and
an aperture ratio of the first aperture of the first sound guiding hole to the second aperture of the second sound guiding hole is not less than 5.

2. The open binaural earphone of claim 1, wherein when the user wears the open binaural earphone, a distance between a center point of the first sound guiding hole and a center point of the user's ear canal is no more than 1 cm.

3. The open binaural earphone of claim 1, wherein when the user wears the open binaural earphone, a distance between a center point of the first sound guiding hole and a center point of the user's ear canal is no more than 0.5 cm.

4. The open binaural earphone of claim 1, wherein when the user wears the open binaural earphone, a distance between a center point of the first sound guiding hole and a center point of the user's ear canal is no more than 0.4 cm.

5. The open binaural earphone of claim 1, wherein an aperture ratio of the first aperture of the first sound guiding hole to the second aperture of the second sound guiding hole is not less than 10.

6. The open binaural earphone of claim 1, further comprising:
a first guiding tube corresponding to the first sound guiding hole; and
a second guiding tube corresponding to the second sound guiding hole, wherein
a radius of the first guiding tube or a radius of the second guiding tube is within a range of 1.75 mm-5 mm.

7. The open binaural earphone of claim 6, wherein a length of the first guiding tube or a length of the second guiding tube is not greater than 10 mm.

8. The open binaural earphone of claim 6, wherein
a ratio of a length of the first guiding tube to a diameter of the first guiding tube is not greater than 200, or
a ratio of a length of the second guiding tube to a diameter of the second guiding tube is not greater than 200.

9. The open binaural earphone of claim 1, wherein a ratio of an acoustic route from the transducer to the first sound guiding hole to an acoustic route from the transducer to the second sound guiding hole is in a range of 0.5-2.

10. The open binaural earphone of claim 1, wherein a ratio of an acoustic route from the transducer to the first sound guiding hole to an acoustic route from the transducer to the second sound guiding hole is in a range of 0.8-1.2.

11. The open binaural earphone of claim 1, wherein a ratio of an acoustic impedance between the transducer and the first sound guiding hole to an acoustic impedance between the transducer and the second sound guiding hole is in a range of 0.5-2.

12. The open binaural earphone of claim 1, wherein a ratio of an acoustic impedance between the transducer and the first sound guiding hole to an acoustic impedance between the transducer and the second sound guiding hole is in a range of 0.8-1.2.

13. The open binaural earphone of claim 1, wherein the sounds output from the first sound guiding hole and the second sound guiding hole have opposite phases.

14. The open binaural earphone of claim 1, wherein a baffle is disposed between the first sound guiding hole and the second sound guiding hole.

15. The open binaural earphone of claim 1, further comprising:
a power source module disposed at a rear end of the housing, wherein the transducer is disposed at a front end of the housing that is opposite to the rear end of the housing.

16. The open binaural earphone of claim 1, wherein the housing is integrally formed.

17. The open binaural earphone of claim 1, wherein the housing is assembled via a plugging manner or a snapping manner.

* * * * *